United States Patent [19]

Choate

[11] Patent Number: 5,718,590
[45] Date of Patent: Feb. 17, 1998

[54] METHOD FOR KEYBOARD TRAINING

[76] Inventor: John I. M. Choate, c/o P.O. Box 65, Seminole, Okla. 74818-0065

[21] Appl. No.: 652,109

[22] Filed: May 23, 1996

Related U.S. Application Data

[60] Continuation-in-part of Ser. No. 273,489, Jul. 11, 1994, abandoned, which is a division of Ser. No. 918,767, Jul. 27, 1992, Pat. No. 5,352,050.

[51] Int. Cl.⁶ .................................................. G09B 13/00
[52] U.S. Cl. ............................................................ 434/227
[58] Field of Search ................................... 434/227, 229, 434/231, 118; 400/89, 90, 486

[56] References Cited

U.S. PATENT DOCUMENTS

| | | | |
|---|---|---|---|
| 4,378,217 | 3/1983 | Wilson et al. | 434/228 |
| 4,580,984 | 4/1986 | Madaus | 434/227 |
| 4,824,268 | 4/1989 | Diernisse | 400/486 |
| 4,844,637 | 7/1989 | Buisson et al. | 400/90 X |
| 5,352,050 | 10/1994 | Choate | 400/486 |
| 5,498,088 | 3/1996 | Choate | 400/486 |

FOREIGN PATENT DOCUMENTS

| | | | |
|---|---|---|---|
| 404024682 | 1/1992 | Japan | 434/227 |
| 404116680 | 4/1992 | Japan | 434/227 |

*Primary Examiner*—Jeffrey A. Smith

[57] ABSTRACT

A method of instructing students of all skill levels, ages, language abilities, or physical disabilities, to achieve a psychokinetic touch typing ability on an efficient keyboard wherein the most used letters are located on keys on the home row, by providing steps for the student to locate the most used keys and to practice the keyboard by a combination of free style typing, working the fingers, composing text, saving all the keystrokes, showing all keystrokes, displaying errors, avoiding and preventing mistakes, locking up the keyboard upon a student's error, accounting for and recording the student's errors, displaying and suppressing the graphic representation of the finger placement on keys by a plurality of boxes representing the keys or characters of the keyboard in approximate configuration of the keys of a keyboard, providing practice text, placing the fingers on the keys, naming students, and permitting waiving of records, and reducing the flexion and extension of the fingers.

17 Claims, 42 Drawing Sheets

```
Viewing file HI.TXT.
``` hi. to start, push down the same letter on your keyboard as the one you see within the extra thick box. yes, the "h". your h will appear under the h in hi. next push the i and you have spelled hi. push down the escape key to leave this sample, and then press the <F2> button to see the main menu. good work. press escape now. bye! you did not? then place the fingers of your left hand on the second row, so the little finger is over "a". place the fingers of your right hand on the same row, so your index finger is next to the "h". these are your home boxes. when you reach for a letter, use only the one finger that seems closest to the letter, and leave the other fingers resting lightly on the home boxes, without pushing them down. the index fingers will reach and push down six boxes, the home box, a box above, a box below and three boxes to the middle, above, below and same row. the other fingers will push down three boxes, the home box, and a box above and below. Ynk AZT Virroim. Modern spelling and electronic ASCII extract Copr. 1993 Irvan Moritzky.

```
<ESC>Exit  <F2>Search  <F7>Print  <TAB>Move left,Right  <PGUP,PGDN>Scroll
Ctrl  Alt                     Space Bar              Alt   Ctrl
```

Figure 26

METHOD FOR KEYBOARD TRAINING

CROSS-REFERENCES TO RELATED APPLICATIONS

This application is a continuation-in-part of application Ser. No. 08/273,489, filed Jul. 11, 1994, and now abandoned, which is a divisional of application Ser. No. 07/918,767, filed Jul. 27, 1992, and now U.S. Pat. No. 5,352,050.

BACKGROUND OF THE INVENTION

1. Field of the Invention

The present invention is directed to improvements in typing systems, typing training, keyboard arrangement, disability accommodation, medical and physical therapy for repetitive stress syndrome, multi lingual translation, communication, displaying information on video terminals or monitors, word processing, data entry, encryption substitution, psychokinetic, code as well as many other applications.

2. Description of the Prior Art

Writing improvements generally deal with increased speed, rather than with the preservation. For instance, for thousands of years chiseling has made a more permanent writing as compared to drawing on paper, but, chiseling is so cumbersome, low tech, and expensive, it is now generally reserved for office building entrances, or grave markers. You may disagree when events occurred, but the following highlights improvements that have made writing faster.

3rd millennium BC: Asians chisel pictographs into stone with a writing speed of: 5 WORDS AN HOUR.

2nd Millennium B.C.: Chinese or Egyptians invent HIEROGLYPHICS, written on stone or metal; (10 Commandments written on stone tablets) and with it, the writing speed doubles to: 10 WORDS AN HOUR.

18th century B.C.: Egyptians discover papyrus, Babylonians use clay, Semites use vellum and these new surfaces allow writing speed to double to: 20 WORDS AN HOUR.

16th century B.C.: Hebrews inspired to use 22 character alphabet, e.g., writing of the Old Testament right to left on scrolls. Consequently, the writing speed doubles to: 40 WORDS AN HOUR.

1st millennium B.C.: Greeks refine their alphabet to 24 letters and change writing from left to right, use vegetable stains, blood and mud for dyes and again the writing speed doubles to: 80 WORDS AN HOUR.

4th century B.C.: Romans develop alphabet of 24 capital letters (Latin), no punctuation or spacing, and pages (early books). With these innovations, the writing speed doublet to: 160 WORDS AN HOUR.

1st millennium A.D.: Europeans invent punctuation, with small letters and as a result, the writing speed doubles to: 5 WORDS A MINUTE.

15th century A.D.: Italians, (including Leonardo DaVinci with backwards writing), invent ink, quill, and pen and writing speed doubles to: 10 WORDS A MINUTE.

In 1867, a Milwaukee printer, C. Latham Sholes invents the typewriter and with it the writing speed doubles to: 20 WORDS A MINUTE. See discussion of Syllabic typewriter, U.S. Pat. No. 3,970,185 issued to Dothan Shelton in 1976.

In 1867 (perhaps) a secretary invents "touch typing," and the writing speed DOUBLES to 40 WORDS A MINUTE and jams mechanical typewriters keys and hammers. (See discussion of QWERTY in Combinatorial Keyboards which encode Characters and a space, U.S. Pat. No. 4,655,621 issued to Richard Holden in 1987.) High schools and business schools teach what is called the "touch system" of typing. The "touch system" of typing simply means that the typist memorized the keyboard so thoroughly that she can type without looking at it, and that she learns to use all of her fingers, each finger on a particular group of keys. Untrained typists use what is called the "hunt and peck" system. Usually they use only their two forefingers or at most their four best fingers, the forefinger and middle fingers. Actually these typists can learn the keyboard just as well and go just about as fast, but very fast typing is more tiring for them than for the touch typist because the hands have to leap all around the keyboard to reach all the keys with only two or four fingers. See *Illustrated World Encyclopedia*.

1872 C. Latham SHOLES designed the "Obsolete" keyboard, also referred to as the "QWERTY" keyboard, to jam fingers, not keys. Today, hundreds of millions of keyboards and people follow QWERTY system. See discussion of handicaps of so-called "universal" keyboard below in the discussion of U.S. Pat. No. 2,040,248 issued to A. Dvorak, et al.

The first typewriter keyboard worked with three or four rows of buttons, called "keys". Each key was the size of a thumb nail. All keys can be depressed by the outstretched fingers of the hands of the typist in an arrangement about the width of two hands. All keys were connected to metal rods, which looked like little hammers. When the typist flexed (retracted) a finger, the finger depressed (pushed down) a key. Each of the twenty six alphabet keys were connected to pulleys and springs, which lifted the hammer to strike paper wrapped against a round rubber tube called a "platen." The end of the hammer face had a reverse metal letter or "type face". This type face left an impression on the paper through a piece ribbon (inked cloth). If the typist were quick, two or more hammers could hit at the same time and collide, a process called "jamming". The typist would have to stop work and separate the hammers.

To remedy this jamming, Sholes' keyboard located the most used letters away from the home row, so fingers would reach between keys. The term "home row" is used to indicate the row where the fingers are normally at rest, e.g., "A S D F G H J K L;" for the "QWERTY" or "obsolete" keyboard. In effect, Sholes jammed fingers instead of keys.

For example, normally, the middle finger on the left hand rests on the home row key "D". To reach the "E" key on the "obsolete" keyboard, the finger must travel one half inch forward, press the "E" key, and then travel one half inch back to return to the "D" key. A similar journey must be made to type any keys on the top row (Q W E R T Y U I O P) or on the bottom row (Z X C V B N M) of the obsolete keyboard. But, the letter 'E' is used more than "D". Thus, having "E" on the top row causes unnecessary flexing. The same applies to the T-R-I-N keys, which are also used much more than their sister keys G-F-K-J. If typists knew that "J" and "K" are the second and fourth least used letters in English, they would be hopping mad.

In 1909, U.S. Pat. No. 943,466 (Type-Writer Keyboard) issued to S. W. Rowell. Rowell grouped nine of the most often used letters in English (to wit: AEHINORST), accounting for 69% of total letter frequency, together in the center of the Keyboard. Rowell retained the four horizontal row arrangement of the QWERTY designed keyboard. However, Rowell relocated all 26 letters of the alphabet from the location of the keys on the QWERTY keyboard, that is, none of the letters retained their former positions. Rowell's feature was to put letters in position "to be touched by either or both hands."

In 1920, U.S. Pat. No. 1,336,122 (Keyboard for Typewriters) issued to F. M. M, Banaji. Banaji retained the four horizontal row arrangement of the QWERTY keyboard. However, Banaji relocated 18 letters of the alphabet from the location of the keys on the QWERTY keyboard and only 8 letters retained their former positions (to wit: BDEKRTYZ). Banaji chose least used keys on the home row of the keyboard (to wit: FKLQX). Banaji's feature was to relieve pressure on the index fingers (by substituting Q and X for G and H). In 1920, U.S. Pat. No. 1,342,233 issued to C. Wolcott. Wolcott retained 4 horizontal row arrangement of the QWERTY keyboard. However, Wolcott relocated 24 letters of the alphabet from the location of the keys on the QWERTY keyboard and retained only 2 letters in their former positions (to wit: CP). Wolcott selected least used keys on the home row of the keyboard (to wit: BJQUW). Wolcott's feature is the "approximately even division" of "labor between the right and left hand."

1924 Typewriter Keyboard Arrangement, U.S. Pat. No. 1,506,426 issued to R. E. Hoke. Hoke retains the 4 horizontal row arrangement of QWERTY. Hoke relocates all 26 letters of the alphabet from the location of the keys on the QWERTY keyboard; none of the letters retain their former positions. Hoke places 9 most used keys on the home row (to wit: AEHIONRST) and selects the vowel "U" for the 10th position. Hoke's features are to place most used keys on home rows, and to place Shift key, Back Spacer, and Shift lock in the vertical middle of the keyboard to be operated by the thumb.

1936 Typewriter Keyboard, U.S. Pat. No. 2,040,248 issued to AUGUST DVORAK et al. DVORAK introduced a new keyboard "based on the frequency of usage of the letters in the English language." (Of course, so was Sholes's keyboard.) But by the 1930's, the electric typewriter solved the jamming problem of six decades earlier. Dvorak retains the horizontal row arrangement of QWERTY. Dvorak relocates 23 letters of the 26 letters of the alphabet from their former location on the QWERTY keyboard; only 3 letters retain their former positions (to wit: AMZ). Dvorak places 9 most used keys on the home row (to wit: ADEHINOST) and selects the vowel "U" for the 10th position. Dvorak's features are to place most used keys on home rows (or middle bank) for 70% total letter frequency. Dvorak also reduces awkward positions which slow down rhythm and contribute to errors, fatigue, and slowness. He improves typing for digraphs (two letter sequences) and trigraphs (three letter sequences).

It is clear from the above that through the ages there have been a number of ways of transcribing the written word and in this century people have come up with a number of different keyboard arrangements to facilitate the written word. However, many millions of people have learned the "Obsolete" QWERTY keyboard. But, would they try a different arrangement? Dvorak changed the location of nearly all of the letters from Sholes's keyboard, and so, most people were not willing to try a totally new keyboard arrangement. Hence, the Dvorak keyboard has been largely ignored.

1937 Keyboard for Typewriters, U.S. Pat. No. 2,080,457 issued to R. Bower, assignor to Burroughs Adding Machine Company. Bower retains the 4 horizontal row arrangement of QWERTY. Bower relocates 24 letters of the alphabet from their former location on the QWERTY keyboard; 2 letters retain their former positions (to wit: SH). Bower places 10 most used keys on the home row (to wit: ADEHINORST), for 71% total letter frequency. Bower's improvements reduce awkward positions, avoid rhythm slow down, reduce errors, fatigue, and increase speed. He improves typing for two and three letter combinations.

1940 Electric typewriters allow speeds to increase to 120 WORDS A MINUTE.

1965 Word Writing Machine Producing closed up printing in response to simultaneous actuation of keys, U.S. Pat. No. 3,225,883 to W. Ayres. Ayres abandons the QWERTY 4 horizontal row system for a 5 row grouping of double alphabets. The keyboard design allows simultaneous fingering instead of sequential fingering as on a typewriter. It is designed for a shorthand, or stenotype system.

1972 Keyboard for Typewriter, U.S. Pat. No. 3,698,532 issued to I. Dodds. Dodds adopts a 4 row angular arrangement of keys. Dodds relocates 24 letters of the alphabet from their former location on the QWERTY keyboard; 2 letters retain their former positions (to wit: AM). Dodds places the 9 most used keys on the home row (to wit: ADEHIONST) and selects the vowel "U" for the 10th position. The feature of the angle is to eliminate "cramping of the operator's hands, fingers and arms."

1972 Keyboard Arrangement, U.S. Pat. No. 3,698,533 issued to Illig, assigned to Bell Labs. Illig adopts a 5 row arrangement of keys. Illig relocates 26 letters of the alphabet from their former location on the QWERTY keyboard. The vowels are placed on the home row, with remaining letters arranged in order of frequency. The feature is to allow a single hand to operate the board.

1974 English Keyboard Scheme, U.S. Pat. No. 3,847,263 issued to X. X adopts the horizontal arrangement of QWERTY. X relocates 24 letters of the alphabet from their former location on the QWERTY keyboard; 2 letters retain their former positions (to wit: HX). X places 9 most used keys on the home row (to wit: AEHIONRST) and selects the vowel "U" for the 10th position. The X feature is to place the vowels (AEIOU) on the same side, to be typed by one hand, with consonants on the other side of the home row, to be typed by the other hand.

1976 Syllabic Typewriter, U.S. Pat. No. 3,970,185 issued to D. Shelton. Shelton selects a 5 row arrangement and relocates all 26 letters of the alphabet from their former location on QWERTY. The vowels are placed in the lower center to be operated by the thumbs.

1981 Keyboard Arrangement, U.S. Pat. No. 4,244,659 issued to L. Malt. Malt selects a 5 row arrangement in a curving pattern and relocates all 26 letters of the alphabet from their former location on QWERTY. The most used keys (to wit: ANISDTHOR) are selected for the home row, and the E key is to be operated by the thumb.

1987 Combinatorial Keyboards Which Encode Characters and a Space, U.S. Pat. No. 4,655,621 issued to R. Holden. Holden selects a 2 row curved grouping of 18 keys. Holden relocates all 26 letters of the alphabet from their former location on QWERTY. Holden uses principles of musical bassoon playing to allow the operator to select keys. Holden compares the letter frequency of the alphabet in the following languages: English, French, German, Italian and Spanish. The keyboard features minimal formal instruction, adaptability to other languages written in the Latin alphabet, increased speed, and lower error rate. Holden allows operation by the thenar and hypothenar eminences (heels of the hands).

2b. Prior Art Expanded

1983 Terminal Trainer Keyboard and Display apparatus for teaching keyboard operations and knowledge items, U.S. Pat. No. 4,378,217 issued to Wilson et al, provides a keyboard with a visual projector for a lesson, light emitter, and logic and error detection sensor to indicate incorrect key activation drawn to a Personal computer with an unidentified keyboard, without suggesting the same to be used for non-QWERTY keyboards.

1986 Simulated Keyboard System, U.S. Pat. No. 4,580,984 issued to Madaus, provides a simulated QWERTY keyboard dividing keys into the same finger group columns. Page 2 of said Madaus patent shows drawings of a QWERTY keyboard, and drawings of two hands showing fingers reaching for keys to type. Madaus refers to a simulated keyboard on a mat, with fingers grouped to learn the QWERTY system. Madaus not allow the display to un-emphasize the box for the key, for aids to be adapted to typists of different skill levels, ages, abilities, or disabilities, for the text files to be viewed, saved or printed, for aids for the Dvorak typist, for free style entry, for preserving (writing) the practice keyboarding written text, for naming the user to distinguish between students in a class, for creating new keyboards by customizing the location of keys, for entering, using and leaving the program easily.

1990 Typing Training Device, Japan 404024682 issued to Todokoro provides a display control displaying pictures to show forms of hands operating keys. Page 621 of said patent shows drawings of a QWERTY keyboard with Japanese characters, and drawings of two right hands showing fingers reaching for QWERTY. Todokoro does not appear to allow the display to un-emphasize the box for the key, for aids to be adapted to typists of different skill levels, ages, abilities, or disabilities, for the text files to be viewed, saved or printed, for aids for the Dvorak typist, for free style entry, for preserving (writing) the practice keyboarding written text, for naming the user to distinguish between students in a class, for creating new keyboards by customizing the location of keys, for entering, using and leaving the program easily.

1990 Typing Training Device, Japan 404116680 issued to Todokoro provides display of the key arrangement on a keyboard.

OBJECTS OF THE INVENTION

Thus, it is an object of the present invention to provide a keyboard arrangement that has the distinct advantage of maximizing the speed and efficiency of typing while allowing for a smooth and easy transition from the QWERTY keyboard arrangement to the keyboard arrangement of the present invention.

Another object of the present invention is to provide a keyboard that reduces flexing of the fingers and thereby reduces stretching of the tendons that reach from the finger to the elbow and thereby reduce the incidence of injury to the hand, wrist and forearm as a result of stresses induced from typing.

Yet another object of the present invention is to allow disabled, arthritic, and/or limited hand use typists, e.g., the disabled with limited finger movement, to increase their speed and use of the computer keyboard, and to reduce body, head, neck, eye, and sensory stress.

Objects Expanded

Yet another object of the present invention is to provide a method for training a student in the use of a keyboard, the method comprising the steps of:

A) providing a student an adaptable keyboard,

B) instructing the student to determine letter usage frequency,

C) instructing the student to change the key location thereby converting from the QWERTY standard to an efficient keyboard based on the letter usage frequency determined in step B, and D) instructing the student to perform a typing exercise using the new keyboard layout.

The method includes: 1) the student performing a free style typing exercise; 2) the student performing exercise by replicating a sample text to be viewed, corrected, saved, or printed; 3) placing fingers on keys as directed by a graphic representation of a plurality of boxes representing the keys or characters of the keyboard in approximate configuration of the keys of a keyboard; 4) depressing fingers on keys as directed by a graphic representation of a plurality of boxes representing the keys or characters of the keyboard in approximate configuration of the keys of a keyboard; 5) selecting at least one of the letters, keyboard or sample texts to accommodate the student's skill level, or the particular language wherein the training will be conducted, or physical disability, or ability according to the age; 6) learning the Dvorak keyboard layout; 7) selection discrimination to teach the student which keys are not to be touched; 8) saving key strokes and preserving the entry of the typist's keyboarding actions; 9) entering the student user's name for monitoring reports to note improvements or changes in ability; 10) customizing the location and selecting the most used letter keys to allow flexible selection for subject matter or language variations from English letter frequency; 11) printing out the students' typing exercise to a printer to create a hard copy; 12) locking the keyboard or refuse further entry upon erroneous entry from the student; 13) preserving the work for future reference; 14) identifying the exercise text before, during and after the exercise; 15) identifying and preserving the names of the exercise text, the user, the style of keyboard, the skill level, for use of the student or instructor, before, during, and after the instruction exercise; and 16) placing the fingers on the keys and suppressing the graphic representation of the finger placement on keys of a plurality of boxes representing the keys or characters of the keyboard in approximate configuration of the keys of a keyboard.

SUMMARY OF THE INVENTION

In accordance with the foregoing objectives, there is provided a computer keyboard having at least three rows of nine or more keys. The home row of the keyboard has at least three of the eight most used letters of the alphabet from a language which is capable of being written by the QWERTY keyboard. The upper row of the keyboard has at least three of the thirteen least used letters and the bottom row of the keyboard has at least four of the thirteen least used letters of the alphabet. The keyboard is also such that at least four and less than 26 of the keys have the same location as on the QWERTY keyboard.

In another preferred embodiment of the present invention there is provided a typing training system with an eye level display. The training system has a computer driven program having a display which has a sample text to be typed and a plurality of boxes which represent the characters of the keyboard in a configuration approximating that of the keyboard. The display enables the typist to see the location of the character to be typed in sequential order by an emphasis on the box corresponding to the key on the keyboard.

BRIEF DESCRIPTION OF THE DRAWINGS

FIG. 26 illustrates the teaching methods of the invention.

DESCRIPTION OF THE PREFERRED EMBODIMENT

Figure 1:
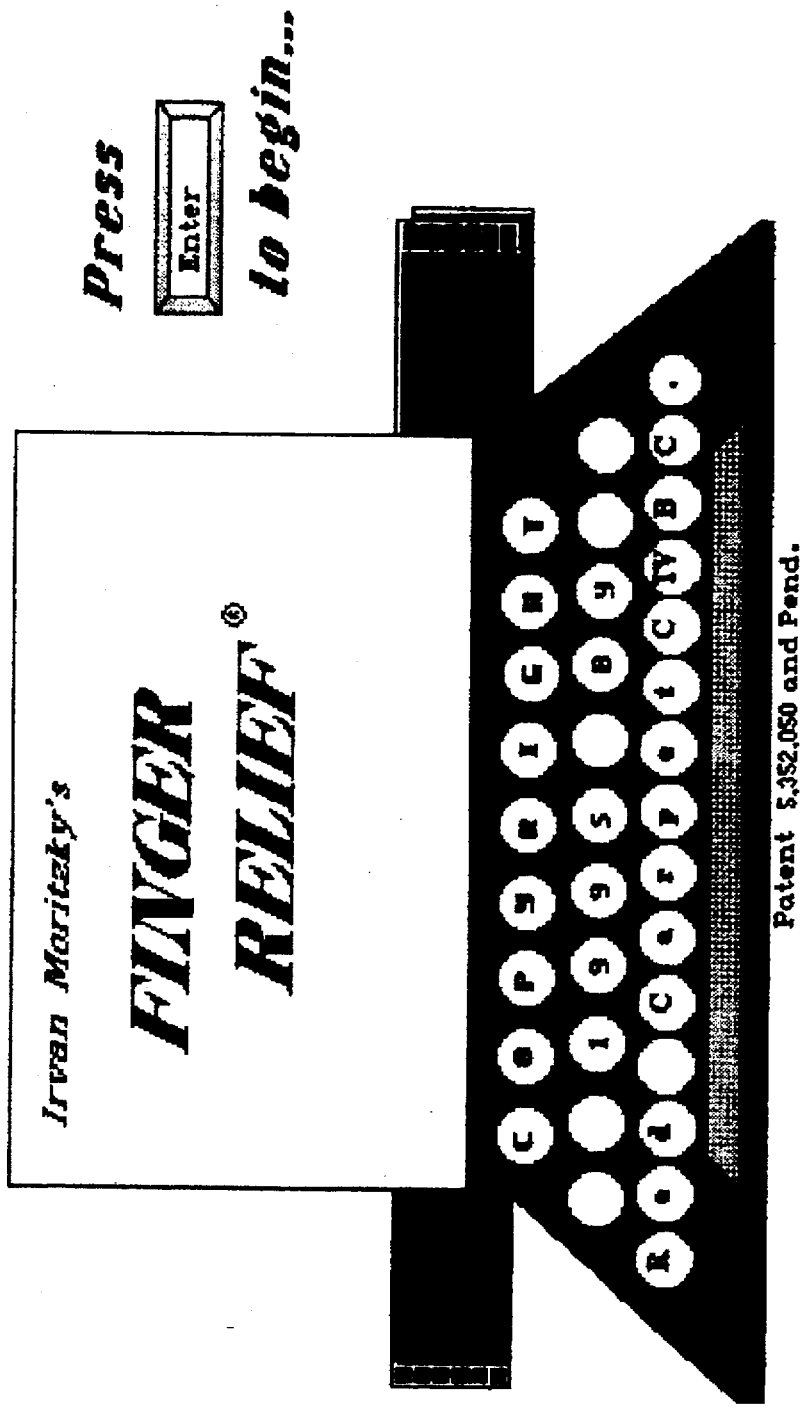
FIG. 1 illustrates the Opening page of the teaching method of invention.

"As in Red Hot" is an anagram from the 10 particularly preferred home row keys according to the invention, i.e., A, S, I, N, R, E, D, H, O, and T.

"Carpal Tunnel syndrome" refers to the compression of the median nerve (due to inflammation of flexor retinaculum, arthritis, or tenosynovitis) as it passes through the osteofibrous carpal tunnel along with the tendons of the long digital muscles which typically results in paresthesia (tingling), anesthesia (loss of tactile sensation), or hypesthesia (diminished sensation) in skin areas related to the thumb, index, middle, and lateral ½ of ring fingers. The palm may be saved due to palmar cutaneous branch arising superficial to flexor retinaculum. A progressive loss of strength and coordination in thumb with diminished use of thumb, index, and middle fingers as nerve is compressed is also common. Carpal Tunnel syndrome is relieved by partial or complete division of the flexor retinaculum."

"Finger Distance" as Calculated on 100,000 keystrokes: A typist who averages 40 words per minute typist will make 100,000 keystrokes in an 8 and a third hour day (8 hours and 20 minutes). With this definition in mind, the following list compares distances based on the QWERTY Keyboard and the "As in Red Hot" keyboard. The far left column lists the letters of the alphabet and the average number of times each will be touched out of 100,000 keystrokes. The middle column lists the distance in yards that the fingers will travel to depress the keys on the "As in Red Hot" keyboard. The far right column lists the distance in yards that the fingers will travel to depress the keys on the QWERTY keyboard.

TABLE 1

Table of distances

| Key | Keystrokes | "As in Red Hot" | QWERTY |
|---|---|---|---|
| E | 13,000 | 0 | 361.1 yds |
| T | 9,000 | 0 | 250 yds |
| A | 8,000 | 0 | 0 |
| O | 8,000 | 0 | 222.2 yds |
| N | 7,000 | 0 | 194.4 yds |
| I | 6,500 | 180.5 yds | 180.5 yds |
| R | 6,500 | 0 | 180.5 yds |
| S | 6,000 | 0 | 0 |
| H | 6,000 | 166.6 yds | 166.6 yds |
| D | 3,000 | 0 | 0 |
| W,Y,U P,C,V B,M | 19,100 | 530.5 yds | 530.5 yds |
| F,G,L | 6,900 | 191.6 yds | 63.9 yds |
| J,K,Q | 1,000 | 27.7 yds | 13.8 yds |
| ,X,Z TOTAL | 100,000 | 1096.9 yds | 2163.5 yds |

Finger distance is how far it moves forward or backward, before the downward compression of the key; then the finger merely presses down, to generate a character or impression.

A "finger foot" is 1 foot, traveled by fingers, one half inch at a time.

A "finger football field" is 100 yards, traveled by fingers, one half inch at a time, up and back, for a round trip of one inch. 100 yards is the length of a football field. Hence the name "finger football field" or just "finger field".

A "finger mile" is 1 mile, traveled by fingers, one half inch at a time.

Finger numbers—left hand little (1), ring. (2), middle (3), index (4); right hand index (5), middle (6), ring (7), and little (8).

Cumulative frequency refers to the most used letters, i.e., the letters used most often, in a particular language such as English, Spanish, German, French, Italian, etc. This is a important methodology in cryptography (i.e. decoding messages).

The frequency of single letters in the English language, in descending order, according to Laurence Dwight Smith, *Cryptography*, 1943, New York, Dover Publications is as follows: "E, T, O, A, N, I, R, S, H, D, L, C, W, U, M, F, Y, G, P, B, V, K, X, Q, J and Z.

The frequency of single letters in newspaper English language, in descending order, from Donald Milliken, *Elementary Cryptography and Cryptanalysis,* 1942, New York University Bookstore is as follows: E, T, N, R, O, I, A, S, D, H, L, C, F, U, P, M, Y, G, W, V, B, X, K, Q, J and Z. More specifically, the percentages were as follows: E-13%, T-9.3%, N-7.8%, R-7.7%, O-7.4%, I-7.4%, A-7.3%, S-6.3%, D-4.4%, H-3.5%, L-3.5%, C-3.0%, F-2.8%, U-2.7%, P-2.7%, M-2.5%, Y-1.9%, G-1.6%, W-1.6%, V-1.3%, B-0.9%, X-0.5%, K-0.3%, Q-0.3%, J-0.2%, and Z-0.1%.

Thus, by relocating keys so as to maximize frequency on the home row, one can achieve a cumulative frequency of upwards of 80% or more depending upon the particular words that are employed. In fact, it will be appreciated that if desired, one could use only the home row keys and still communicate effectively thereby achieving a home row cumulative frequency of 100%. For example, one technique frequently employed for encryption is to use only a select number of letters, e.g., 10, as the entire alphabet. Accordingly, by the term "a cumulative frequency of about 80% (or 40%)" it is not meant to refer strictly to 80% (or 40%), per se, but rather 80% (or 40%) for the "normal usage" of the full alphabet, e.g., 26 letters for English, French, Spanish, etc. However, it is also understood that this percentage can be varied as desired by, e.g., usage of fewer than the full alphabet or through a particular word selection.

High frequency keys refers to those letters of the alphabet used most in normal usage of a language. These letters provide cryptographers with clues for decoding secret messages.

Home Row—the keys on the middle row (i.e. middle bank) of keys (also the resting place of the fingertips of the two hands, index, middle, ring, and little fingers).

"jam v. t. [jammed, jam'ming] 1, thrust or squeeze in so as to stick fast; crowd so as to hinder motion or extrication.—v. i. 1, become wedged in place." Webster Handy College Dictionary, 1981.

Low Frequency keys—The letters of the alphabet that are little used.

"ob'so-lete" adj. gone out of use; out of date." Webster Handy College Dictionary, 1981. aka QWERTY keyboard.

Psychokinetic—the typist has memorized the keyboard so thoroughly as to type without looking at the board, usually using all fingers, each finger on a particular group of keys.

QWERTY—a nickname name given to C. Latham Sholes "standard" keyboard; it is an anagram from the first six letters of the top alphabet row. It is the "slow" board, because slowness prevented the type bars from clashing, and that was good in 1872. It is the "weary" board, because these wasted motions weary the fingers and arms of typists. It is now the "obsolete" or "primitive" keyboard, because its purpose has passed.

Row means a horizontal row or bank of keys on the keyboard, between nine and fifteen in number, each row arranged in parallel.

"stan'dard, n. 1, a basis of comparison; a criterion; measure." Webster Handy College Dictionary, 1981. aka QWERTY Keyboard.

Universal keyboard—aka QWERTY.

By "eye level view" or "eye level display" it is understood that the display is projected on a screen so that the user need not glance down at their fingers and/or the keys while typing.

In a particularly preferred embodiment of the present invention, twelve keys are moved from the "obsolete" keyboard to create the "As in Red Hot" keyboard. The moved keys are: E-F-G-I-J-K-L-N-O-R-T and (;) semicolon. E, R, T, O and I, formerly on the top row of the "obsolete" keyboard, are letters most used and should be placed on the home row, where they can be typed easily. The letter N, formerly on the bottom row of the "obsolete" board. N, too, should be placed on the home row. In order to place the useful letters on the home row, F, G, J, L, K, and; were swapped with the most used keys. This results in the "As in Red Hot" keyboard.

The letters E-I-O-N-R-T, (listed alphabetically) are the highest frequency letters in Modern English. They make up about 50 percent of our words. All of these are on the home row according to one preferred embodiment of the present invention. These keys are also on the home row for the "As in Red Hot" Keyboard whereas none are on the home row of the QWERTY keyboard.

According to some books on codes, to wit: *All Kinds of Codes,* by Babson, New York: Four Winds Press, 1976, p. 54-607; *Cryptography,* by Laurence Dwight Smith, 1943, New York, Dover Publications; *Elementary Cryptography and Cryptanalysis,* by Donald D. Milliken, New York University Bookstore, 1942 we learn the following:

On the average, in written English, "E" shows up about 13 percent of the time; "T"—nine percent; "O"—eight percent; "N"—seven percent; "R" and "T"—six and a half percent each. (All of these may be on the home row of the keyboard according to the present invention. None are on the Obsolete keyboard home row.)

The most often used two-letter English words (with the As In Red Hot finger assignments) are: AS(12), AT(16), BE(44), BY(45), DO(35), HE(54), IN(47), IS(42), IT(46), OF(53), ON(57), OR(58), SO(25), and TO(65). (Up to at least 11 of the 14 may be on the home row of the keyboard according to the present invention. That is, 11 of these words can be spelled solely from the letters of the home row. Only 1 is on the QWERTY keyboard home row.) Most often used of these two-letter words are: OF(53), TO(65), IN(47). (Up to at least 2 of the 3 may be on the home row of the keyboard of the present invention. None are on the QWERTY keyboard home row.)

The most often used three-letter English words (with the As In Red Hot finger assignments) are: ALL(155), AND (173), ANY(175), ARE(184), BUT(456), CAN(317), FOR (358), NOT(756), THE(654), and YOU(555). (Up to at least 4 of the 10 may be on the home row of the keyboard of this invention. Only 1 is on the QWERTY home row.) Most often used of these are AND and THE. (Both may be on the home row of the keyboard of this invention. Neither are on the QWERTY keyboard home row.)

Every English word has at least one of these letters: A-E-I-O-U-Y. (Up to at least 4 of the 6 may be on the home row of the keyboard of this invention. Only 1 is on the QWERTY keyboard home row.)

Over half of our English words begin with: A-C-H-O-S-T-W. (Up to at least 5 of the 7 may be on the home row of the keyboard of this invention. Only 3 are on the QWERTY keyboard home row.) T, the most common beginning letter, may be on the home row of the keyboard of this invention, but it is not on the QWERTY keyboard home row.)

Because of their frequent use, the letters E-T-A-O-N-I-R and S are on most lists of eight most common English letters. When maximizing the frequency of usage on the home row, we must look for 10 letters (5 for each hand) for a home row, differences arise for spots 9 and 10. Should the top 10 spots included "H" or "U"? "C" or "D"? "U" or "Y"? Because Sholes put A-S-D-H and L on the home row, these are candidates for retention in the top ten. These are candidates for retention because it is important to make as few changes from the QWERTY keyboard as possible so that everyone who is presently accustomed to the QWERTY keyboard may switch to the keyboard of this invention with a minimum amount of work and memorization. A and S are clearly required. D, H and L are better candidates than C, U and Y which are not on the home row of the Obsolete keyboard. It makes little difference whether one of either D, H or L is dropped off the home row to make room for the 6 most used letters E-I-O-T-N-R. Thus, for example, the keyboard can keep D and H and move L to the bottom row in which case the keyboard might appear as in Lists 1, 2, and 3, below.

The present invention has as an advantage the reduction of the human cost of the 1872 technology currently employed in most keyboards. For example, a 40 word per minute typist will make 200 keystrokes a minute, 12,000 an hour, or 100,000 in an 8⅓ hour day. On the obsolete keyboard, the fingers will have traveled 1,000 yards more than, e.g., the "As in Red Hot" keyboard (using conversational English). In other words, the "As in Red Hot" keyboard allows the fingers of a 40 word per minute typist to shorten their work or travel by 10 "finger football fields" a day.

Similarly, the "As in Red Hot" keyboard allows fingers of an 80 word per minute typist to shorten work by 2,100 yards per day, or 21 "football finger fields". In a weeks time, that is 105 "finger fields", or nearly 6 "finger miles". In a year, the typist's fingers have traveled 300 "finger miles" farther on QWERTY. That is 3,000 miles in a decade, or a "finger United States".

The obsolete keyboard can even create an occupational hazard known as repetitive stress disorder. One manifestation is a medical disability termed "Carpal Tunnel Syndrome," which is a wrist injury.

Thus, an additional advantage of the present invention is the protection of the carpals from stress injury. The carpals are 8 wrist bones. There are 17 tendons in the wrist. Tenosynovitis is an inflammation of the tendon sheaths. There are 9 major nerves, arteries and veins in the wrist. There are also several sheaths and ligaments in the wrist. By reducing the amount of stress and work that the fingers, hands, wrists, etc. must perform during typing, the present invention can drastically reduce the incidence of injury associated with typing using the QWERTY keyboard.

Additionally, the present invention also has the advantage of rearranging the training keyboard to accommodate the disabled or one handed typist, who should want a home row of the 6 most used keys, that is E, T, A, O, N, and I, or R.

The present invention also has the unique advantage of accommodating the habits learned on QWERTY keyboard. For example, it is possible to switch just one letter, e.g., "E" for ";", and substantially increase the cumulative frequency of the home row. Similarly, if a very high cumulative frequency on the home row is desired with a minimum of rearrangement of the QWERTY keyboard, the "As in Red Hot" keyboard is highly advantageous. In particular, the "As in Red Hot" keyboard places frequently used keys on the home row, with little difference from the "QWERTY" keyboard. For the QWERTY proficient typist, "As in Red Hot" retains the location of 15 QWERTY keys, compared to, e.g., the Dvorak keyboard which retains only 3 QWERTY keys. Quite surprisingly, this makes the "As in Red Hot" keyboard arrangement five times easier to learn than the Dvorak keyboard. This advantage cannot be understated considering the inherent unwillingness of most people to "relearn" how to type on a new keyboard once they have become proficient on the QWERTY keyboard.

The keyboard of the present invention is surprisingly user friendly. Recognizing that millions of people have learned the obsolete board, only those keys were changed which were needed to place the most used keys on the home row. For example, the "As in Red Hot" keyboard appears as follows:

|  | 1 2 3 4 5 6 7 8 9 0 |
|---|---|
|  | Q W F G J Y U K : P |
| Home Row | A S D E I H O T N R |
|  | Z X C V B L M , . |

In contrast, the QWERTY keyboard arrangement appears as follows:

|  | 1 2 3 4 5 6 7 8 9 0 |
|---|---|
|  | Q W E R T Y U I O P |
| Home Row | A S D F G H J K L ; |
|  | Z X C V B N M , . |

The present invention also provides a training system having a video display at the eye level of the user. The display is projected on the screen, e.g., cathode ray tube, television screen, liquid crystal display, monitor or the like. The eye level view allows the user to not look at the fingers or keys for guidance. This saves the time of looking down away from the material, referring to the keyboard to locate every letter as the typist practices the samples of letters and articles.

The display includes over 40 boxes to represent keys found on most keyboards, such as the 26 letter alphabet in 3 rows (abcdefghijklmnopqrstuvwxyz), and Arabic numerals in a 4th row (1234567890), plus space bar, tab, control, and alternate key.

The display is user friendly in that it has additional useful information. The information can be seen by touching a function key which is identified in a helping menu. The menu allows the creation of custom keyboards. These custom keyboards can be changed by relocating with each of the letters of the alphabet. If a typist is missing the use of any fingers, the home keys can be arranged to place the most useful letters (E-T-A-O-N-I-R) where they can be reached by the useable fingers.

The display shows three lines of text for copying. The text scrolls (or changes) with the entry of the letters by the typist. Errors (depressing the wrong key out of order) are noted with an audible tone (the computer makes a noise.) The next letter to be typed is emphasized (e.g., a bold box in the example, but a bold letter, a different color, a flashing or moving letter, underlined or overlined, cursor marked, enlarged or reduced, bracketed, slanted, narrowed or fattened, etc.)

The system monitors data entry speed (typing speed) and reports it to the student, or proctor. The system can also monitor typing errors.

Sample texts are stored with the system to serve as textual data for the typist trainee to copy.

The system can work with monochrome or color monitors.

Using the typing training system according to the present invention, it takes only about 8 hours to learn, for example, the "As in Red Hot" keyboard arrangement if the typist is already familiar with the QWERTY keyboard. U.S. Pat. No. 4,655,621 issued to R. Holden in 1987, at column 2 indicates that QWERTY takes 60 hours of class training to learn. This is about 180,000 keystrokes (assuming 10 words per minute). The learning is controlled by the letters typed least frequently, to wit: z (0.1%); j (0.2%); q (0.3%); k (0.3%); and x (0.5%). In 180,000 keystrokes, those letters are keyed as follows: z 180 keystrokes, j 360 keystrokes, and q and k 540 keystrokes each. But the location of z, q, and x do not need to be practiced, as they have not moved from QWERTY to, e.g., "As in Red Hot". And, because the most used keys are on the home row, fingers may depress keys with half the effort than before.

It will be noted that the keyboard arrangements of the present invention have been described above primarily in terms of the "As in Red Hot" arrangement as it beautifully exemplifies the unique advantages of the many arrangements possible according to the invention. However, there are an entire host of arrangements that are also possible according to this invention.

Likewise, if the word processing entry is in a language other than English, the letter frequency changes with the language. And, as the present invention also contemplates arrangements that increase cumulative frequency on the home row for typists of all languages, the letter frequencies of other common languages, e.g., English, French, German, Italian, and Spanish, are compared in the following lists:

EXAMPLES

List 1: ADEHINORST ("As in Red Hot") (These are the 10 most frequently used letters in American English.) These ten letters combined have a cumulative percentile frequency in English of 74, in French of 72, in German of 69, in Italian of 73, and in Spanish of 69. The other 16 letters of the alphabet (BCFGJKLMPQUVWXYZ) have a cumulative percentile frequency in English of 26, in French of 28, in German of 31, in Italian of 27, and in Spanish of 31.

List 6: ACDEILNORS (Best for Spanish.) (Substitutes "C" for "H" and "L" for "T". In Spanish the letter "T" is a seldom used letter.) These ten letters combined have a cumulative percentile frequency in English of 68, in French of 74, in German of 64, in Italian of 74, and in Spanish of 75. The other 16 letters of the alphabet (BFGHJKMPQTUVWXYZ) have a cumulative percentile frequency in English of 32, in French of 26, in German of 36, in Italian of 266, and in Spanish of 25. (This is useful for geography because of Spanish names in southern and western United States.)

List 12: ACEILNORST (Best for Italian.) (Substitutes "L" and "C" for "D" and "H".) These ten letters combined have a cumulative percentile frequency in English of 73, in French of 76, in German of 65, in Italian of 78, and in Spanish of 73. The other 16 letters of the alphabet (BDFGHJKMPQUVWXYZ) have a cumulative percentile frequency in English of 27, in French of 24, in German of 35, in Italian of 22, and in Spanish of 27. (This is useful for Classical music, opera, and electrical sciences due to prominence of Italian origins.)

List 15: AEILNORSTU (Best for French.) (Substitutes "U" and "U" for "D" and "H".) These ten letters combined have a cumulative percentile frequency in English of 70, in French of 78, in German of 65, in Italian of 78, and in Spanish of 72. The other 16 letters of the alphabet (BCDFGHJKMPQVWXYZ) have a cumulative percentile frequency in English of 30, in French of 22, in German of 35, in Italian of 78, and in Spanish of 72. (Useful for diplomacy, cooking, microbiology subjects.)

List 17: ADEILNORST (Substitutes "L" for "H".) (Another best for English, along with List 1. Best all around arrangement for the 5 languages.) These ten letters combined have a cumulative percentile frequency in English of 74, in French of 77, in German of 67, in Italian of 77, and in Spanish of 74. The other 16 letters of the alphabet (BCFGHJKMPQFVWXYZ) have a cumulative percentile frequency in English of 26, in French of 23, in German of 33, in Italian of 23, and in Spanish of 27.

List 18: ADEHINRSTU (Best for German.) (Substitutes "U" for "O".) These ten letters combined have a cumulative percentile frequency in English of 69, in French of 71, in German of 72, in Italian of 64, and in Spanish of 63. The other 16 letters of the alphabet (BCFGJKLMOPQVWXYZ) have a cumulative percentile frequency in English of 31, in French of 29, in German of 28, in Italian of 36, and in Spanish of 37. (Useful for chemistry and Yiddish.)

It will also be appreciated that the above lists are merely exemplary of a number of the keyboard arrangements according to the present invention. Thus, the above lists are meant as samples of arrangements according to the present invention and are not meant to limit the scope of the many arrangements that are contemplated by the present invention.

1. Additional Example

The Obsolete Keyboard

Twenty years ago, the following was written: "One of the most important things about a typewriter is the arrangement of the letters on the keyboard. A typist becomes used to a certain arrangement, and if different machines had different arrangements it would be hard to use more than one particular make of machine. Yet in the early days there were many different arrangements. Gradually these came down to two popular ones, called the 'universal' and the '[obsolete].' Finally the '[obsolete]' keyboard was adopted by all manufacturers."

| "The [obsolete] keyboard arrangement is: | |
|---|---|
| Home Row | 1 2 3 4 5 6 7 8 9 0<br>Q W E R T Y U I O P<br>A S D F G H J K L ;<br>Z X C V B N M , . |

"The problem in designing a typewriter keyboard is this: Some letters of the English language are used more often than others, and some combinations of letters are used more often than others. The keyboard should place the most-used letters where they are easiest to reach with the fingers, but it should separate the letters of the most-used combinations. For example, the combination TH is used a great deal (in such words as the, that, than, this, thing, and so on) while the combination TQ is never used. If the T key and the H key were too close together, the type bar for H would always be striking the type bar for T."

"Sholes, the inventor, worked out the [obsolete] keyboard. It prevents most clashes between type bars, but in other ways it is very poor. The forefinger and middle finger of the hand are the ones we can use best, and the most-used letters should be where these fingers can reach them most easily, but on the [obsolete] keyboard many of the most-used letters are at the sides where they are within easy reach of the little finger but not of the middle fingers."

"Many people have worked out better keyboard arrangements, but so many millions of people have learned the [obsolete] keyboard that it would cause them a great deal of trouble if the arrangement were changed." Source: *Illustrated World Encyclopedia*, Vol 14, 1970, Glen Cove, N.Y., p. 4694 et seq.

The "As in Red Hot" keyboard has been learned by pre high school age students, and an adult male. The males were touch typists, both in QWERTY, with the adult male also proficient in Dvorak. The As in Red Hot keyboard has been used in hundreds of hours of writing, and proved beneficial as a relaxed and easier to learn method of keying in data, and typing with reduced strain.

The "As in Red Hot" keyboard can be learned in about a eight hours of typing.

In the 1980's, the Headquarters U.S. Air Force administrative offices at the Pentagon attempted to adopt Dvorak. However, due at least in part to the difficulty in learning the essentially "entirely new" Dvorak keyboard, the attempt was abandoned.

2. Additional Example

"University of Minnesota researchers estimate between 400,000 and 500,000 carpal tunnel surgery cases occur annually in the United States, with economic costs in excess of $2 billion a year." Palm D H et al., "Social and economic costs of carpal tunnel surgery," Instructional Course Lecture, 1995, Vol. 44, pp. 167–72. Cited in CTDNews, Nov. 1995, Vol. 4, No. 11.

Read what others say about QWERTY! "awkward . . . designed to slow typing" Quantification of Tendon Excursion &c, by Flannery, Robertson, and Cooper, in Conference Proceedings, 19th Annual Meeting of the American Society of Biomechanics, August 1995, at 195 held at Stanford Univ.

"worse possible arrangement" Typists' Speed & Efficiency, by Virginia Russell, Computer Technology Review, Winter 1985.

"very poor" Illustrated World Encyclopedia, Vol 14, 1970, Glen Cove, New York, p. 4694.

"wrong thing" interview in Conquering the Keyboard, by Robert Alonso, Personal Computing, August 1985, at 72.

"costly . . . error . . . slows . . . produces fatigue" U.S. Pat. No. 3,847,263, 1974, col. 1, USPTO.

"inefficient" U.S. Pat. No. 4,655,621, 1987, column 1, USPTO.

"not the best . . . [makes] much more work" 1994 Compton's Encyclopedia, Typewriter p. 342.

See "The Case Against QWERTY" at National Museum of American History, Smithsonian Institution, Wash. D.C. 1992.

"confidence tricks" [or scam] Century of the Typewriter, by Wilfred A. Beeching, (New York: St. Martin's Press, 1974), pgs. 14 to 47. The following history is from Century of the Typewriter. In 1829, William Burt patented a 'typographer' that used ink pads. In 1832, Giuseppe Ravizza of Novara, at age 19, started designing. By 1837 he had a machine. By 1858, at Jurda Exhibition, he won the silver medal for a writing harpsichord. In 1867, Ravizza added a bell at the end of the line of type, which ring would tell the typist to stop or change lines before continuing typing. Ravizza also made the first practical use of travelling inked ribbon, instead of using carbon paper. By 1883, Ravizza applied for a patent for the "visible writer", but he had been beaten by the Remington Model 2. In 1867, Christopher Lathom Sholes, a typesetter, and Carlos Glidden, invented and displayed the first commercially produced typewriter, with three rows of capital letters and numbers. Sholes started by arranging the keys alphabetically, but Sholes had exhausted his skill and patience in trying to solve the key jamming problem of the keyboard layout. As a typesetter, Sholes knew the frequency of usage of letters in English. His brother-in-law suggested moving the most frequently used keys away from the home row to slow the typing, and thus relieve the key jamming problem. Lost productivity was transferred from the machine to the user. Sholes thus created the QWERTY keyboard. According to Beeching, Sholes' ruse was "probably one of the biggest confidence tricks of all time . . . the idea that the so-called 'scientific arrangement' of the keys was designed to give a minimum movement of the hands was, in fact, completely false!" In 1873, the Remington Company bought Sholes' patent for the 'typewriter' and began shipping it in 1874. By 1878, the typewriter included Capital and small letters. In 1905 an international conference of typewriter manufacturers and teachers decided the future of print communication. The QWERTY layout was adopted for the standard keyboard on the typewriter because typing teachers had been teaching QWERTY for decades. According to Beeching: "The battle raged backwards and forwards. Nobody could agree on what a new keyboard should be, but the biggest opposition came from teachers of typing. As it still does today. They wanted things to remain as they were, and they are still the most reluctant to change their methods and learn all over again. All present keyboards are, therefore, based on the 'QWERTY' layout." (New York: St. Martin's Press, 1974, pg. 40–41.

3. Comparing Examples

Researchers recently compared different keyboard layouts' (to wit QWERTY, DVORAK and AsInRedHot) potential for injury, by comparing tendon movement within the carpal canal. Results from the study were printed in the Conference Proceedings of the 19th Annual Meeting of the American Society of Biomechanics held at Stanford University, and sponsored in part by NASA and the Department of Veterans Affairs. (The paper's title: "Quantification of Tendon Excursion Through Kinematic Analysis of Typing Movements on Alternative Keyboard Layouts". The paper acknowledges partial funding by the U.S. Department of Education, Rehabilitation Services Administration.)

One finding in the paper is that angular movements of the fingers placed greater stress on the carpal tunnel than just simply depressing a key. "While the amount of movement on a particular key is exactly the same in the keyboards we used, the problem is the large number of times you have to go to the top and bottom rows using QWERTY. As soon as you move from the home row, you increase the angular motion of the fingers and sliding motion of the tendons, which increases the potential for CTDs. Our hypothesis was that excessive tendon motion in the carpal canal induces trauma to the nearby tissues. It appears that alternative key location is a good way to reduce finger and tendon motion." Dr. Richard Robertson of the University of Pittsburgh Medical Center, as quoted in CTD News April 1995.

Carpal Tunnel Syndrome (CTS) is thought to be caused by swelling of the flexor tendons and compression of the median nerve within the carpal canal. The main structures in close proximity to the median nerve are the finger flexor tendons—Flexor Digitorum Profundus and Superficialis. Thickening of the flexor tendon sheaths, secondary to repetitive motion, has been implicated as a cause for compression of the median nerve (Werner et al. 1983). Cyclic loading tests on the profundus tendons have shown that stress transmitted to the sheath during excursion is significant and a cause of cumulative strain (Goldstein et al 1967). These findings may indicate that the highly repetitive sliding motion of the tendons through the canal might not only produce tendinitis or tenosynovitis but focal damage to the nerve as well. (Quantification Paper, p. 195)

The angle data was incorporated into the predictive model developed by Armstrong and Chaffin (1978). The model relates the finger and two extrinsic finger flexors, profundus and superficialis, as a pulley system dependent on the joint angle and tendon moment arm. Joint thickness measurements were taken of each subject as described in the Collation of Anthropometry (Garrett et al. 1961). (Ibid.)

The goal of the study was to characterize total tendon motion for typing a matched sample on the QWERTY, DVORAK and ASINREDHOT layouts and provide a preliminary survey of the results. (Ibid.)

Subjects 1 and 2 showed consistent results with the DVORAK and ASINREDHOT layouts requiring less total tendon excursion than typing on the QWERTY layout. (Ibid.)

4. Help Examples

Keyboard users afflicted with these disabilities will be helped by the invention in reducing finger extension and flexion, as compared to QWERTY. Definitions and descriptions are from *Blakiston's New Gould Medical Dictionary*, copr. 1890–1956, McGraw-Hill Book Company, Inc. New York, Toronto, London; Editors Normand Hoerr, M. D., Arthur Osol, Ph.D. and 88 contributors. Causes and sources, or associated metabolic and non-metabolic conditions of CTS listed in "When to suspect—and how to make the diagnosis: Carpal Tunnel Syndrome." Consultant, December, 1993, Vol. 33; No. 12 ; Pg. 40; by McCue, Frank C., Mayer, Vi A. Copr. Cliggott Publishing Company 1993. Cited as "When to suspect (CTS)" in Consultant 33:12:40. Causes of CTS listed in "Carpal tunnel syndrome: a practical review; includes patient information sheet." American Family Physician May 1, 1994 Vol. 49; No. 6; Pg. 1371; by: Richard T. Katz. Copr. 1994 American Academy of Family Physicians. Cause of CTS cited in "(CTS) review" in American Family Physician 49:6:1371.

Aberrant anatomy (L. aberrare, to wander from). Varying or deviating from normal in form. Cause of CTS cited in "(CTS) review" in American Family Physician 49:6:1371.

Amyloidosis (G. amylon, pertaining to starch; eidos G. condition). Widespread deposit of amyloin, a complex protein deposited in tissues, of a hyaline structureless nature. It stains brown. Amyloid results from degeneration of tissue and infiltration of unknown substances. Blakiston's New Gould Medical Dictionary. Cause of CTS listed in "When to suspect (CTS)" in Consultant 33:12:40; and "(CTS) review" in American Family Physician 49:6:1371.

Acromegaly (G. akros, extremity, megas, great). Chronic condition from hyperfunction and hyperplasia of the eosinophilic cells of the adenohypophysis; features are increase size viscera (splanchnomegaly), the soft parts, and bones, especially short and flat bones (acromegaly) without increase in height; hands, feet, and face show most change; metabolic disturbance, change in sugar tolerance, and secondary changes in other endocrine organs. Blakiston's New Gould Medical Dictionary. Cause of CTS cited in "(CTS) review" in American Family Physician 49:6:1371.

Acrosclerosis (G. akron, extremity, G. sklerosis, hardening). Scleroderma affecting the hands and extending to the upper extremities and the face; seen usually as a sequel of Raynaud's syndrome. FIG. 281, 464. Blakiston's New Gould Medical Dictionary.

Apoplexy (G. apoplexia, to cripple by a stroke). The symptom complex resulting from hemorrhage into or upon the brain, or from embolism or thrombosis of the cerebral vessels, consisting of sudden onset of coma, and focal neurological signs. Bulbar apoplexy—due to hemorrhage into the substance of the medulla oblongata or pons, causing paralysis of one on both sides of the body, inability to swallow, difficulty in protruding the tongue, dyspnea, gastric disorders, and disturbed heart action. Sanguineous apoplexy. Hemorrhage into on upon the brain; true apoplexy. Blakiston's New Gould Medical Dictionary.

Artery—Persistent/thrombosed median artery (G. thrombos, lump). Thrombus is a clot of blood formed within blood vessel, due usually to a slowing of the circulation or alteration of the blood or vessel walls. Blakiston's New Gould Medical Dictionary. The median artery parallels the median nerve through the carpal tunnel. Cause of CTS cited in "(CTS) review" in American Family Physician 49:6:1371.

Arthritis or wrist malalignment (G. arthron, joint; itis, inflammation). Inflammation of joints—Significance: There are Sixty (60) joints in the 2 hands. FIG. 201, 202. Acromegalic arthritis—A degenerative disease of the joints due to acromegaly. Arthritis of rheumatic fever—Acute, reversible, migratory synovitis of short duration occurring during exacerbations of rheumatic fever. Gonorrheal arthritis—A specific, blood-borne, gonococcal infection in joint tissue. May be mild and transient, or severe, becoming purulent and leading to bony ankylosis. Gouty arthritis—Sudden severe, painful attacks, often at night, complete recovery or repeated attacks with degenerative joint disease. Heberden's arthritis—Degenerative joint disease of the terminal joints of the fingers, producing enlargement and flexion deformities. Most common in women, occurring idiopathically and as a result of heredity. May result from trauma. Hematogenous Arthritis—An arthritis presumably caused by blood borne pneumococcus on gonococcus infection. Hemophilic Arthritis—Inflammation due to blood in the joint of a hemophiliac. Repeated episodes lead to thickening of the synovial tissues and finally to degenerative joint disease. Menopausal arthritis—Degenerative joint disease, an arthralgia without objective or roentgenographic evidence of disease, occurs in women at menopause. Neurotrophic arthritis—trophic disease of joints, seen in tabes dorsalis, leprosy, syringomyelia, and other disease of the nervous system. There is marked enlargement and disorganization of joint structures and hypermotility, usually painless, also called neuropathic arthritis and Charcot's arthritis. Rheumatoid arthritis—chronic arthritis of unknown etiology, affects multiple joints, producing constitutional effects such as debility, weakness, loss of weight; specific lesion is a proliferation of granulation or connective tissue in synovial and periarticular tissues over the joint surfaces and in subchondral spaces; pain, limitation of motion, deformity, bony ankylosis, also called atrophic arthritis, chronic infectious arthritis, proliferative arthritis. Scarlatinal arthritis—scarlet fever epidemics, usually appearing after 10 days with redness, pain, swelling of the wrists, hands FIG. 281, 464, elbows FIG. 200, and knees due to synovial distention, also called scarlatinal synovitis. Syphilitic arthritis—painful and swollen joints due to syphilis, during secondary stage or gumma of the joint, symmetrical synovitis associated with prenatal syphilis. Blakiston's New Gould Medical Dictionary. Cause of CTS cited in "(CTS) review" in American Family Physician 49:6:1371.

Brachialgia (L. brachium, arm; G. algos, pain). Severe pain in arm or brachial plexus. Blakiston's New Gould Medical Dictionary.

Burn victims—loss of movement in fingers and hands, due to scarring.

Calcium deposits (L. calx, lime). Calcium is a brilliant, silver white metal, with a strong affinity for oxygen. Blakiston's New Gould Medical Dictionary. Cause of CTS cited in "(CTS) review" in American Family Physician 49:6:1371.

Canal congenitally small (L. congenitus, born together with, existing at birth). The carpal canal is the space beneath the flexor retinaculum of the wrist and above the volar aspect of the carpal bones, and transmits the tendons of the long flexor muscles and medial nerve. Cause of CTS cited in "(CTS) review" in American Family Physician 49:6:1371.

Canal volume decreased Cause of CTS cited in "(CTS) review" in American Family Physician 49:6:1371.

Canal volume increased Cause of CTS cited in "(CTS) review" in American Family Physician 49:6:1371.

Cardiac failure—see heart failure.

Carpal Tunnel Syndrome (G. karpos, wrist). Pressure on the median nerve in wrist to cause tingling or numbness in fingers, usually III, IV, and V. Surgical solutions include cutting the Ligament Carpal Dorsale (Transverse Carpal Ligament.) Blakiston's New Gould Medical Dictionary.

Cerebral palsy—See palsy.

Cervical radiculopathy (L. cervix, neck; radicula, small root; pathos, disease). Disease of the roots of the spinal nerves in the neck. Blakiston's New Gould Medical Dictionary. Cause of CTS cited in "(CTS) review" in American Family Physician 49:6:1371.

Diabetes (G. diabetes, from diabainein, to pass through)—A disease characterized by the habitual discharge of an excessive quantity of urine and by excessive thirst. Diabetes mellitus. An inheritable, constitutional disease of unknown cause, characterized by the failure of the body tissues to oxidize carbohydrate at a normal rate. The metabolic disturbance, which has as its most important factor a deficiency of insulin, manifests itself in an excess of sugar in the blood (hyperglycemia), presence of sugar in the urine (glycosuria), and in more advanced stages, acidosis (ketosis) and coma, with symptoms of intense thirst and hunger, weakness, and loss of weight. The disease may be further attended in later life by degenerative changes such as arteriosclerosis, cataract, neuritis. Blakiston's New Gould Medical Dictionary. Cause of CTS listed in "When to suspect (CTS)" in Consultant 33:12:40.

Edema (G. oidema, swelling) Dropsy, excessive accumulation of fluid in the tissue space, due to change in the mechanisms of fluid exchange. There may be a decrease of osmotic pressure of the plasma from reduction in protein concentration, increased hydrostatic pressure in the capillaries due to cardiac failure, increased permeability of the capillary walls from injury or inflammation, or there may be obstruction of the lymph channels. Blakiston's New Gould Medical Dictionary. Cause of CTS cited in "(CTS) review" in American Family Physician 49:6:1371.

Epicondylitis (G.epi, on, upon; kondylos, knuckle; itis, inflammation). Inflammation of an epicondyle, specifically, that of the humerus; often applied to synovitis of the radiohumeral articulation. Also called radiohumeral bursitis, radiohumeral epicondylitis. Blakiston's New Gould Medical Dictionary.

Finger (AS. digit of hand). Baseball finger—luxation of distal phalanx with rupture of distal portion of extensor tendon, resulting in drop of phalanx, caused by baseball injury. Clubbed finger—terminal phalanx is short and broad with overhanging nail, seen in pulmonary and cardiac disease, also called Hippocratic finger, chronic hypertrophic pulmonary osteoarthropathy, drumstick finger Hammer finger—congential flexion deformity, usually of middle phalanx of middle finger. Lock finger—Peculiar affection of the fingers in which they become fixed in flexed position, due to presence of small fibrous growth in the sheath of the flexor tendon. Mallet Finger—deformity marked by undue flexion of last phalanx. Seal Finger—Infection in Norway believed to be contracted from seals, characterized by glistening appearance of swollen finger. Spider finger—abnormally long, also called arachnodactyly, Marfan's syndrome, dolichostenomelia. Springfinger—Obstruction to flexion and extension of one or more fingers, due to injury or inflammation of tendinous sheaths. Trigger finger—the flexion or extension of a finger is first obstructed, but finally accomplished with a jerk or sweep, due to chronic tenosynovitis. Webbed fingers—Union of adjacent fingers by interdigital tissue, fingers fused at the lateral aspects, also called syndactyly. Blakiston's New Gould Medical Dictionary. Flexor superficialis muscle, Distal extension of the. (L. Distare, to be distant) Cause of CTS listed in "(CTS) review" in American Family Physician 49:6:1371.

Fracture (Acute) or callus from healing fracture (L. callus). An area of hardened and thickened skin, as a hypertropyhic reaction of the epidermis to pressure and friction. New growth of incompletely organized bony tissue surrounding the bone ends in fracture, a part of the reparative process. Blakiston's New Gould Medical Dictionary. Non-metabolic disorder associated with CTS listed in "When to suspect (CTS)" in Consultant 33:12:40; and "(CTS) review" in American Family Physician 49:6:1371.

Ganglion (G. gagglion, encysted tumor on a tendon). Benign tumor. A cystic tumorlike localized lesion in a tendon sheath or joint capsule, especially the wrist. It is composed of stellate cells in a matrix of mucoid hyaluronic acid and reticular fibers. Also called cystic tumor of tendon sheath, cyst of joint capsule, cyst of semi-lunar cartilage, weeping sinew. Blakiston's New Gould Medical Dictionary. Non-metabolic disorder associated with CTS listed in "When to suspect (CTS)" in Consultant 33:12:40.

Gout (OF Goute from L. gutta, drop)—constitutional hereditary condition of uric acid metabolism, associated with high blood level and decreased urinary excretion of uric acid often with fever and leukocytosis; sudden attack of acute, painful arthritis, at irregular interval, with remission between attacks. Usually one joint, great toe most common. Tophaceous gout—Condition associated with deposits of sodium urate (tophi) in the skin over the cartilage of the ear and about the fingernails and in the cartilage of the joints. Remember Sixty (60) joints in hands, FIG. 201, 202. Blakiston's New Gould Medical Dictionary. Metabolic condition associated with CTS listed in "When to suspect (CTS)" in Consultant 33:12:40.

Gouty tophus—See Gout. Cause of CTS listed in "(CTS) review" in American Family Physician 49:6:1371.

Heart failure, congestive (L. congestio, from congere, to heap up). An abnormal collection of blood in a part or organ, hyperemia. The syndrome resulting from failure of heart as a pump. Also called Backward cardiac failure, due to the inability of the heart to pump out the blood being returned to it by the veins. Blakiston's New Gould Medical Dictionary. Cause of CTS listed in "(CTS) review" in American Family Physician 49:6:1371.

Hematoma (G. haima, blood) A focalized extravasation of blood, which soon clots to form a solid mass and readily becomes encapsulated by connective tissue, of a size to be a visible, tumorlike swelling, due to traumatic injury or other rupture of blood vessel. Blakiston's New Gould Medical Dictionary. Cause of CTS listed in "(CTS) review" in American Family Physician 49:6:1371.

Hypertension (G. hyper, beyond, above, over; L. tensio, a stretching). Excessive tension, usually with high blood pressure. Blakiston's New Gould Medical Dictionary. Non-metabolic disorder associated with CTS, as listed in "When to suspect (CTS)" in Consultant 33:12:40.

Hypothyroidism (G. hypo, under; G. thyreoeides, shield-shaped). A morbid condition due to deficiency of thyroid hormone, in advanced form expressed as cretinism or myxedema. Blakiston's Mew Gould Medical Dictionary. Cause of CTS listed in "(CTS) review" in American Family Physician 49:6:1371.

Lipoma (G. lipos, fat; oma, tumor). A tumor, which in the gross is obviously fatty; microscopically composed of fat cells, usually of mature form but occasionally in part or wholly of embryonal type. Cause of CTS listed in "(CTS) review" in American Family Physician 49:6:1371.

Malignant tumors (L. malignus, wicked, malignant) Virulent, threatening life. Cause of CTS listed in "(CTS) review" in American Family Physician 49:6:1371.

Mass lesion (G. maza, barley cake, L. laesio, a hurting). Morphological alteration due to injury. Cause of CTS listed in "(CTS) review" in American Family Physician 49:6:1371.

Menopause. (G. men, month; G. pausis, a stopping). The physiologic cessation of menstruation, usually between 45th and 50th years. Metabolic condition associated with CTS listed in "When to suspect (CTS)" in Consultant 33:12:40.

Muscular Dystrophy—(dys—G. hard, bad, unlucky, trophe G. nourishment). A progressive familial hereditary disorder, marked by atrophy and stiffness of the muscles, and observed when voluntary action is first attempted. Also called dystrophia myotonica, myotonic dystrophy, myotonia dystrophica, Steinert's disease. Loss of movement in fingers and hands FIG. 202, 281, 464. Blakiston's New Gould Medical Dictionary.

Myeloma, multiple (G. myelos, bone; oma, tumor). Kahler's disease. A primary malignant tumor of bone marrow, composed of tumor cells, which are uniform, small and superficially resemble plasmacytes, or dominated by variegated, large cells. Characterized by diffuse osteoporosis or areas of bone destruction often resulting in pathologic fractures and bone pain, by anemia, hyperglobulinemia, the finding of Bence-Jones protein, hypercalcemia, and increased number of cells resembling immature plasmacytes in bone marrow. Also called erythroid m., hemic m., lymphocytic or lymphoid m., myeloid m., plasma cell m., plasmacytic or plasmocytic m., plasmacytoma, plasmocytoma, plasmona, plasmacytic or plasmocytic sarcoma, myelocytic sarcoma, or myeloid tumor. Cause of CTS listed in "(CTS) review" in American Family Physician 49:6:1371.

Nerve with minimal compression (double crush)—Cause of CTS listed in "(CTS) review" in American Family Physician 49:6:1371.

Obesity (L. obesitae, fatness). Weight excess, due to accumulation of fat, beyond 10 to 20 per cent of normal range for particular age, sex and height. Metabolic condition associated with CTS listed in "When to suspect (CTS)" in Consultant 33:12:40.

Osteoarthritis. (L. osteon, bone; inflammation). Degenerative joint disease. Cause of CTS listed in "When to suspect (CTS)" in Consultant 33:12:40.

Osteoporosis (G. Osteon, bone; G. poros, passage; osis, condition). Enlargement of the marrow and Haversian spaces of the bone at the expense of the solid parts. Trabeculae become fewer and thinner; compact bone tends to resemble cancellous, with resulting fragility. Disuse Osteoporosis—Demineralization with loss of matrix, involving the bones of all on a part of an extremity in which function has been impaired, or the entire skeleton when total physical activity is limited. Senility, menopause, and systemic disease are predisposing conditions. Malnutrition Osteoporosis—That resulting from negative mineral and nitrogen balances and deficiencies of vitamins essential for maintenance of proper calcium and phosphorus distribution in the body and for ossification. Postmenopausal Osteoporosis—A diffuse osteoporosis, often severe, chiefly involving the spine and pelvis, which may follow artificial or physiological menopause, and is caused by the hormonal deficiency and concomitant inadequate bone formation. Senile Osteoporosis—Osteoporosis in the aged, due to deficient osteoid formation. Blood calcium, phosphorus, and phosphatase levels are all normal or low. Blakiston's New Gould Medical Dictionary. Remember Osteoporosis is cause for 200,000 wrist fractures a year, in U.S., mostly in women, FIG. 201, per Newsday/Times Mirror, Nov. 29, 1994)

Palmaris longus tendon, abnormal (L. palm, palm). Two muscles, palmaris longus and palmaris brevis, are inserted into the fascia of the palm. Cause of CTS listed in "(CTS) review" in American Family Physician 49:6:1371.

Palsy (G. paralysis, paralysis). Birth palsy—paralysis due to injury sustained during parturition, Erb-Duchenne syndrome (upper arm, 5th and 6th cervical nerve roots), or obstetric paralysis with deltoid involvement from injury to the brachial plexus, also called spastic diplegia. Brachial birth palsy—paralysis of the arm due to injury of brachial plexus during birth, Klumpke palsy (forearm FIG. 197 and hand weakened because of injury to lower roots of brachial plexus). Cerebral palsy—paralysis due to lesion of the brain, also called spastic diplegia. Lead palsy—weakness of hand grasp and paralysis of extensors of the wrist and fingers FIG. 281 resulting from degenerative changes in the posterior interosseous branch of the radial nerve produced by lead poisoning, also called Painter's palsy. Printer's palsy—polyneuritis in chronic antimony poisoning occurring in printers. Atrophy of muscles, loss of movement in hand and fingers. May have only one hand. Blakiston's New Gould Medical Dictionary.

Paralysis—(G. paralysis) Loss of muscle function or sensation, caused by injury to nerves or destruction of neurons. Acute ascending paralysis—includes flaccid paralysis involving the arms. Brachial paralysis—arm paralysis. Infantile paralysis—see polio. Ischemic paralysis—due to stoppage of blood circulation, as with embolism on thrombosis. Volkmann's paralysis—Paralysis of hand due to constriction of the blood supply FIG. 464 due to tight splints on casts on forearm. Blakiston's New Gould Medical Dictionary.

Phalangitis (G. phalagx, bone between two joints of the fingers on toes, itis—inflammation.) Phalangitis syphilitica. See dactylitis syphilitica. Phalangization—a plastic operation in which a metacarpal bone is separated from its fellows and surrounded with skin, thus forming a substitute for a finger or thumb. Phalangophalangeal amputation—removal of a finger on toe at the first on second phalangeal joints. Phalangectomy—Surgical excision of a phalanx of a finger or toe. Blakiston's New Gould Medical Dictionary.

Poliomyelitis (G. polios, gray; myelos, marrow; itis, inflammation)—Viral disease of man, with respiratory and gastrointestinal symptoms. Acute anterior Poliomyelitis—acute inflammation of the anterior horns of the gray matter of the spinal cord, common in children, producing paralysis of certain muscle groups or of entire limb; sudden onset, fever, gastrointestinal complaints, and pain in affected muscles, which atrophy rapidly, the reflexes are lost, and reaction of degeneration develops; also called infantile paralysis, epidemic paralysis, acute wasting paralysis, Heine-Medin's disease. Paralytic Poliomyelitis—damage to central nervous system, including flaccid paralysis, weakness, incoordination, muscle spasms, muscle tenderness, hyperesthesia, and disturbance of consciousness. Blakiston's New Gould Medical Dictionary.

Postinjury—Cause of CTS listed in "(CTS) review" in American Family Physician 49:6:1371.

Power grip—Non-metabolic disorder associated with CTS listed in "When to suspect (CTS)" in Consultant 33:12:40.

Pregnancy. (L. praegnans, pregenant.) Being with child, state of woman from conception to childbirth. Metabolic condition associated with CTS listed in "When to suspect (CTS)" in Consultant 33:12:40, and "(CTS) review" in American Family Physician 49:6:1371.

Proximal median neuropathy (L. proximus, nearest; G. neuron, nerve; pathos, disease). Cause of CTS listed in "(CTS) review" in American Family Physician 49:6:1371.

Proximal lumbrical insertion (L. lumbricalis) One of four small muscles in the hand or foot. Cause of CTS listed in "(CTS) review" in American Family Physician 49:6:1371.

Quervain, Fritz de [Swiss surgeon, 1868–1940], Described tenosynovitis of the extensor and abductor muscles of the thumb, called Quervain's disease, tendovaginitis stenosans. Blakiston's Mew Gould Medical Dictionary.

Quinquaud's phenomenon. A sideward oscillating movement in all fingers, probably due to intermittent contraction of the interosseous muscles; in almost any disease with tremors. Blakiston's New Gould Medical Dictionary.

Raynaud's Phenomenon. (G. phainomenon, to appear). An event or manifestation, generally of an unusual character. Maurice Raynaud, French physician, 1834–1881, famous for description and observation (1862) of a syndrome of vascular spasm in digital arteries. The color charges of digits seen when occurring secondarily to known arteriolar disease. FIG. 464. Blakiston's New Gould Medical Dictionary.

Renal failure. (L. renalis, of the kidneys). Cause of CTS listed in "When to suspect (CTS)" in Consultant 33:12:40; and in "(CTS) review" in American Family Physician 49:6:1371.

Rheumatoid arthritis. (G.pheuma, that which flows; eidos, form). See arthritis. Cause of CTS listed in "When to suspect (CTS)" in Consultant 33:12:40.

Rheumatoid tenosynovitis—See tenosynovitis. Cause of CTS listed in "When to suspect (CTS)" in Consultant 33:12:40.

Scarlet fever—Acute, contagious, febrile disease, with vomiting, chill, high fever, rapid pulse, sore throat, cervical adenitis, and punctiform, scarlet red eruption, strawberry tongue, and scaly desquamation; caused by hemolytic streptococcus. Blakiston's New Gould Medical Dictionary.

Scleroderma—(G. skeros, hard, G. derma, skin) A disease characterized by induration of the skin in localized patches or diffuse areas, and associated with atrophy of the epidermis and pigmentation. Vasomotor disturbances, myosclerosis, and calcinosis may occur. Also called scleriasis, dermatosclerosis, chorionitis. Collagen collects in the skin, fingers and hand FIG. 281, 464, and hardens. Blakiston's New Gould Medical Dictionary. This reduces movement of fingers. Similar to arthritis. It also collects in other organs, and may be fatal. This is a progressive disease. Rare. Cause of CTS listed in "When to suspect (CTS)" in Consultant 33:12:40.

Synovial proliferation nonspecific. (L. proles, offspring; ferre, to bear). The clear fluid which is normally present in joint cavities. Cause of CTS listed in "(CTS) review" in American Family Physician 49:6:1371.

Sprain fracture—An injury in which a tendon, together with a shell of bone, is torn from its attachment.

Stroke—Popular name for apoplexy.

Tactile anesthesia—(G. anaisthesia, lack of sensation) Loss of sense of touch. Blakiston's New Gould Medical Dictionary.

Tendinitis—Inflammation of the tendon.

Tenosynovitis (G. Tenon, tendon; synovia, synovia—clear fluid in joints; itis, inflammation.) Tuberculous Tenosynovitis—slow destructive tuberculosis of sheaths of tendon, tendons of wrist most commonly involved, treatment is synovectomy and excision of surrounding tuberculous tissue. Blakiston's New Gould Medical Dictionary. Sixty Joints in 2 hands, FIG. 201, 202.

Thoracic outlet syndrome (G. thorax, thorax). Chest. Cause of CTS listed in "(CTS) review" in American Family Physician 49:6:1371.

Thyroid conditions (G. thyreoeides, shield shaped). Cause of CTS listed in "When to suspect (CTS)" in Consultant 33:12:40.

Trauma—(G. trauma, wound). Injury by mechanical agents. Sports injuries, etc.

Tumor Benign. See Lipoma, ganglion. See also Malignant tumor.—Cause of CTS listed in "(CTS) review" in American Family Physician 49:6:1371.

5. Examples of the Method of Typing Exercise

The following examples illustrate the method of typing exercise with symbols, pictures, and diagrams. See Figures.

The Symbol of a typewriter is useful for the patent and copyright claim for the finger relief plan. It is accessible in a DOS® 5.0 format under the "practice.exe" program. The program serves as a remapping program and a tutorial. The program is loaded into the RAM (Random Access Memory) of the Computer; the RAM is the memory of the CPU (Central Processing Unit) which holds an electronic binary copy of the operating system and any active (executing or running) program and data. Remapping is the act of redefining or reassigning meanings or use of a computer component; remapping the keyboard refers to assigning a new symbol or letter for each key. DOS® is an abbreviation for Disk Operating System, trademark of Microsoft Corp®. Software is a computer program or instruction The Enter key exits this screen and proceeds with the Program.

A four row keyboard with AsInRedHot. AsInRedHot is an acronym to describe and remember any keyboard layout with those letters on the Home or middle row. Those letters are the first ten most used letters in newspaper English. This figure is useful to display the location of the letters, numbers, and punctuation on the keyboard. The rectangular box above the letters will display letters as they are keyed in, and if a story text is loaded, a story to retype for practice. Above the box is an information line. The left side of the line lists the purpose of 4 specialty keys. The <F1> is the Function 1 key, which calls up some help information. The <F2> is the Function 2 key, which calls up the Main Menu. The <F5> is the Function 5 key, which begins the loading of the story and allows keyboarding (or typing) to begin. The <ESC> is the Escape key, which exits the program and returns the user to the DOS prompt. The right side has the initials "JCTAUTO.KBD" which is the preprogrammed keyboard that will be loaded with each execution of the practice program. In the example the AsInRedHot keyboard has been loaded.

Figure 2:
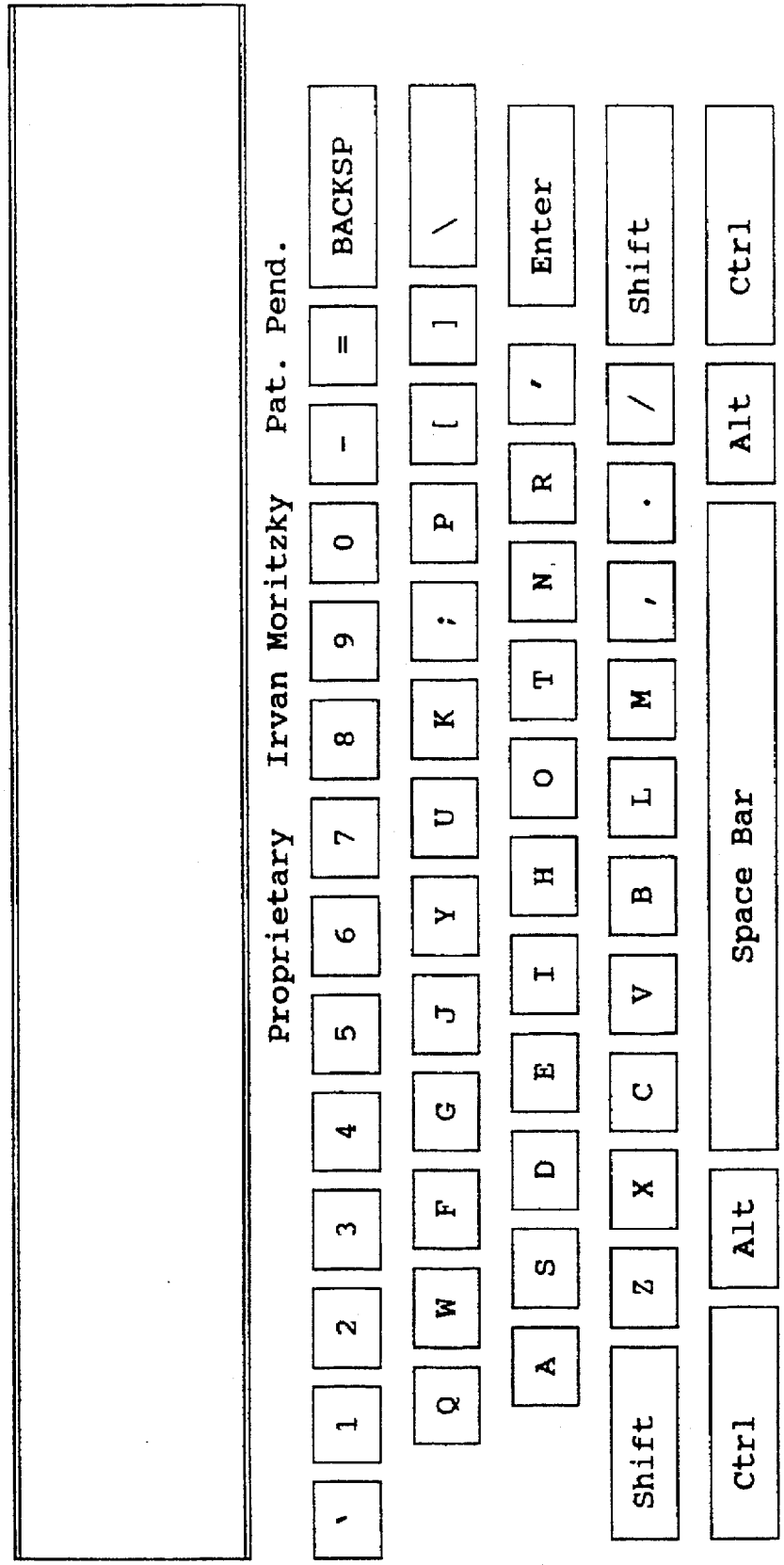
FIG. 2 illustrates the teaching methods of the invention.
Figure 3:
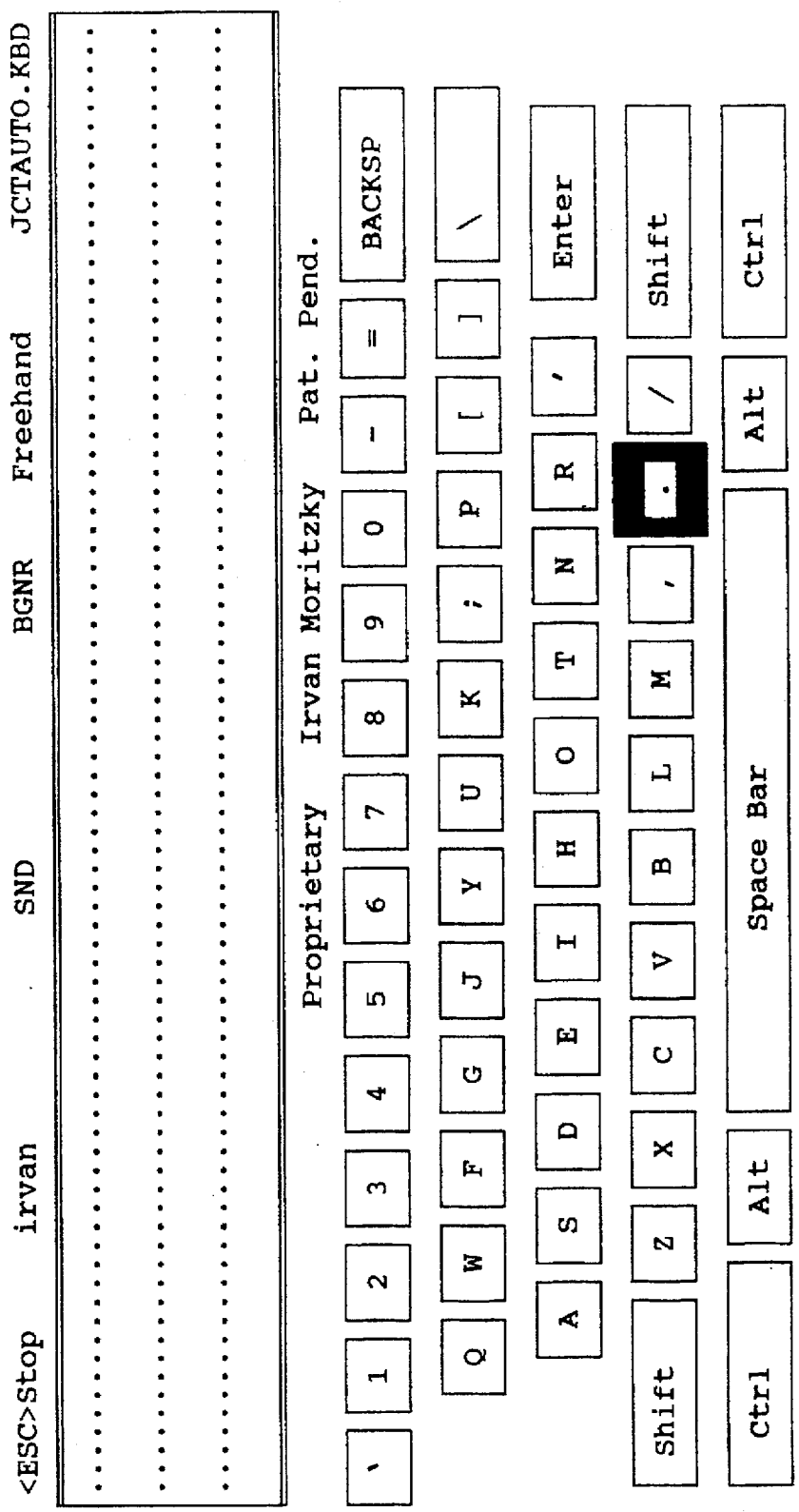
FIG. 3 illustrates the teaching methods of the invention.
Figure 4:
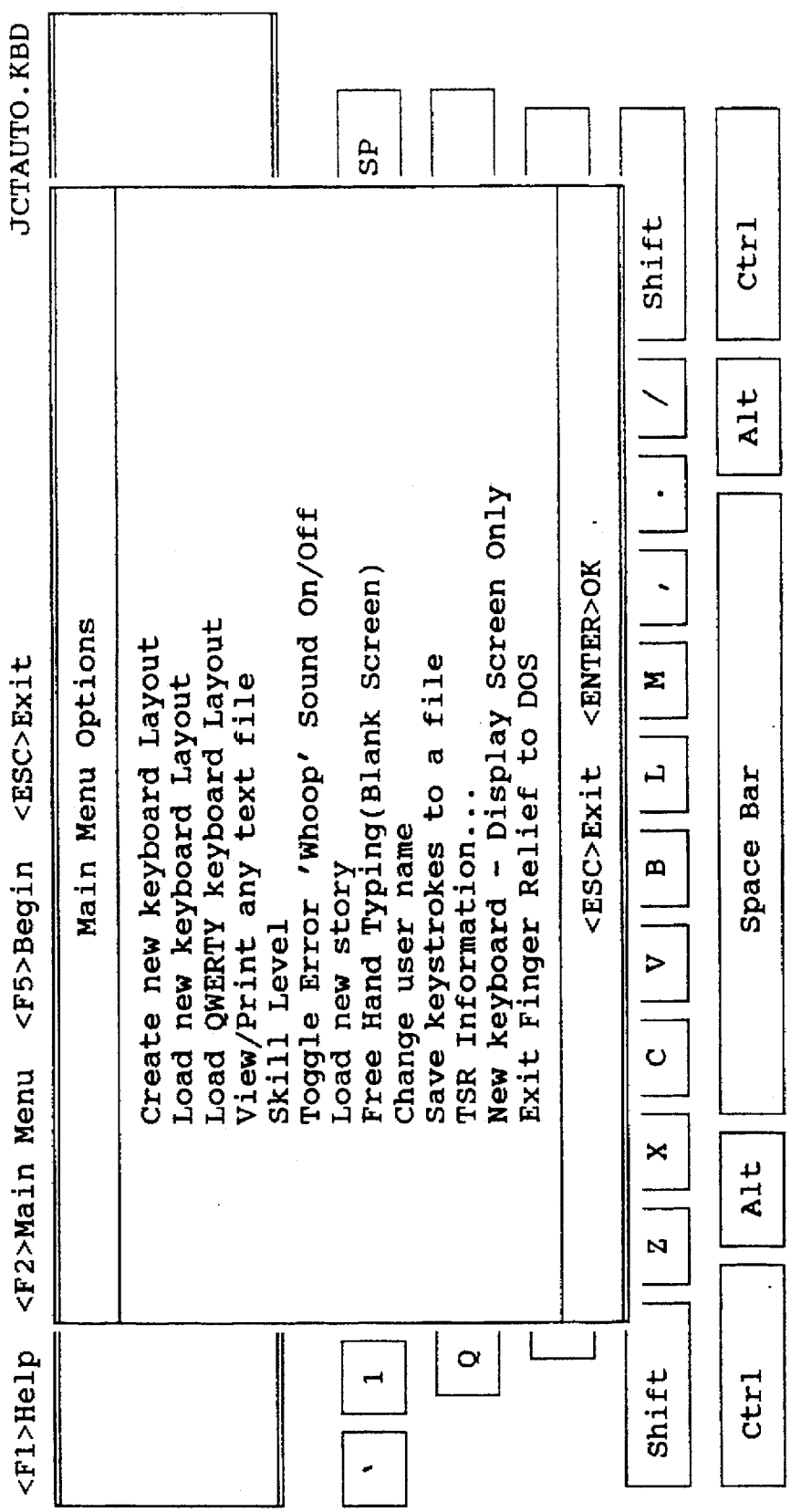
FIG. 4 illustrates the teaching methods of the invention.
Figure 5:
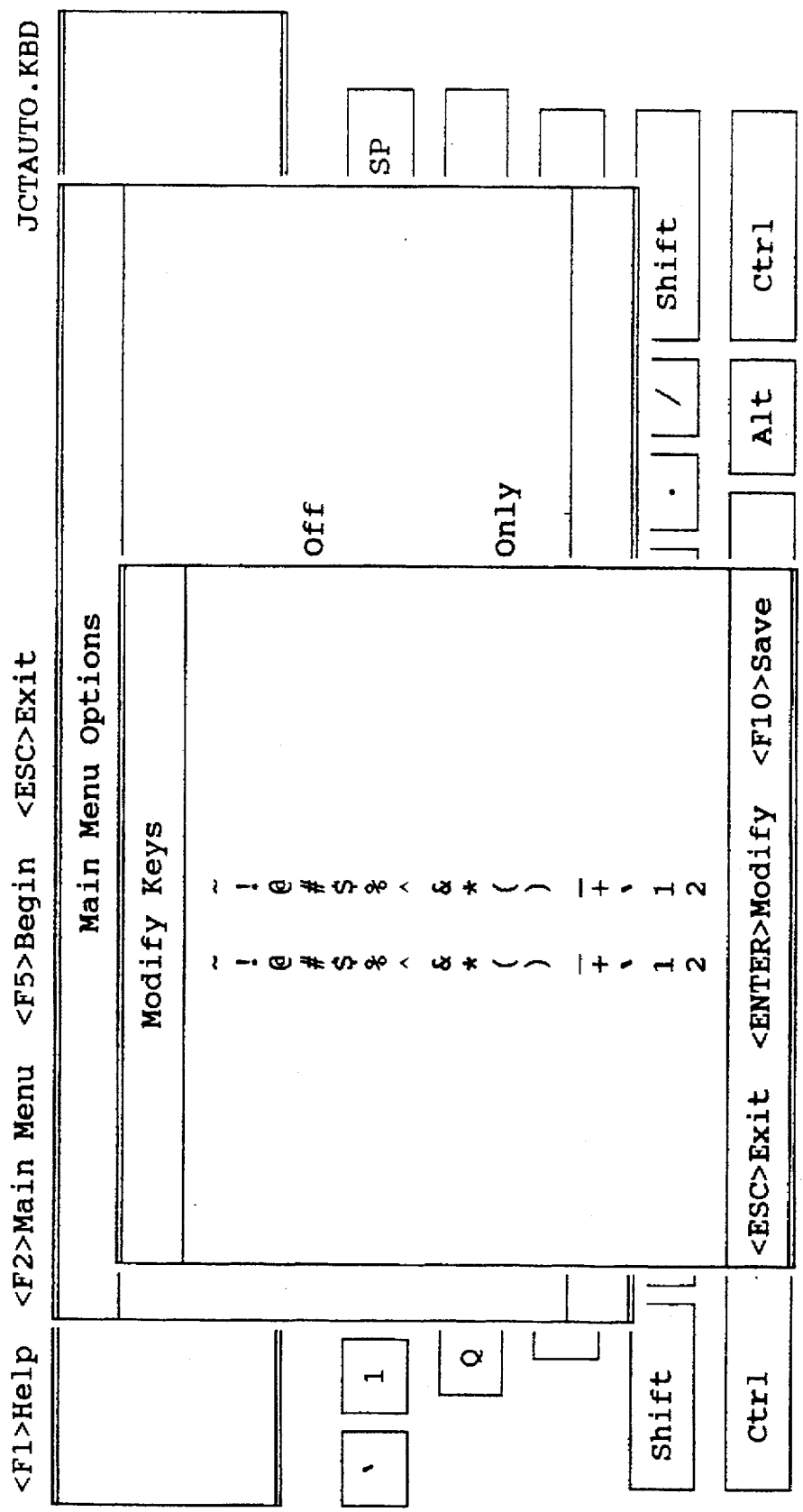
FIG. 5 illustrates the teaching methods of the invention.
Figure 6:
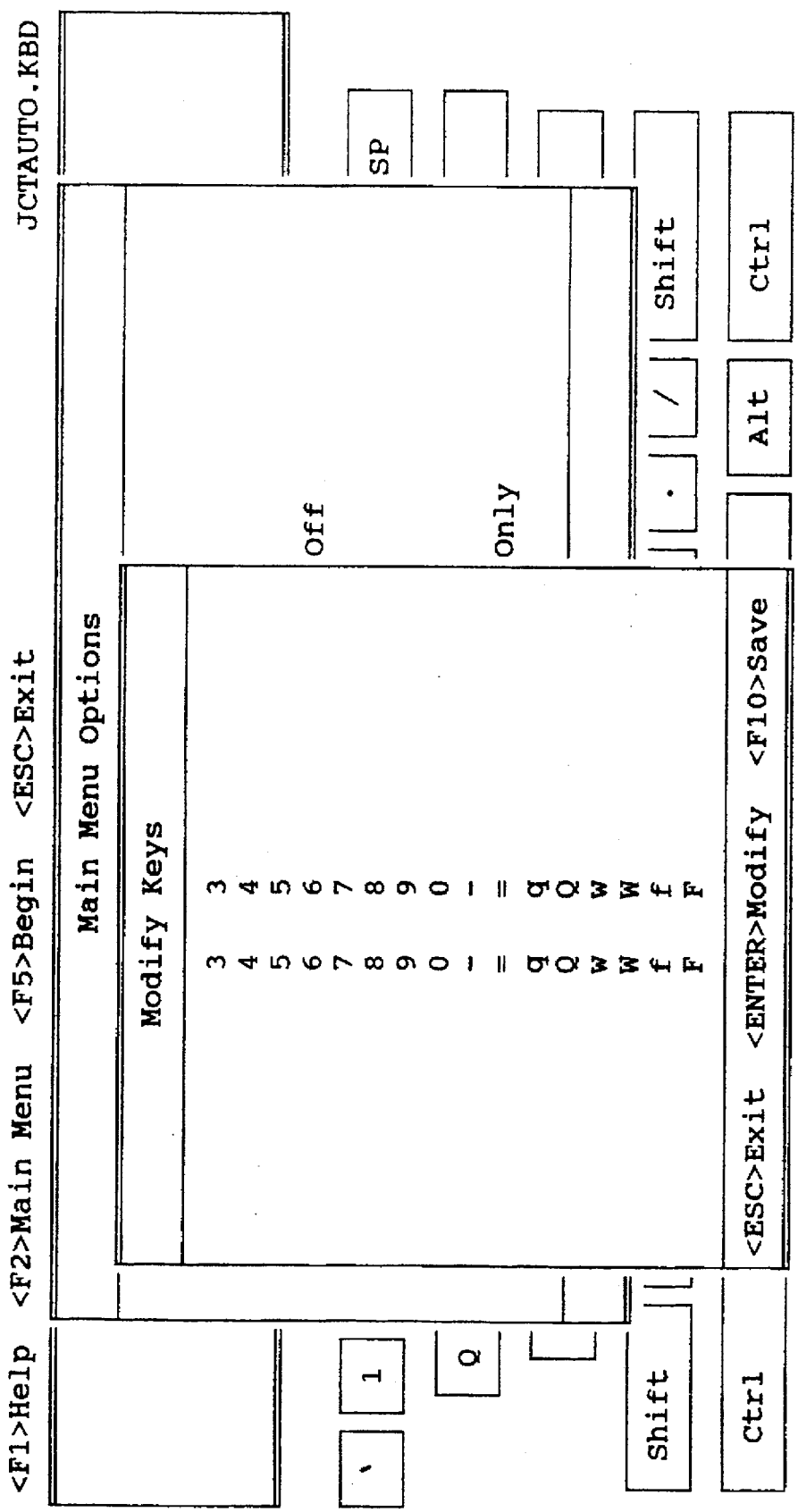
FIG. 6 illustrates the teaching methods of the invention.
Figure 7:
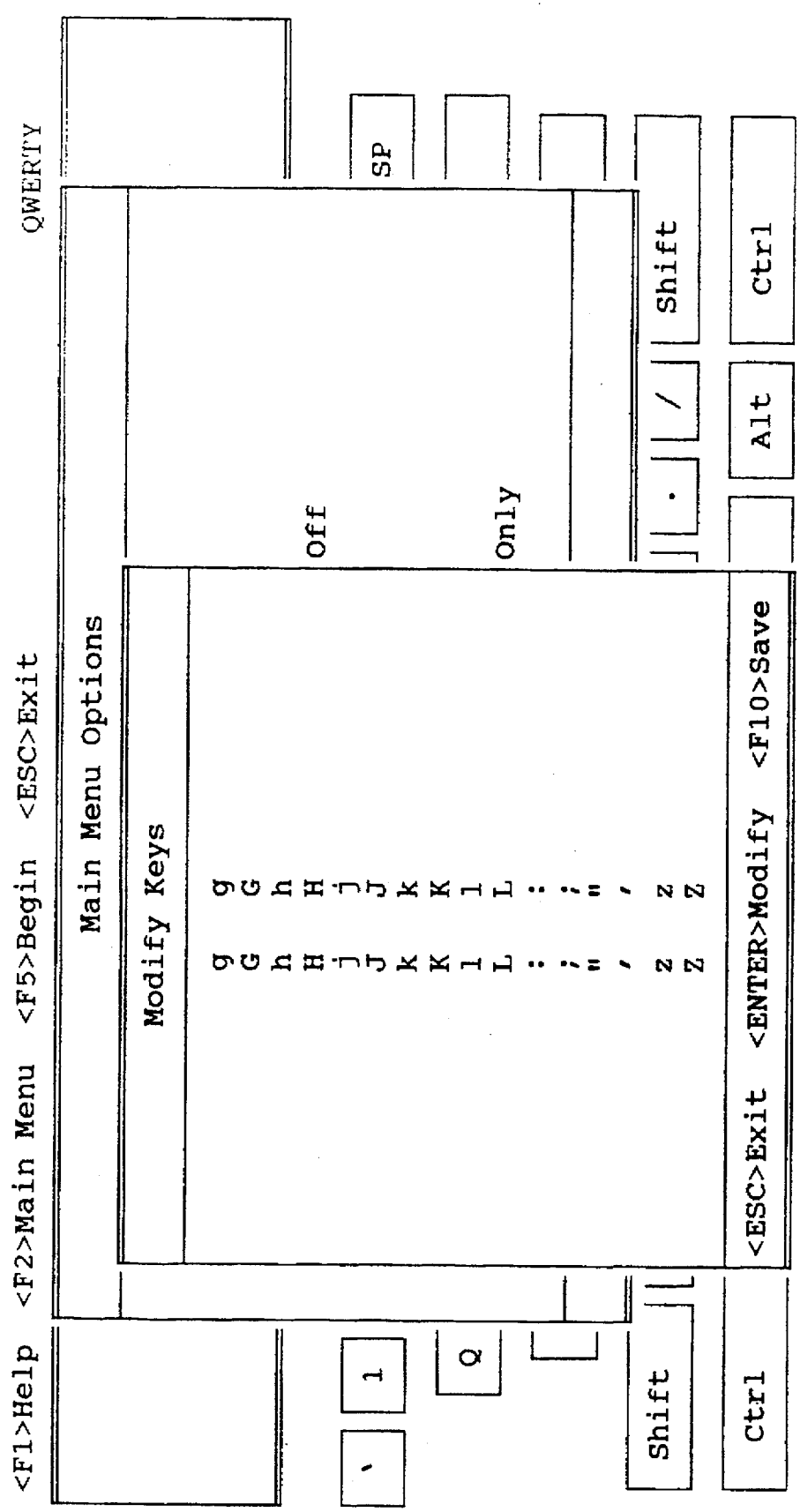
FIG. 7 illustrates the teaching methods of the invention.
Figure 8:
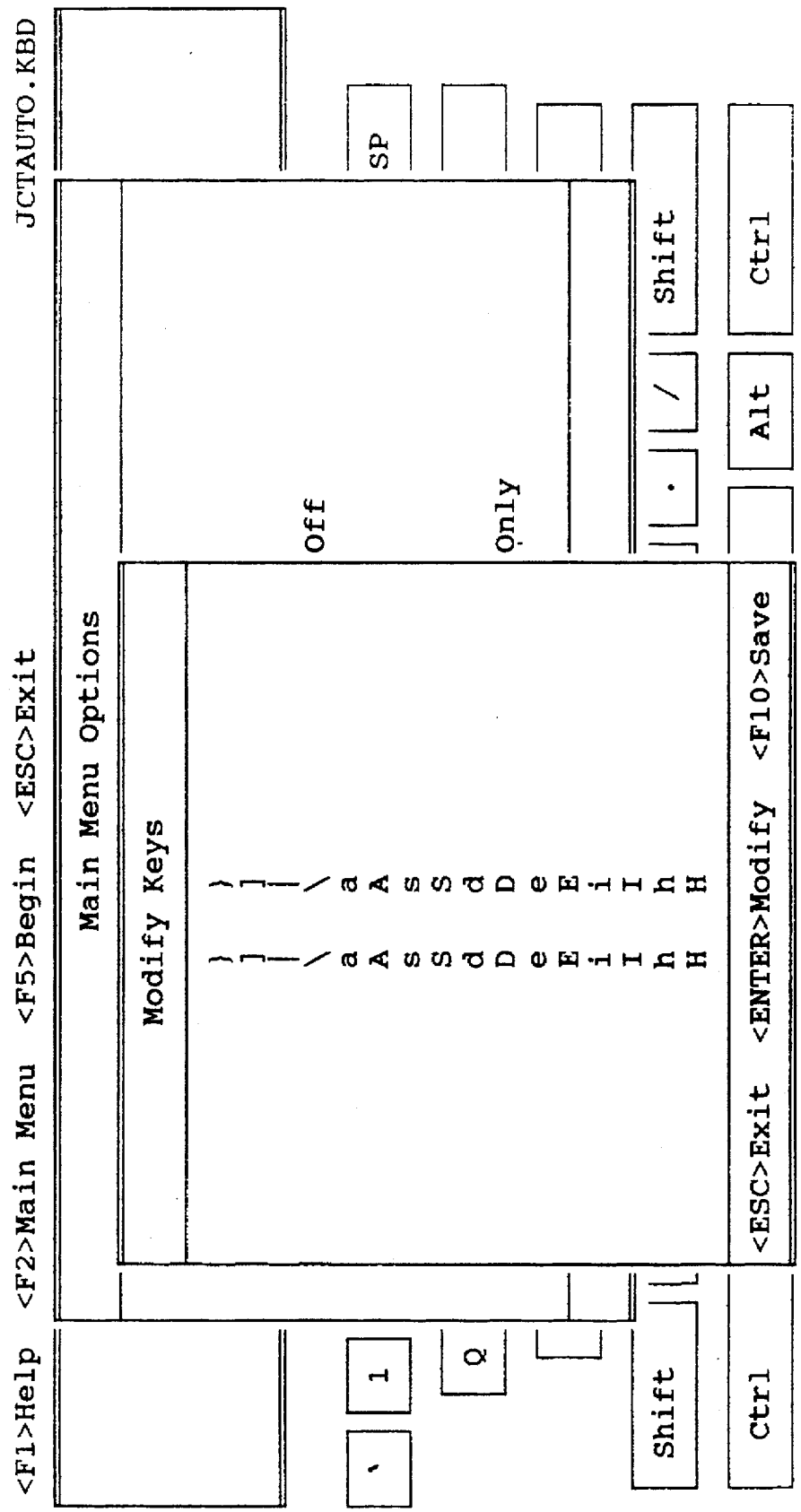
FIG. 8 illustrates the teaching methods of the invention.
Figure 9:
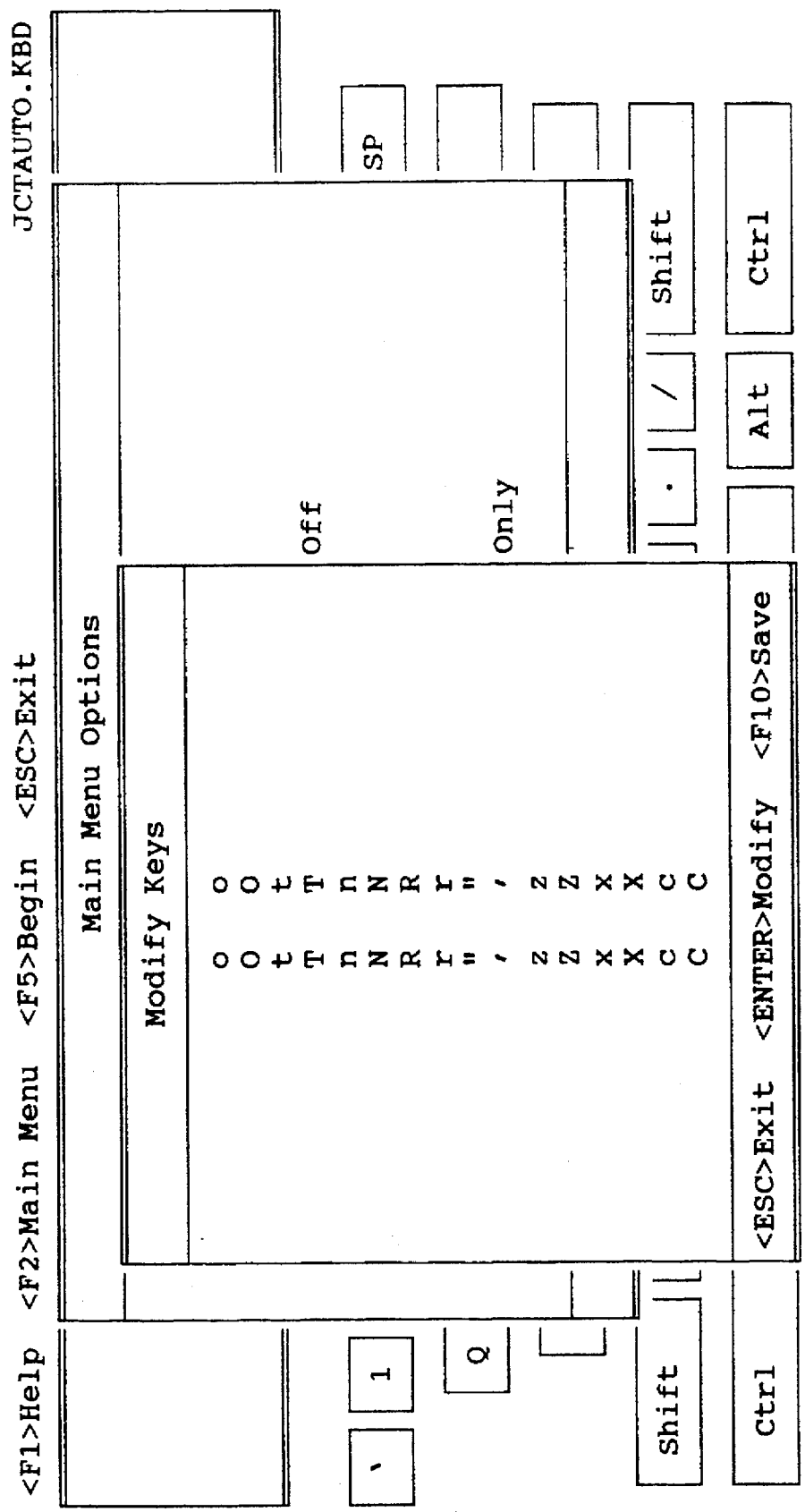
FIG. 9 illustrates the teaching methods of the invention.
Figure 10:
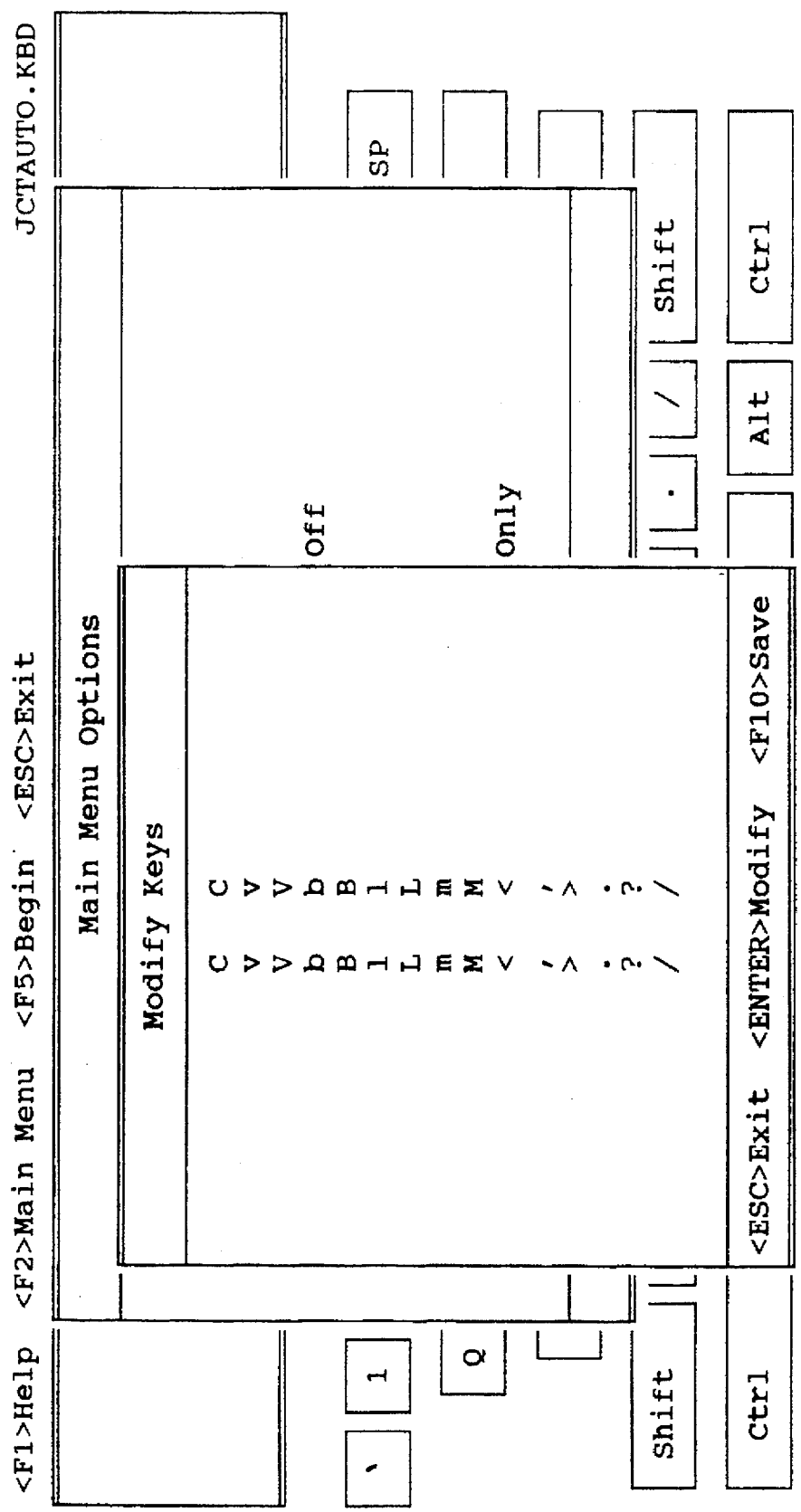
FIG. 10 illustrates the teaching methods of the invention.
Figure 11:
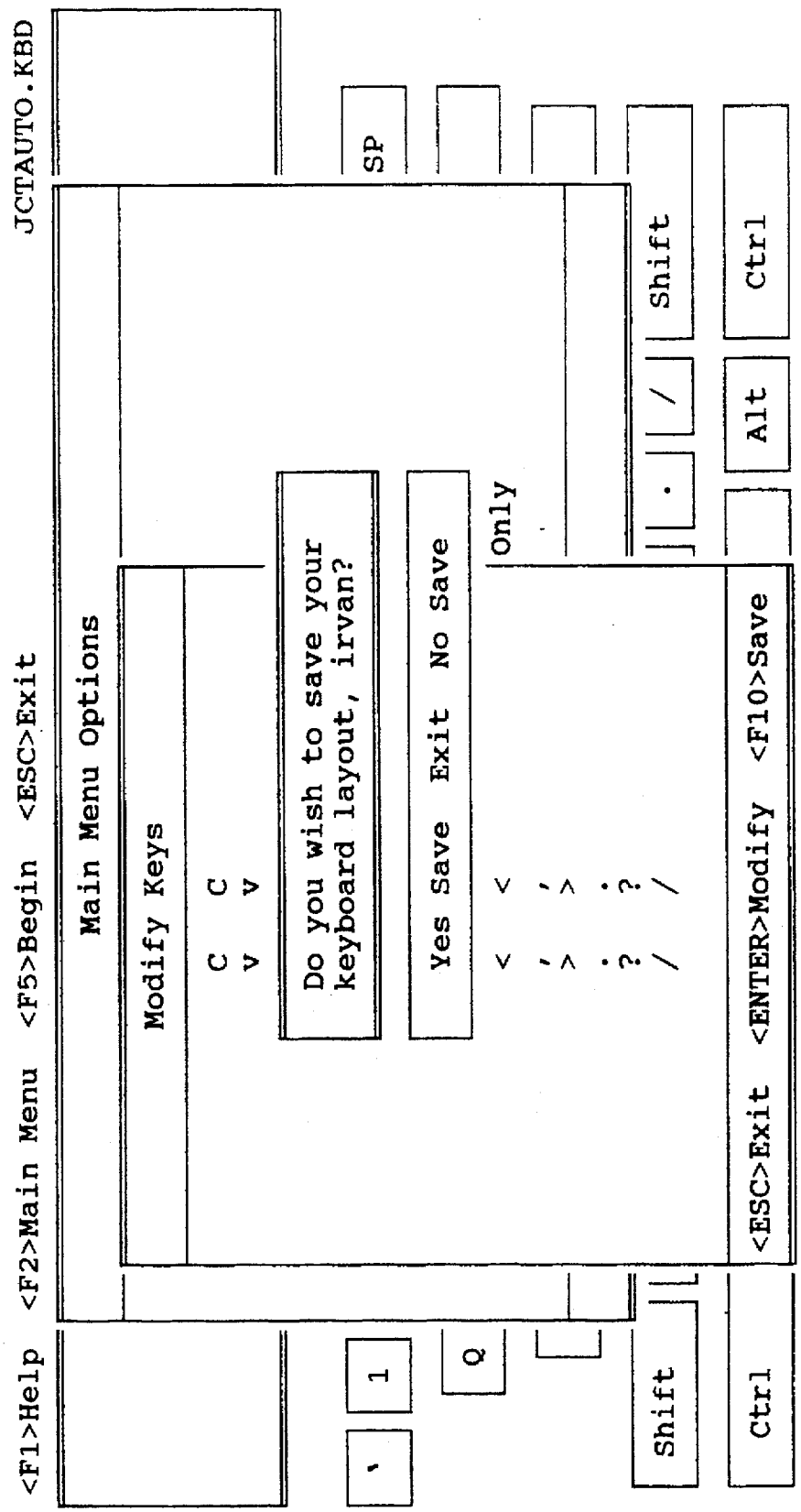
FIG. 11 illustrates the teaching methods of the invention.
Figure 12:
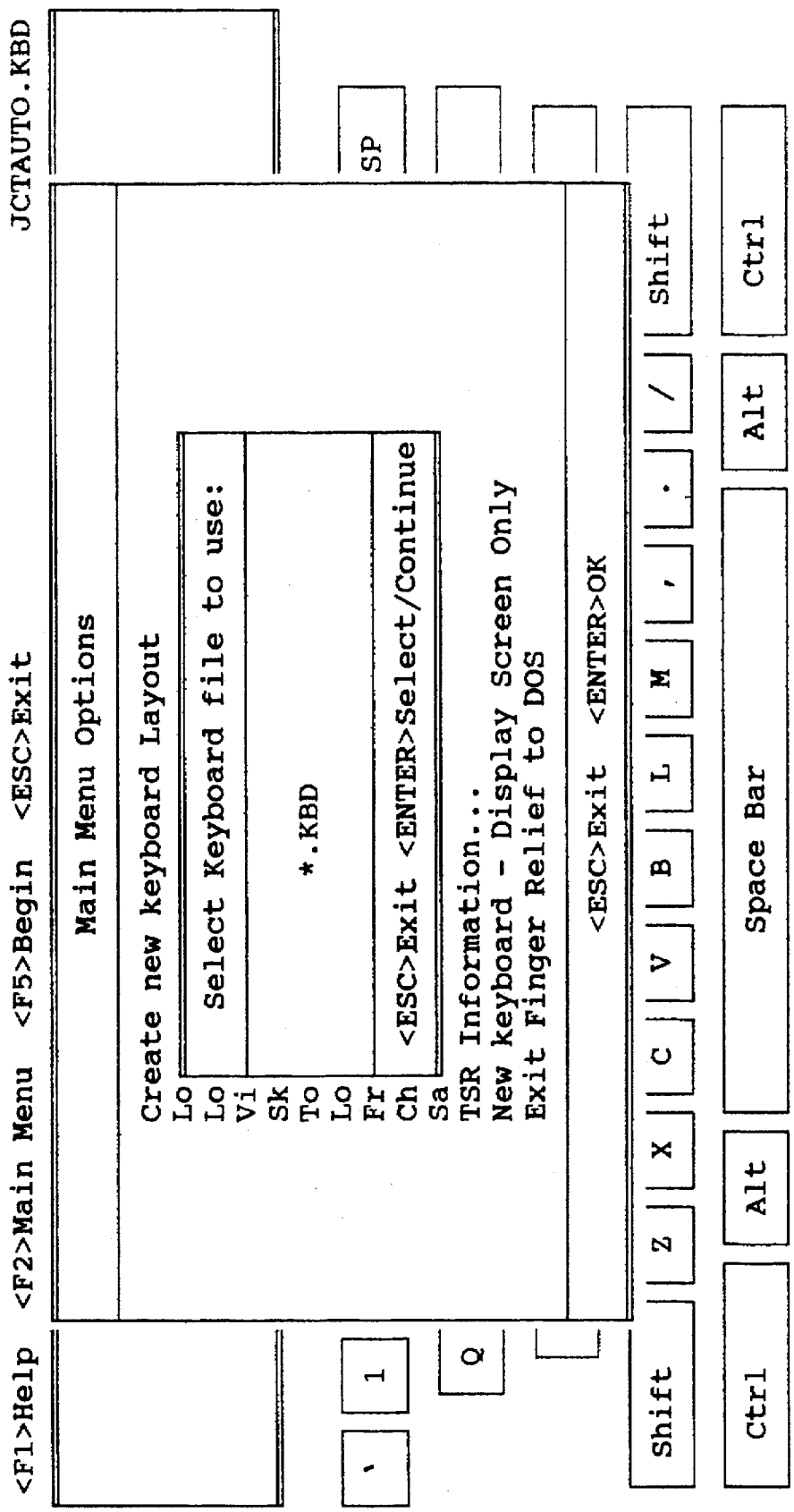
FIG. 12 illustrates the teaching methods of the invention.

A Four Row keyboard and three rows of dots is a beginner's keyboard, allowing freehand practice. The Bold square around the period is a major clue to the user that is the key which is to be typed. The text box is filled with space holders. The top line has the <ESC> for stop the typing practice and return to the Opening menu line as displayed in FIG. 2. The name "irvan" is the name of the user. The "SND" stands for sound, which is turned on and beeps if the wrong key is depressed. The "BGNR" indicates the beginner skill level. The "Freehand" indicates the user can write their own text if the Skill level is raised to Advanced. The "JCTAUTO.KBD" is the preprogrammed keyboard that will be loaded with each execution of the practice program. In the example the AsInRedHot keyboard has been loaded.

Main Menu Options Window lists the menu options for the user. Each option can be used by dropping the "highlighted" bar to the line of the option and then pressing the <Enter> key. To close the Main Menu, press the <ESC> key for exit. A portion of the keyboard and top level information line is visible "behind" the Main Menu. Modify Keys Subwindow of the Create New Keyboard Layout Command Line is the top line on the Main Menu Options Window which invites the user to design a keyboard for later practice. The two columns of sixteen rows of figures and letters list the Present Keyboard, (the JCTAUTO.KBD) and the places for a changed keyboard. Thus the left column has the "2" key at the bottom. The right column also has a "2" key, which could be changed to another key. The top row of information keys cannot be used while in the Modify Keys Subwindow. The ability to rearrange letters allows the creation of 104 factorial (notation: 104!, or 104×103×102× 101×100×99×98× . . . 3×2×1) different arrangements, of which several dozen have been previously patented. Each layout arrangement is conveniently available for research and use. The key location changes, if any, may be saved by pressing the <F10> Function 10 key. The <Enter> key allows the beginning of the modification of the list, and the <ESC> escape key allows leaving or exiting of the Modify Keys Subwindow.

The Modify Keys Subwindow shows a different double list of 16 letters. The alphabet, punctuation, and numbers are visible in the Subwindow.

The Modify Keys Subwindow is a different double list of 16 (or 14) letters and punctuation.

Do you wish to save your keyboard layout, queries the Subwindow. Create New Keyboard Layout Command Line of the Main Menu Options Window. If, after changing the key locations in the Modify Keys Subwindow, the designer wishes, the keyboard can be saved to a file. Saving the file is accomplished by using the <ESC> Escape/exit key, which allows the user a chance to save the keyboard layout, or to exit without saving the layout. If a keyboard file is saved, a Subwindow allows the user to "name" the new keyboard layout, and return to the Main Menu Option. Exit this window by pressing the <ESC> escape key.

Figure 13:
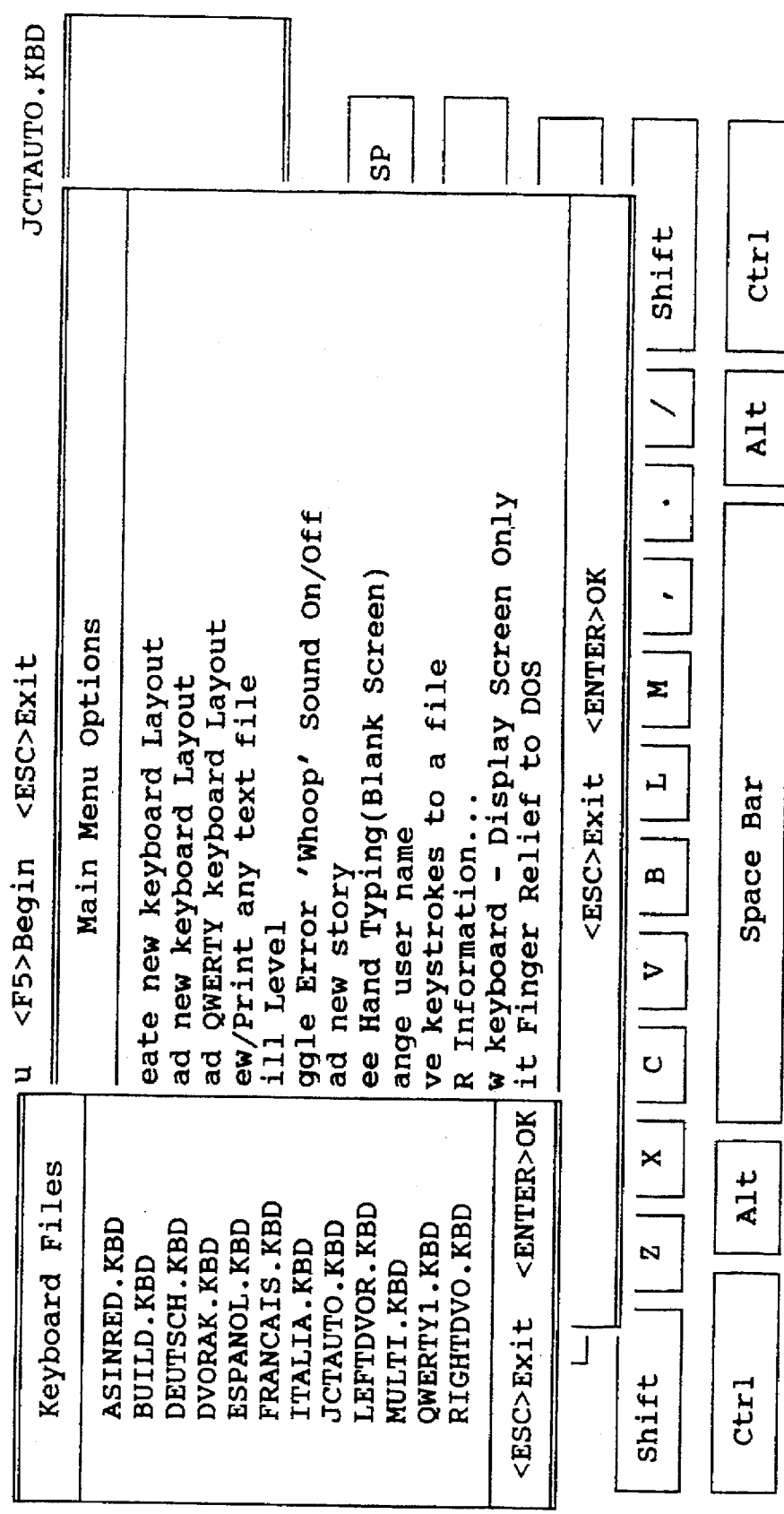
FIG. 13 illustrates the teaching methods of the invention.
Figure 14:
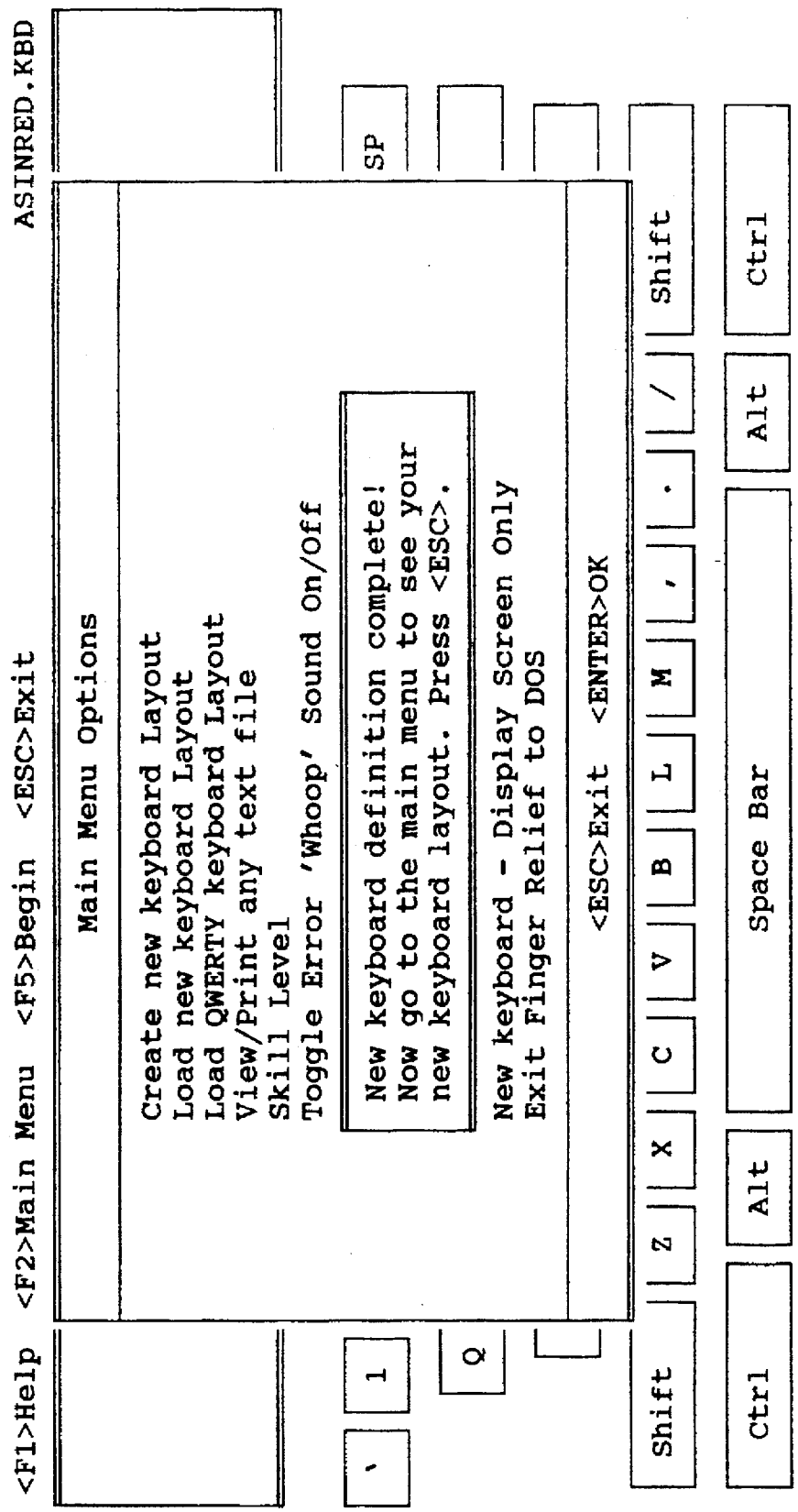
FIG. 14 illustrates the teaching methods of the invention.
Figure 15:
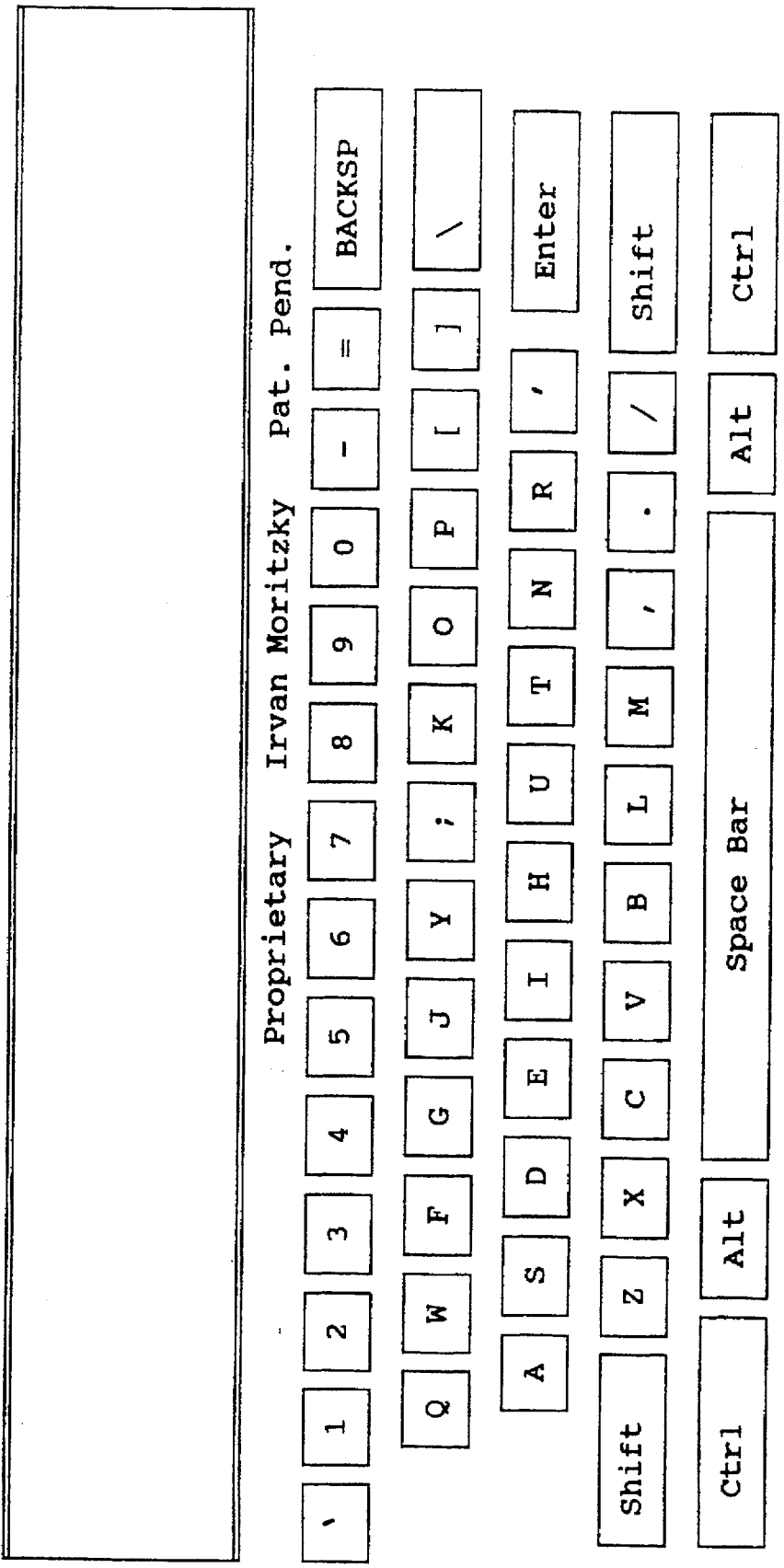
FIG. 15 illustrates the teaching methods of the invention.
Figure 16:
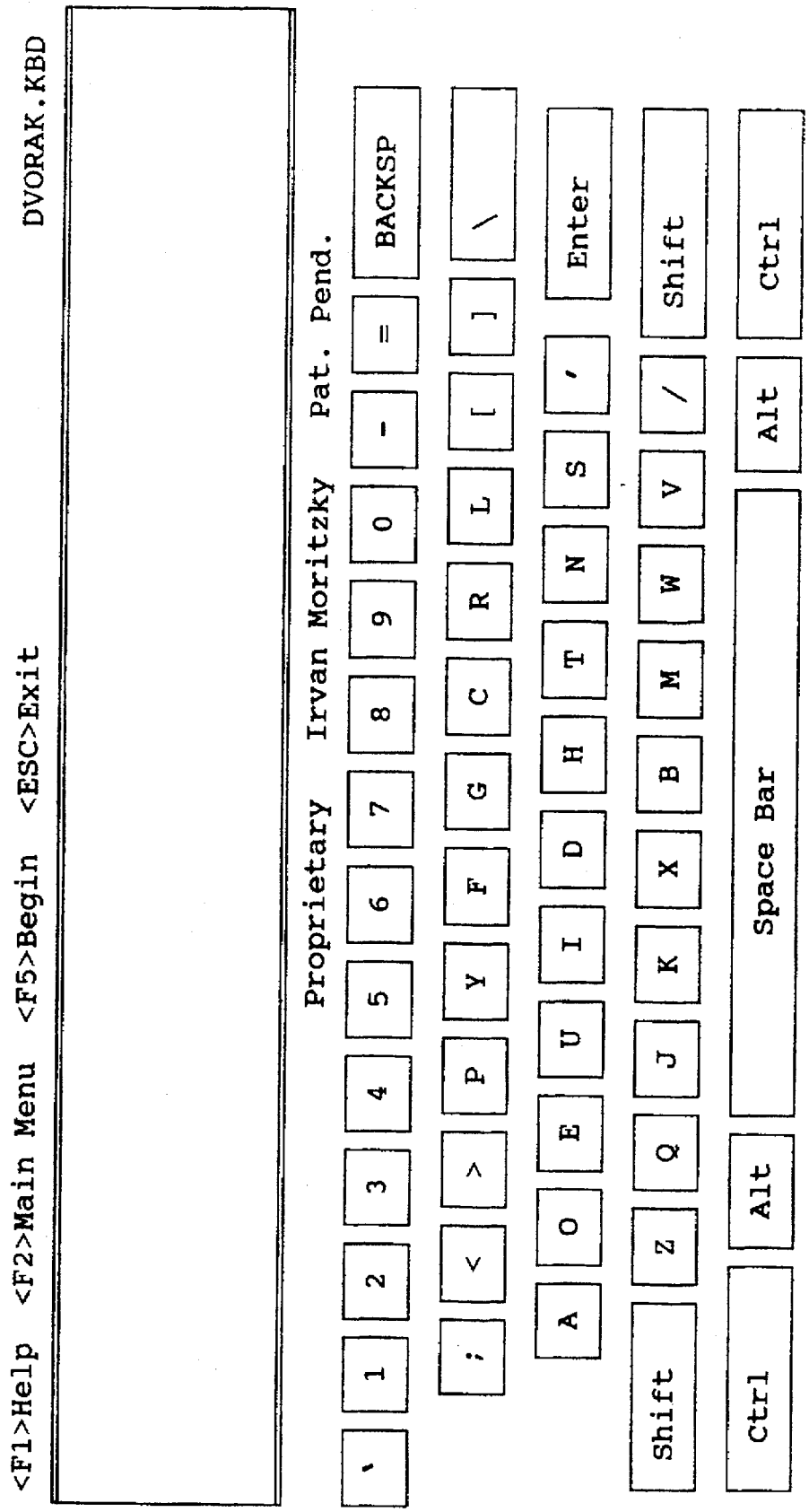
FIG. 16 illustrates the teaching methods of the invention.
Figure 17:
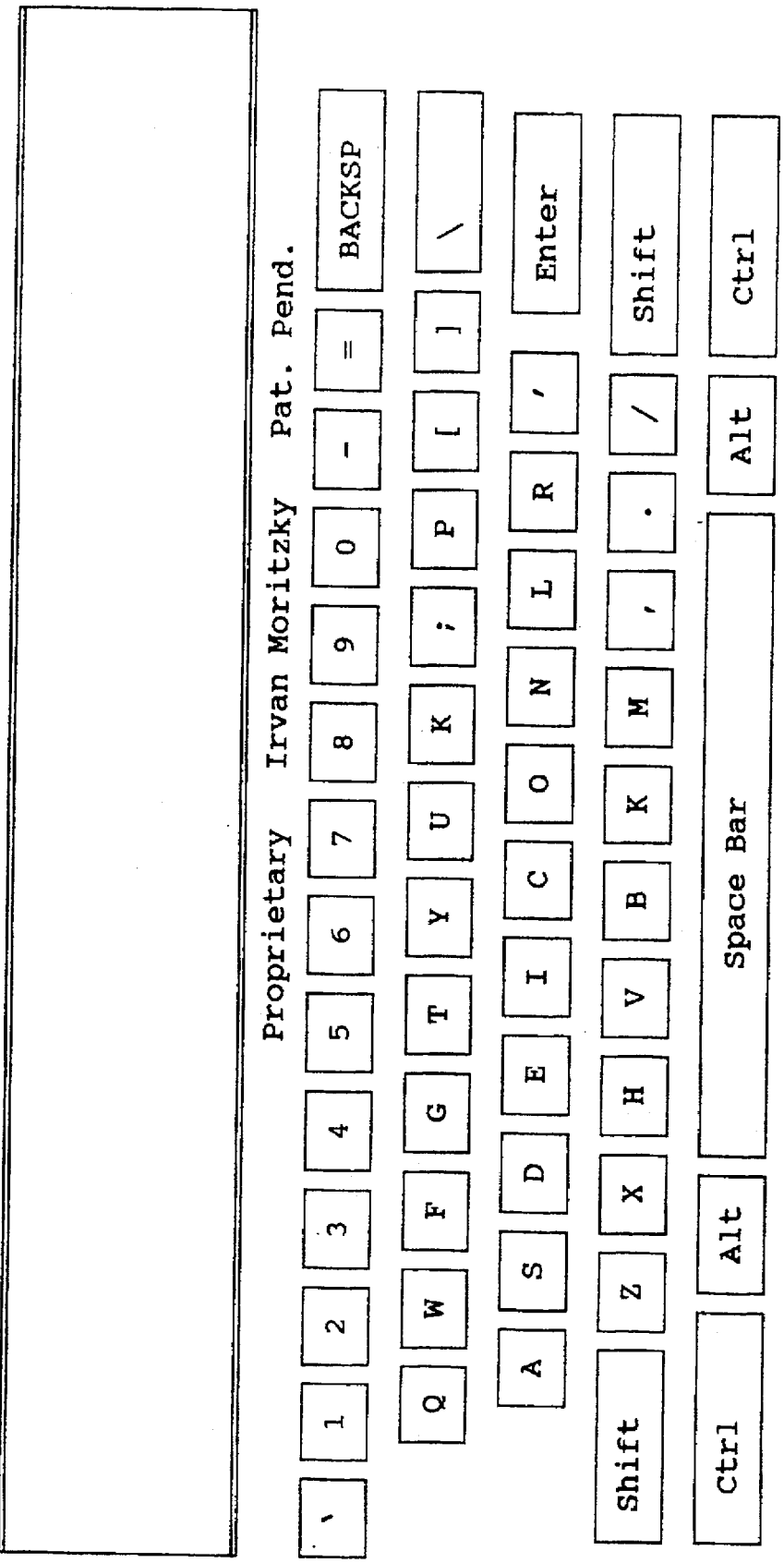
FIG. 17 illustrates the teaching methods of the invention.
Figure 18:
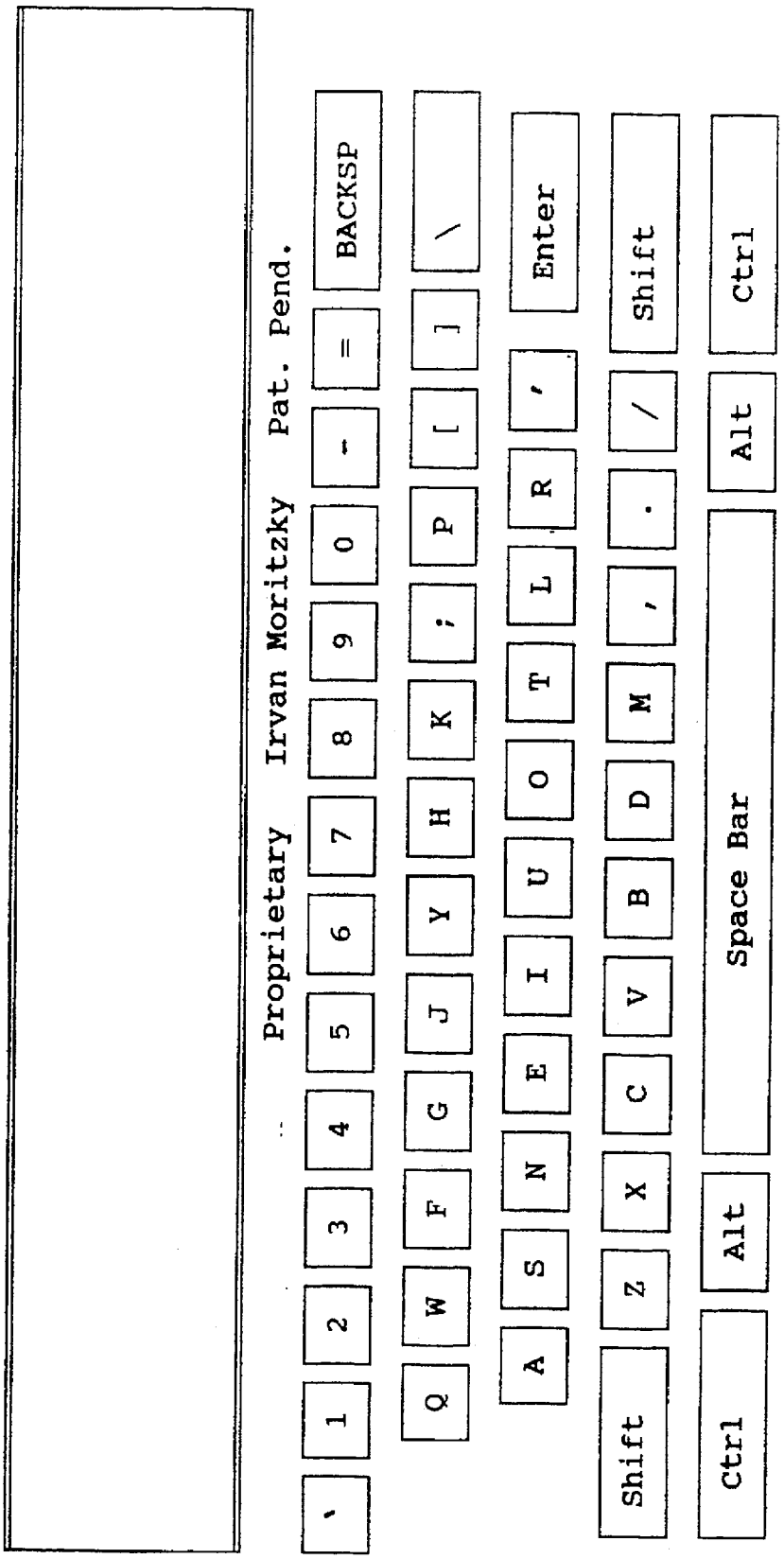
FIG. 18 illustrates the teaching methods of the invention.
Figure 19:
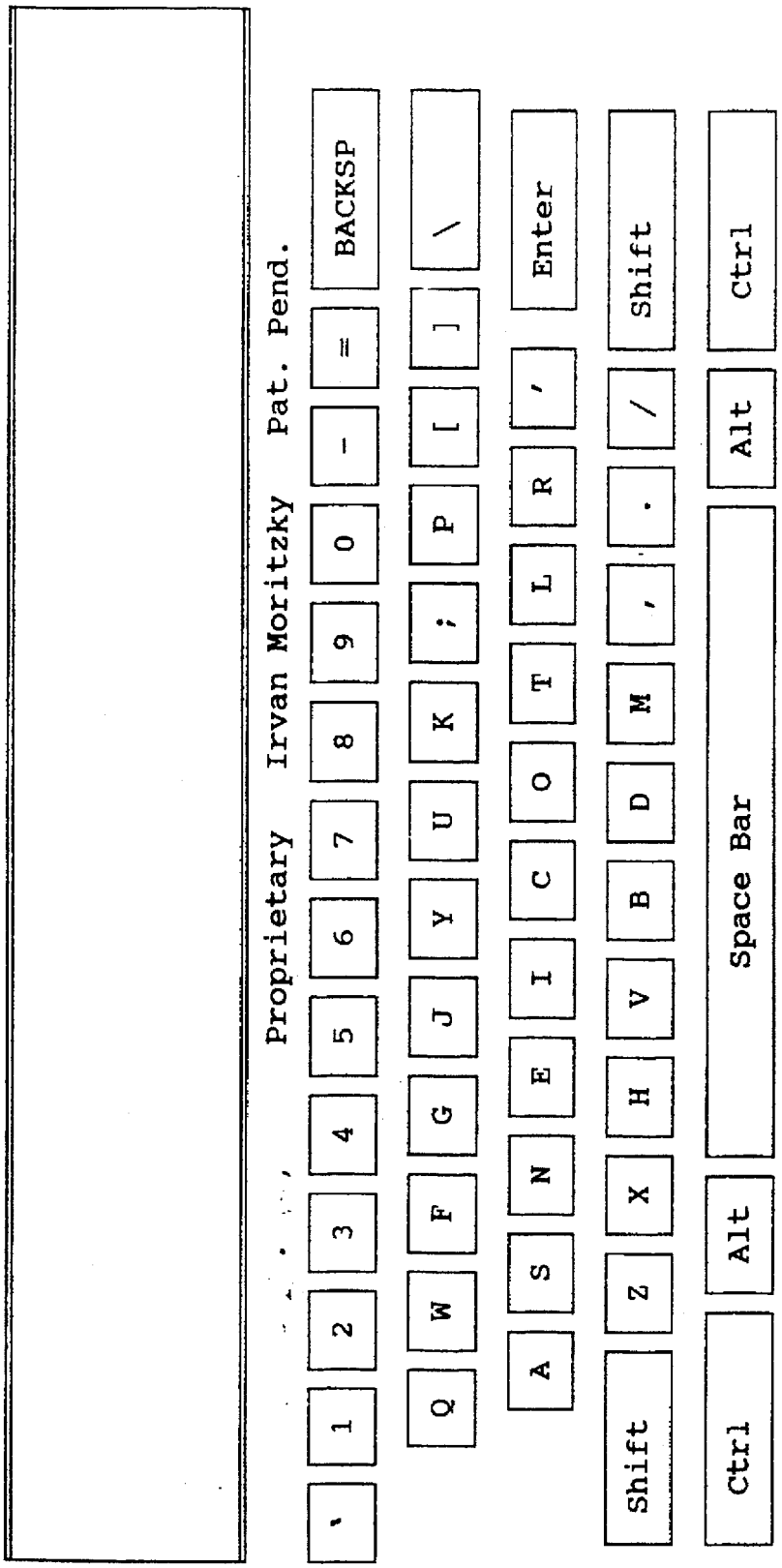
FIG. 19 illustrates the teaching methods of the invention.
Figure 20:
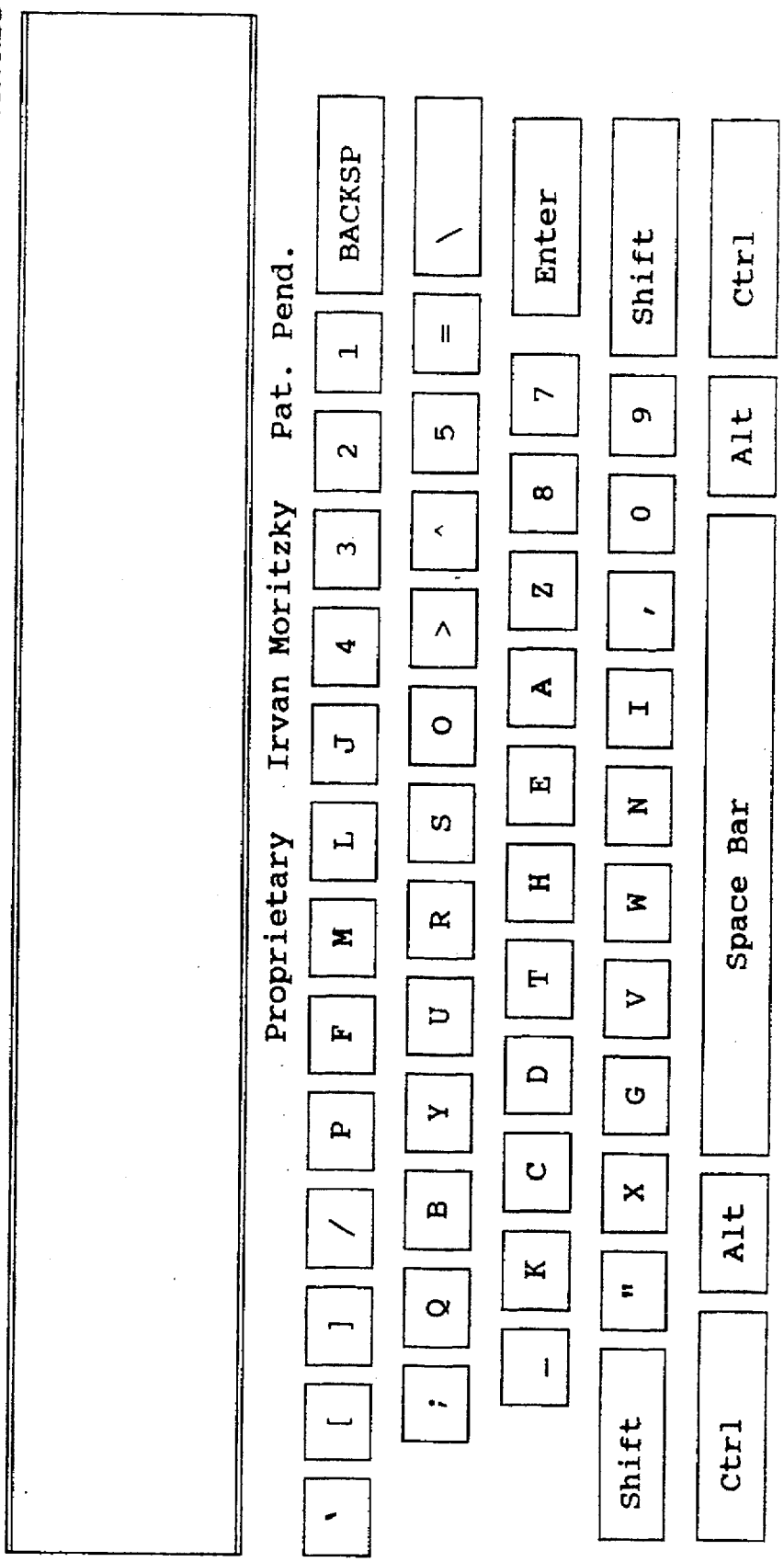
FIG. 20 illustrates the teaching methods of the invention.
Figure 21:
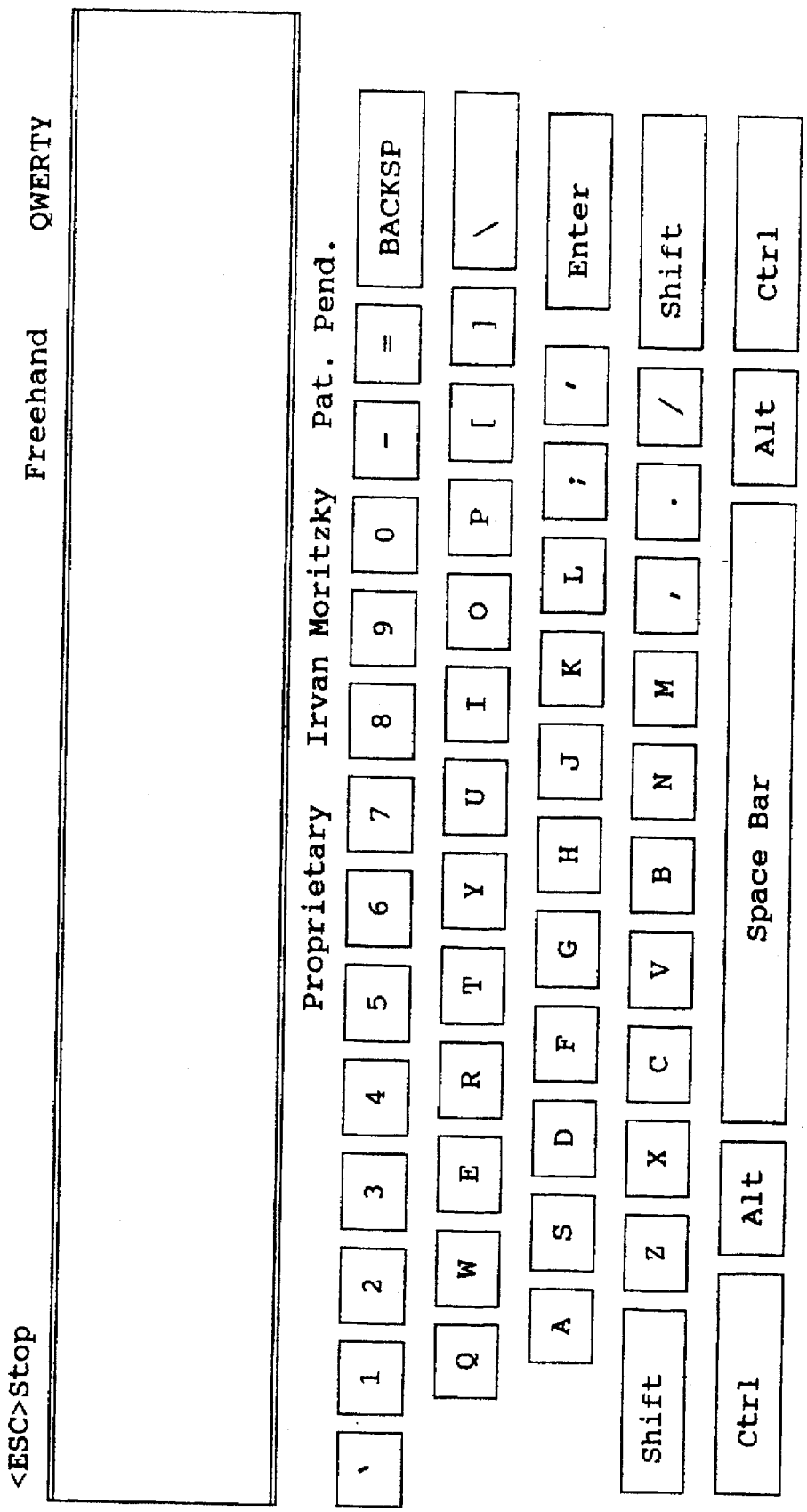
FIG. 21 illustrates the teaching methods of the invention.
Figure 22:
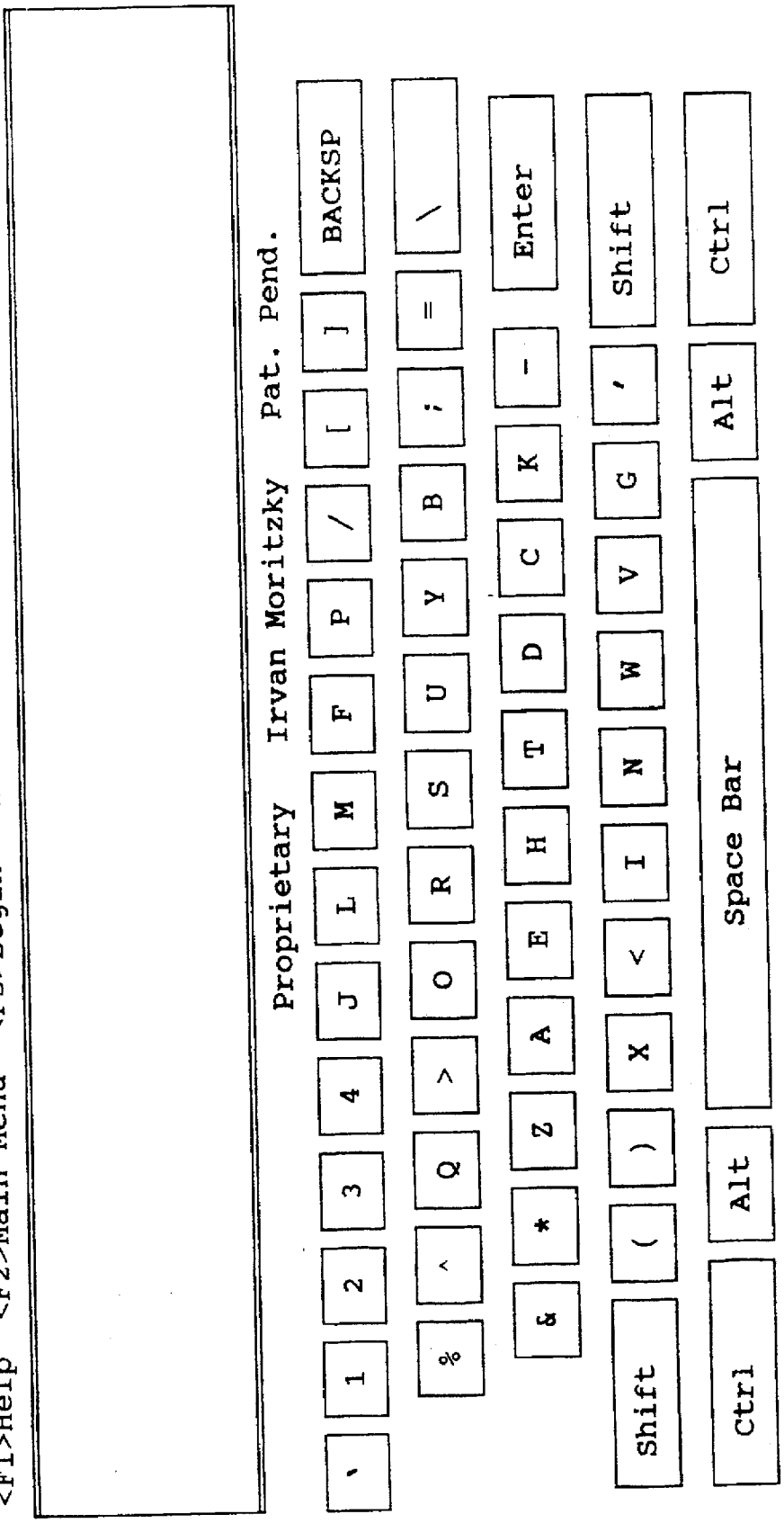
FIG. 22 illustrates the teaching methods of the invention.
Figure 23:
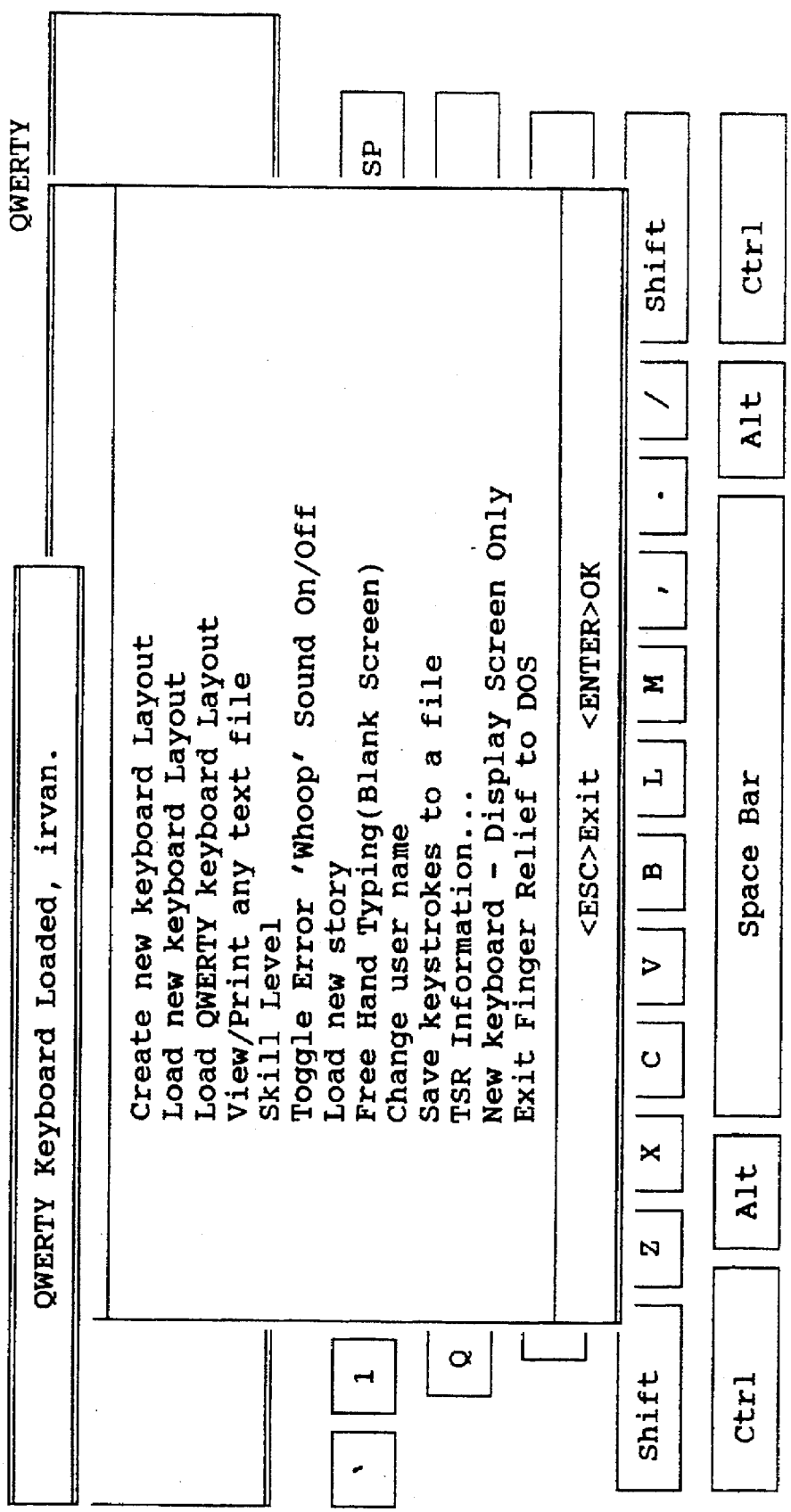
FIG. 23 illustrates the teaching methods of the invention.
Figure 24:
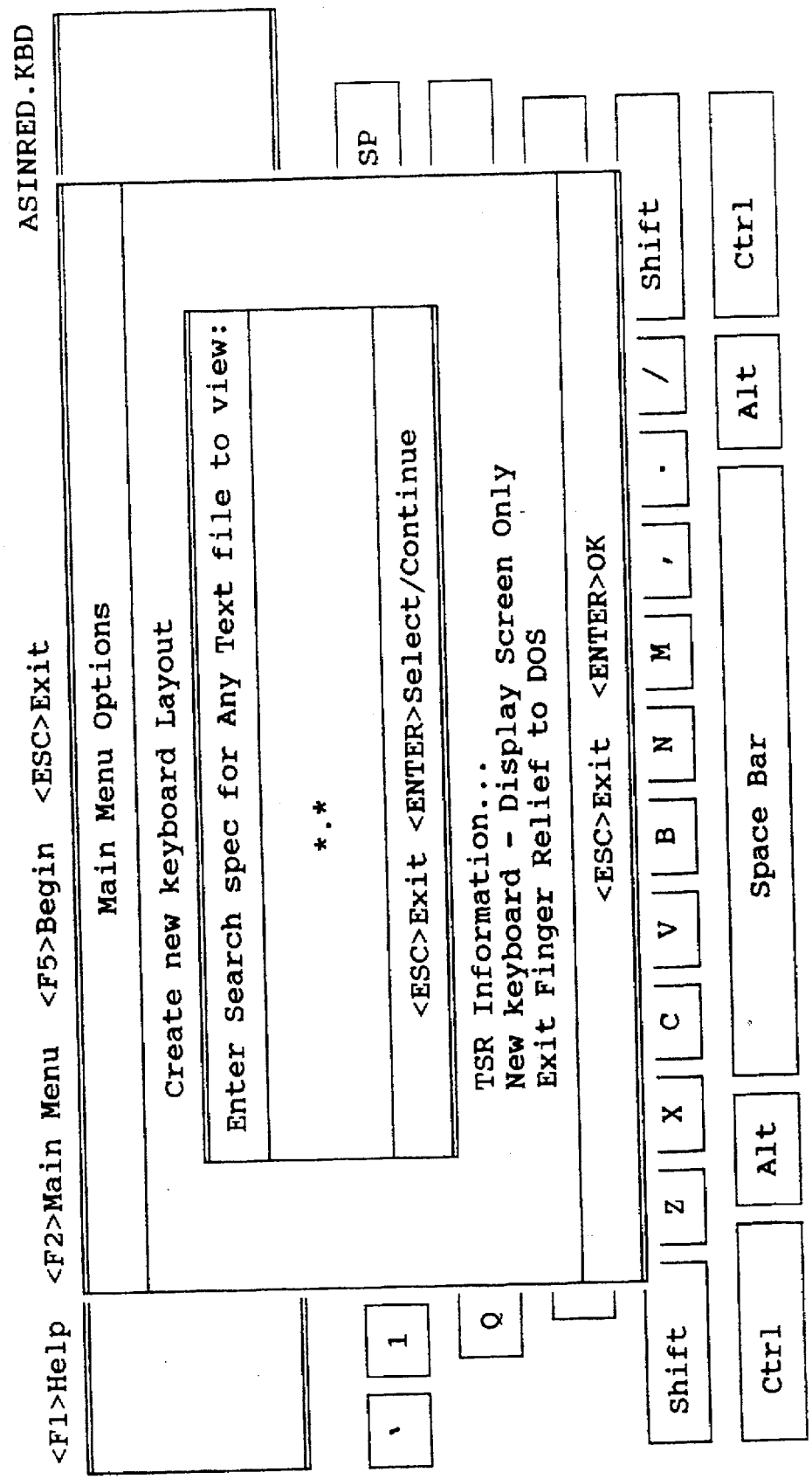
FIG. 24 illustrates the teaching methods of the invention.
Figure 25:
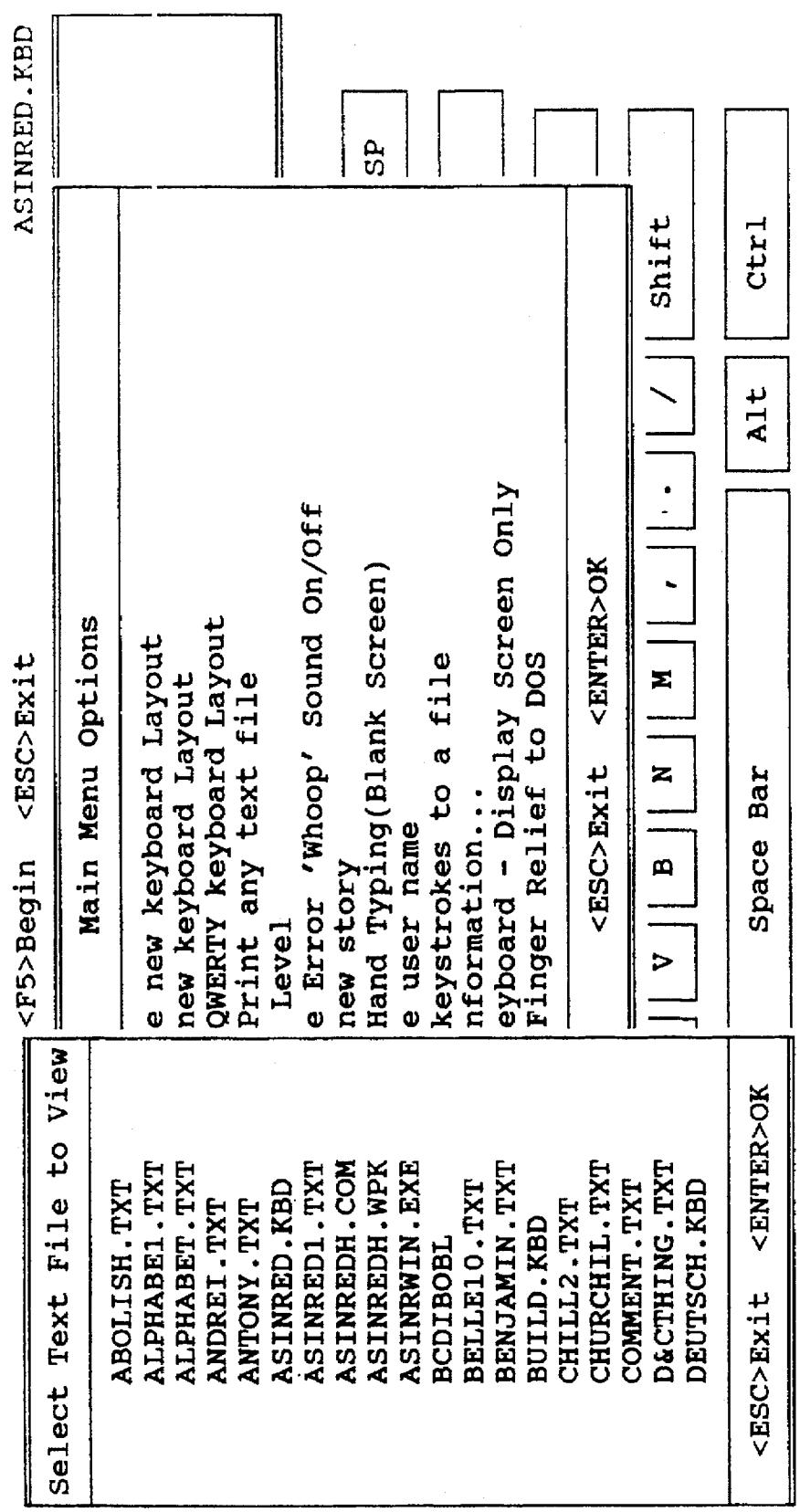
FIG. 25 illustrates the teaching methods of the invention.
Figure 27:
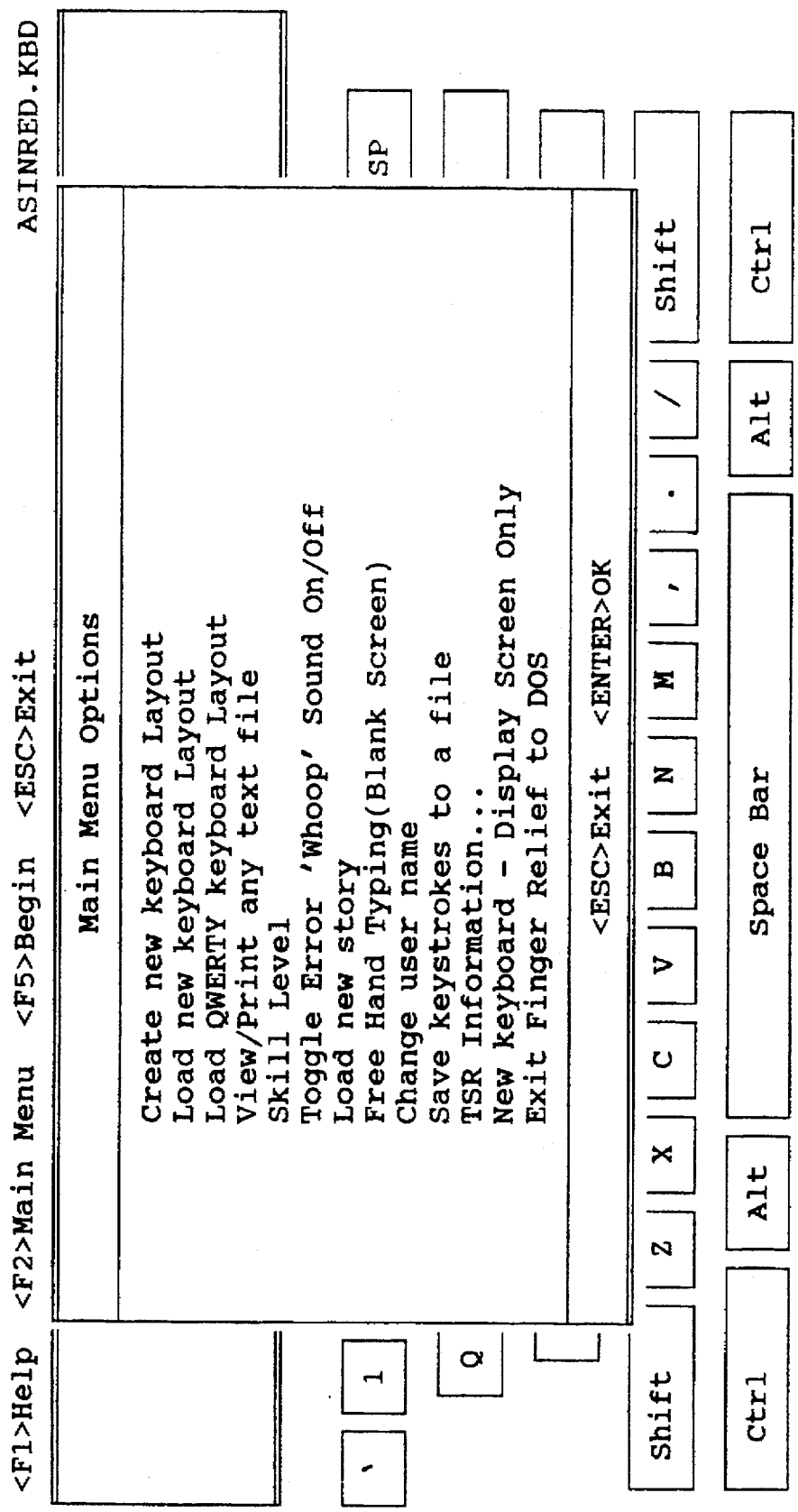
FIG. 27 illustrates the teaching methods of the invention.
Figure 28:
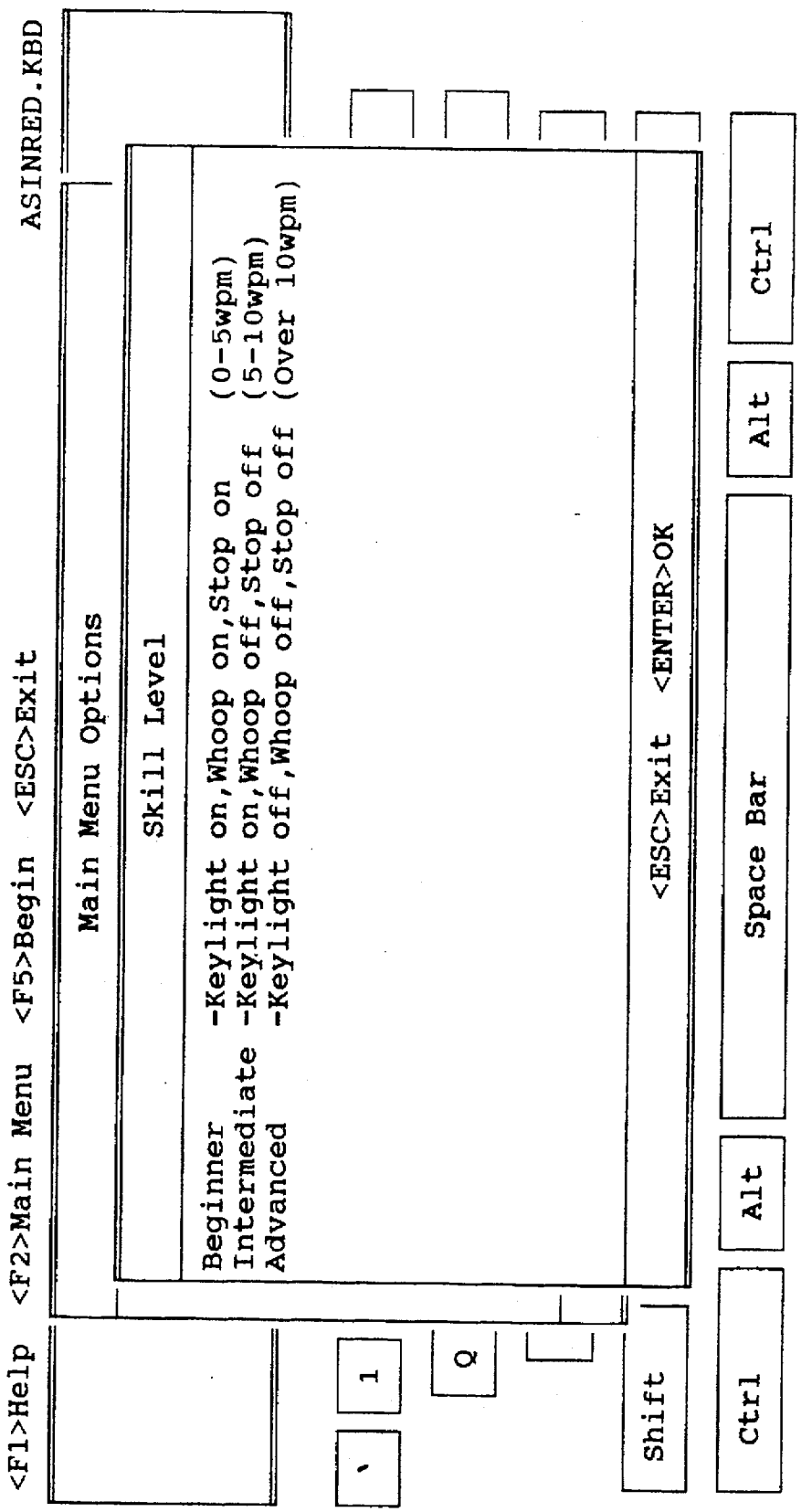
FIG. 28 illustrates the teaching methods of the invention.
Figure 29:
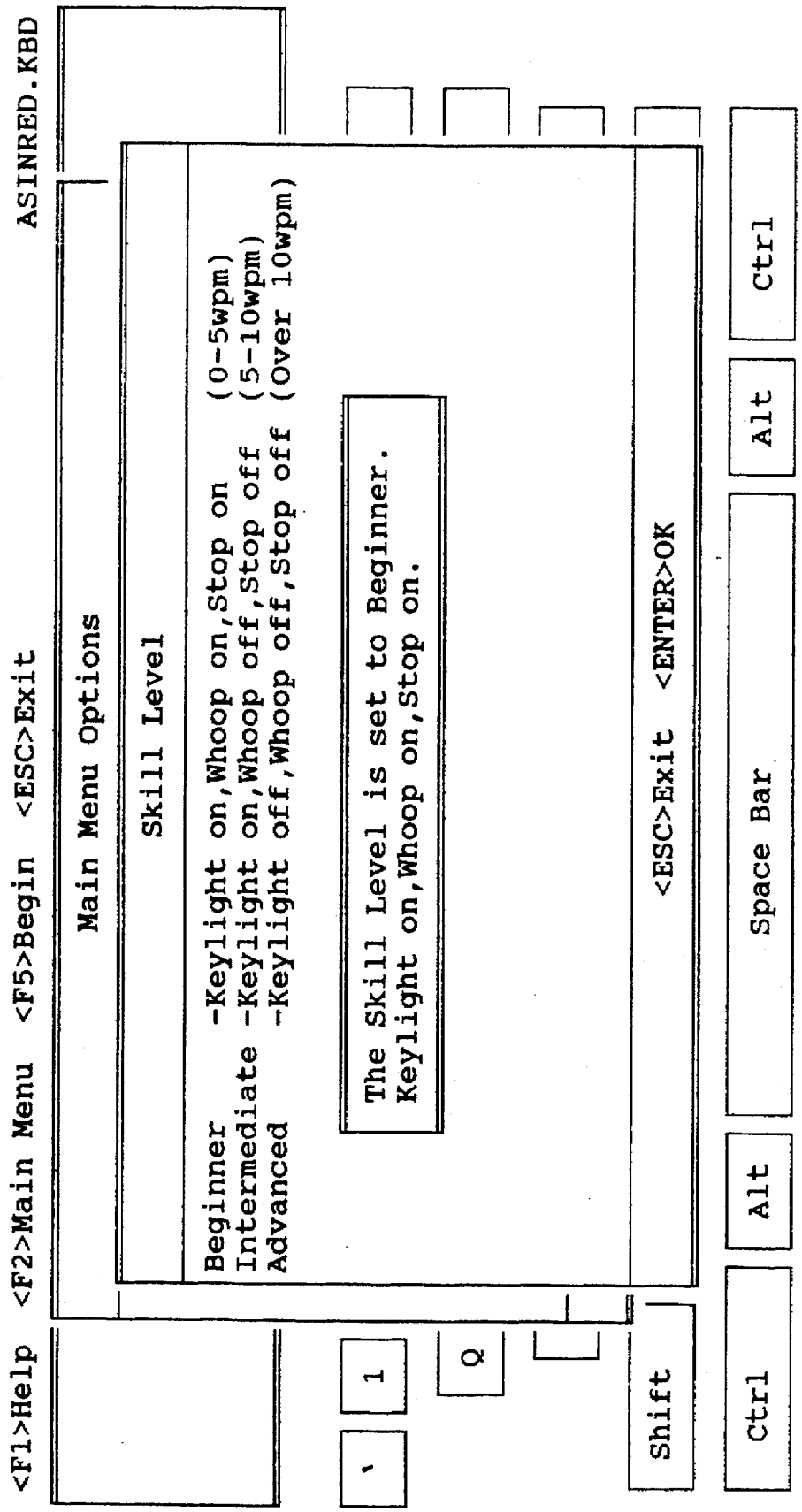
FIG. 29 illustrates the teaching methods of the invention.
Figure 30:
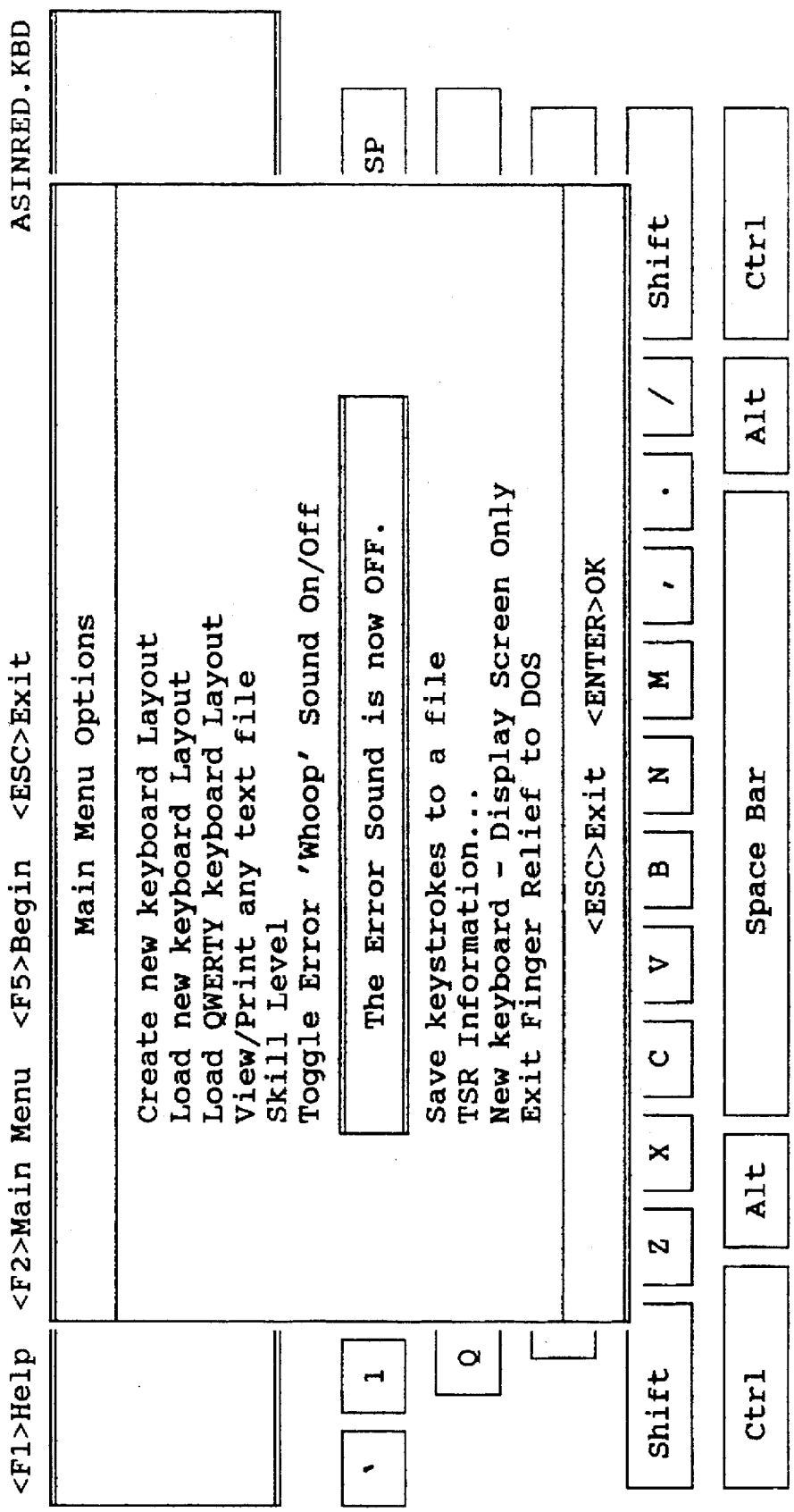
FIG. 30 illustrates the teaching methods of the invention.
Figure 31:
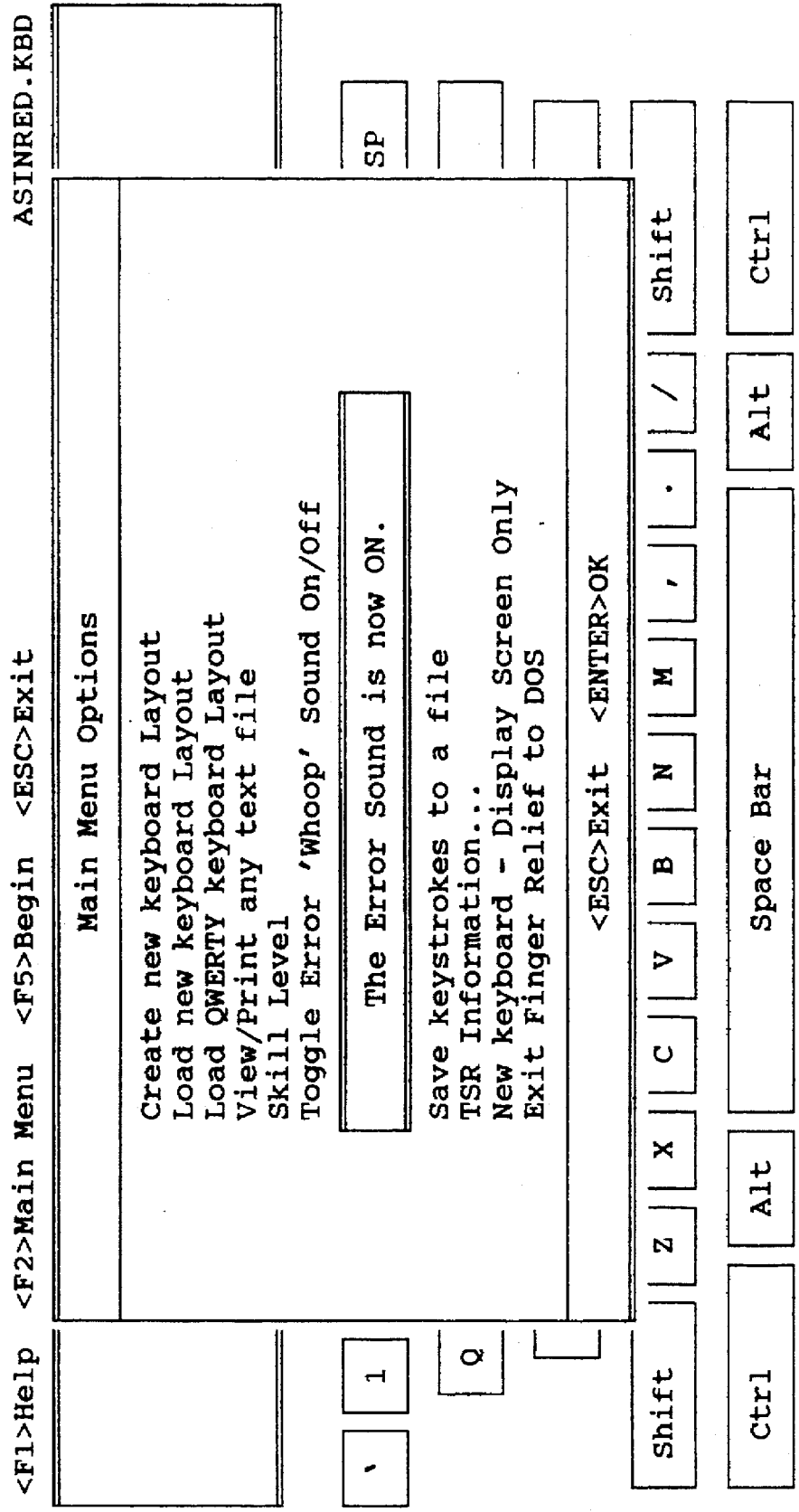
FIG. 31 illustrates the teaching methods of the invention.
Figure 32:
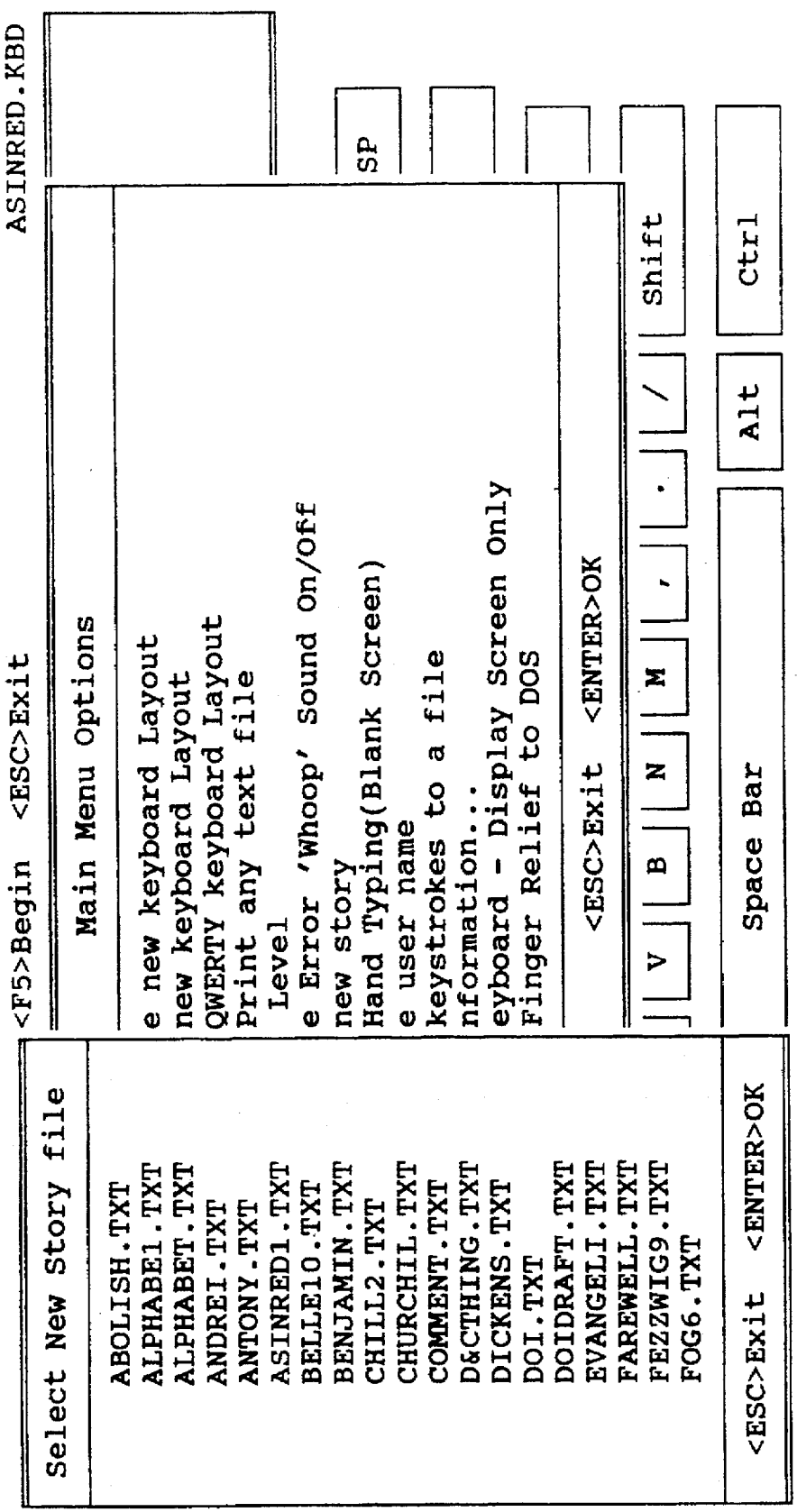
FIG. 32 illustrates the teaching methods of the invention.
Figure 33:
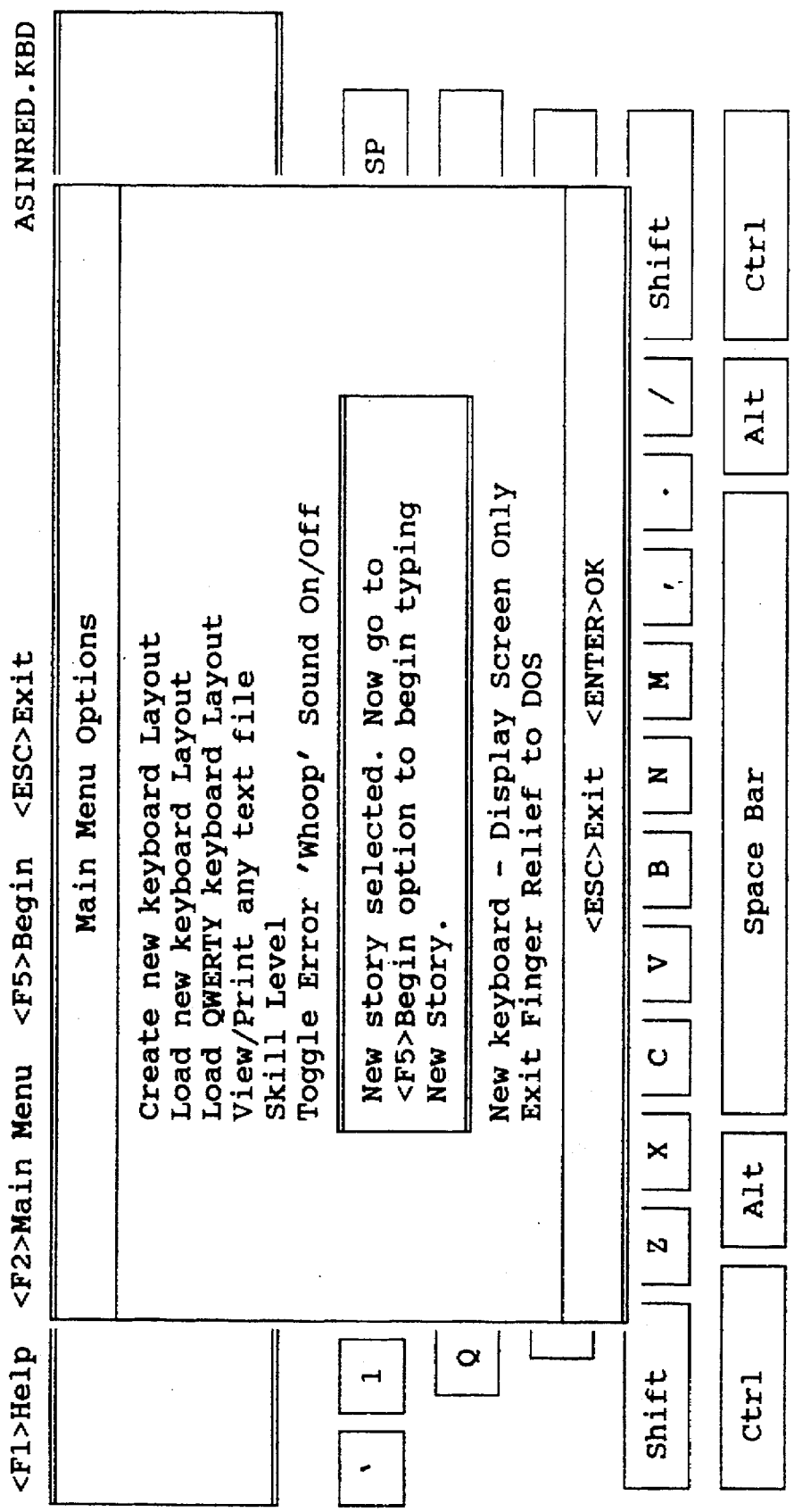
FIG. 33 illustrates the teaching methods of the invention.
Figure 34:
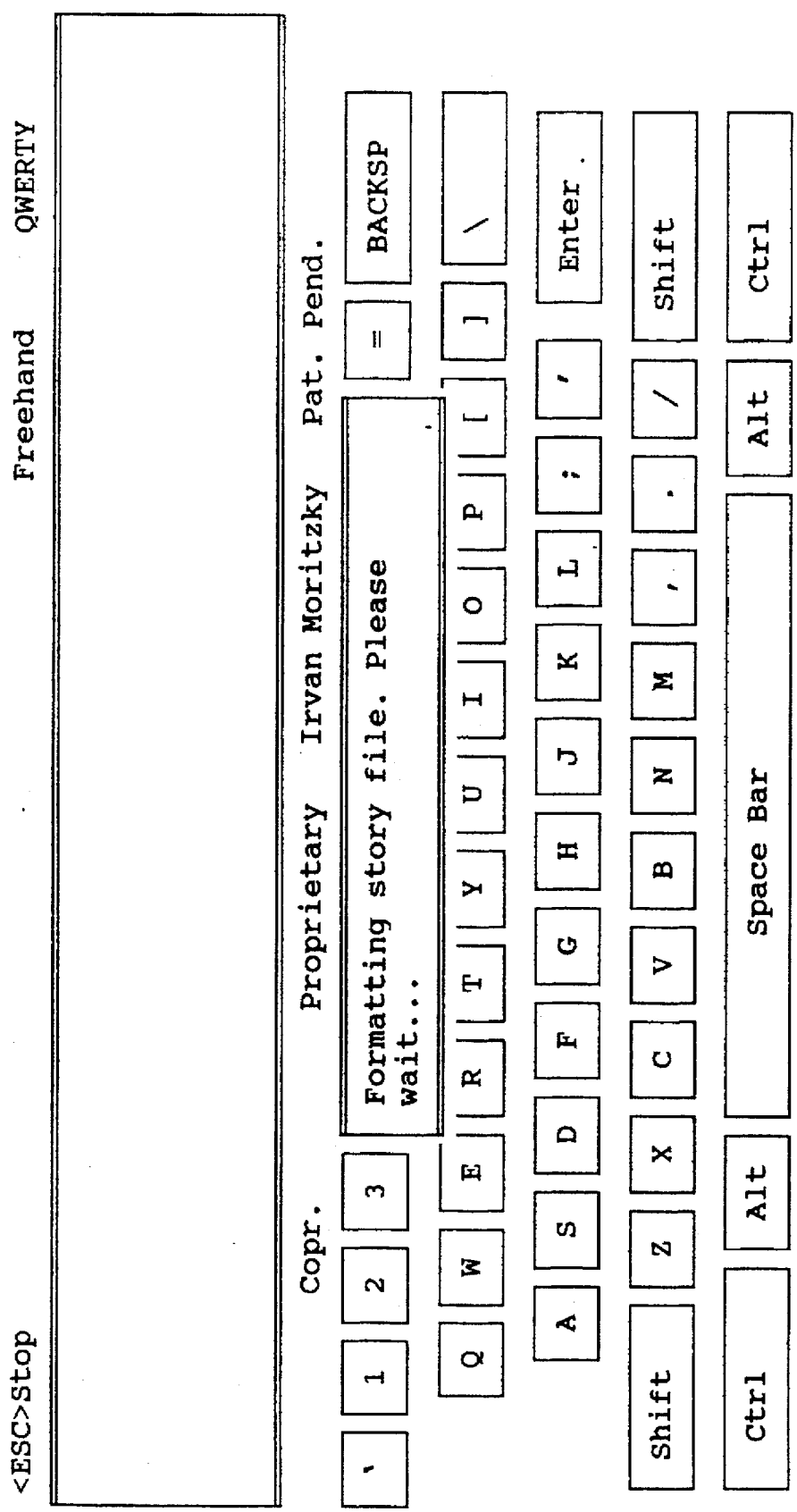
FIG. 34 illustrates the teaching methods of the invention.
Figure 35:
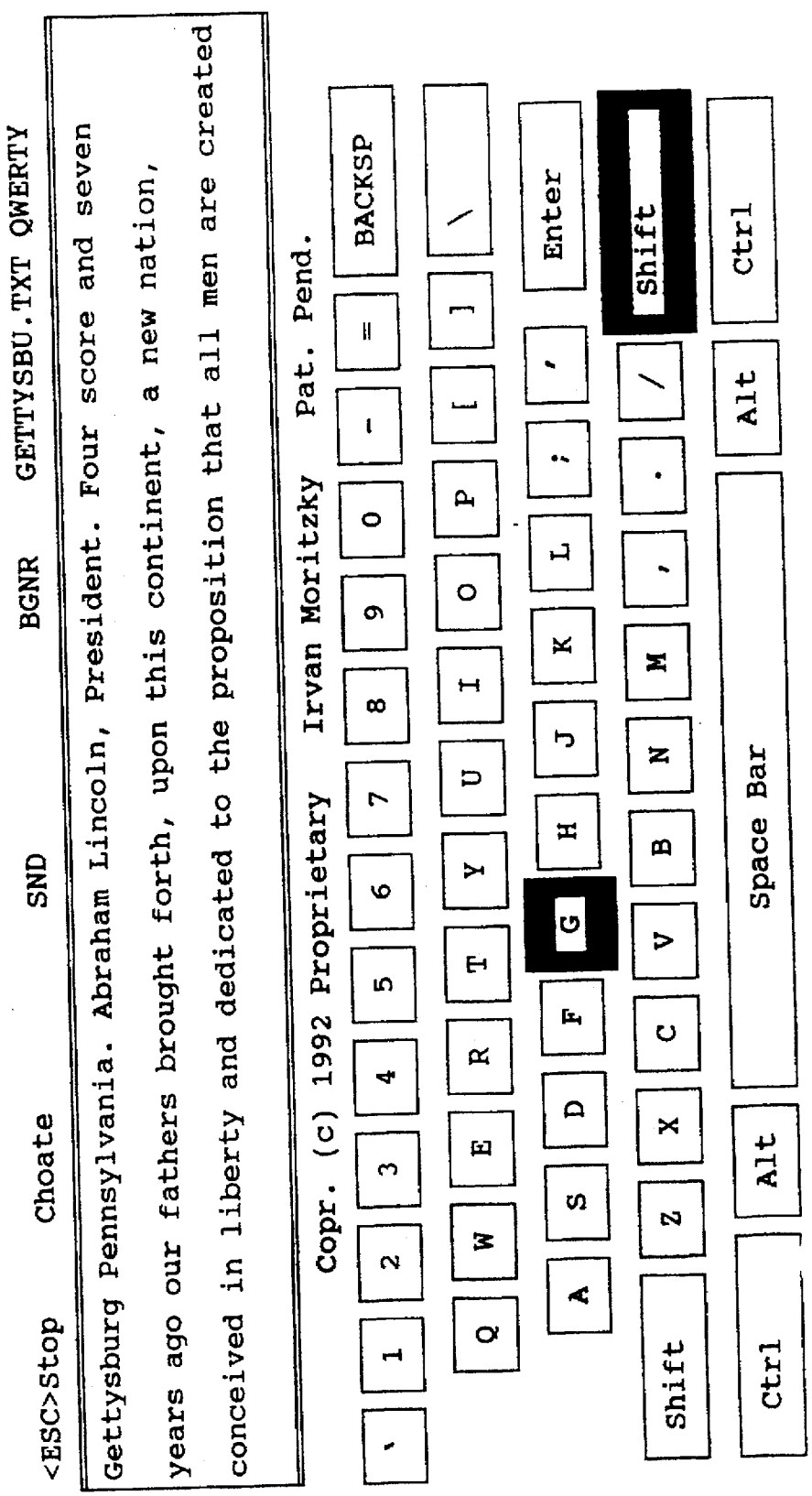
FIG. 35 illustrates the teaching methods of the invention.
Figure 36:
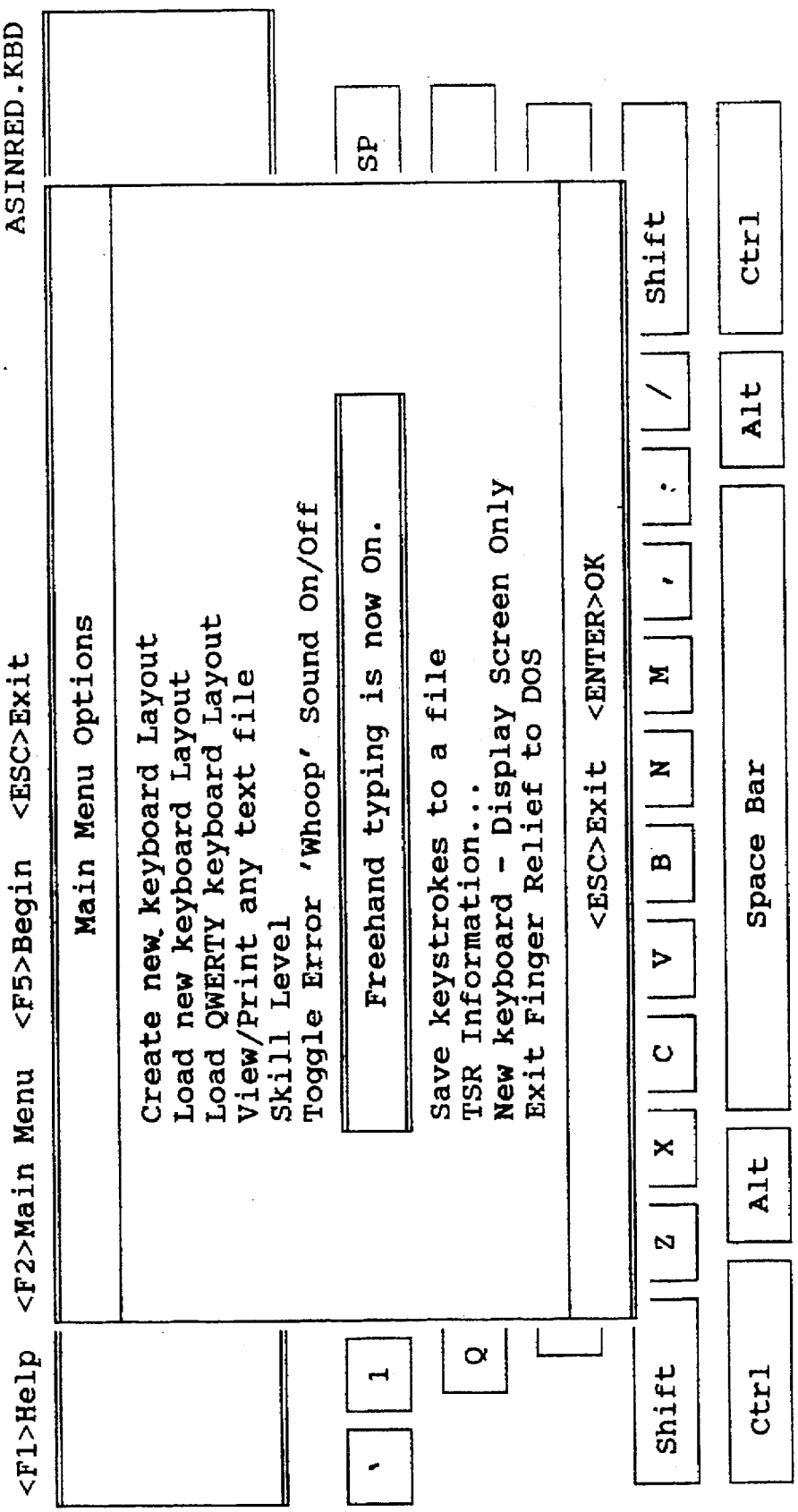
FIG. 36 illustrates the teaching methods of the invention.
Figure 37:
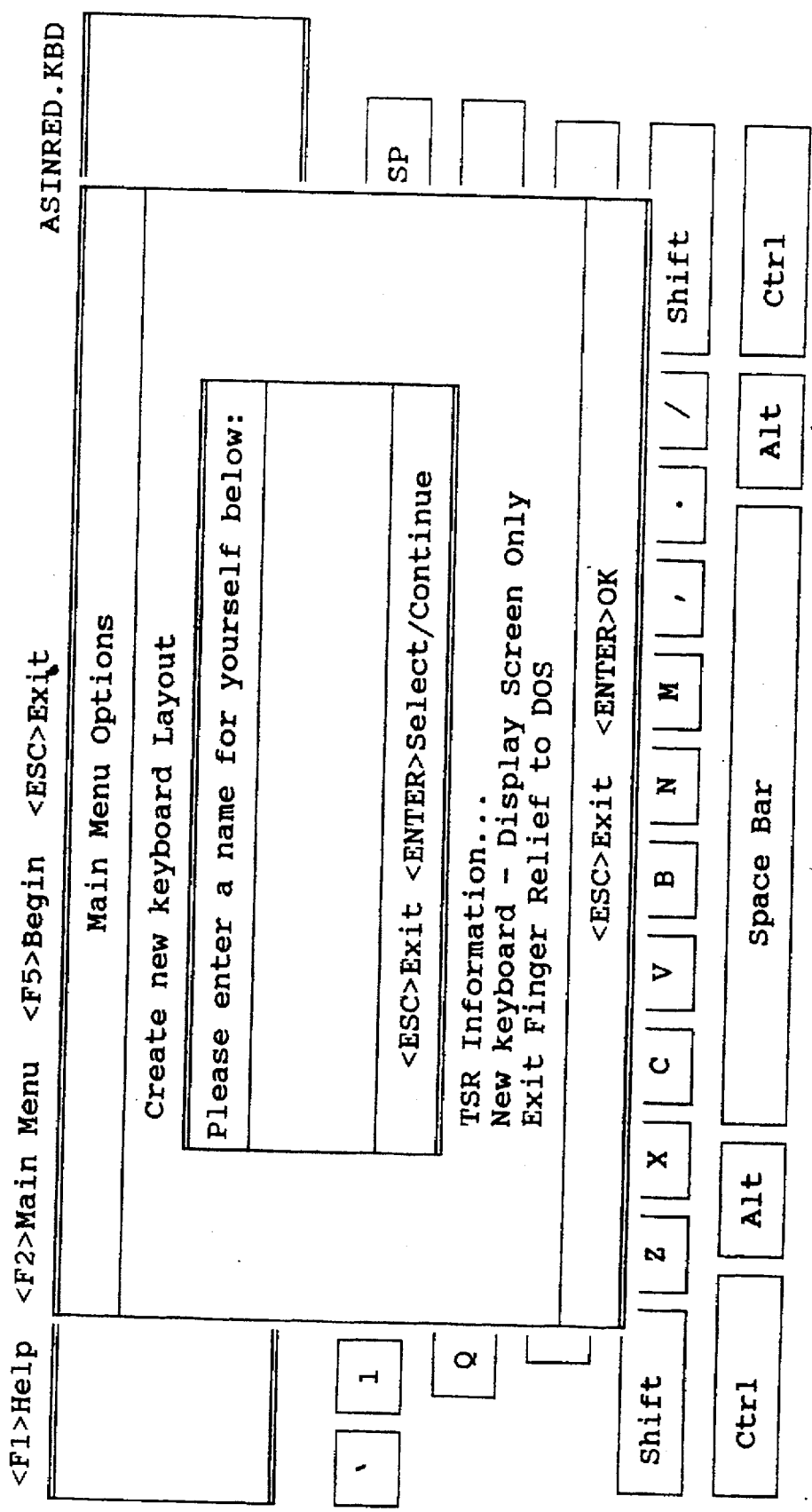
FIG. 37 illustrates the teaching methods of the invention.
Figure 38:
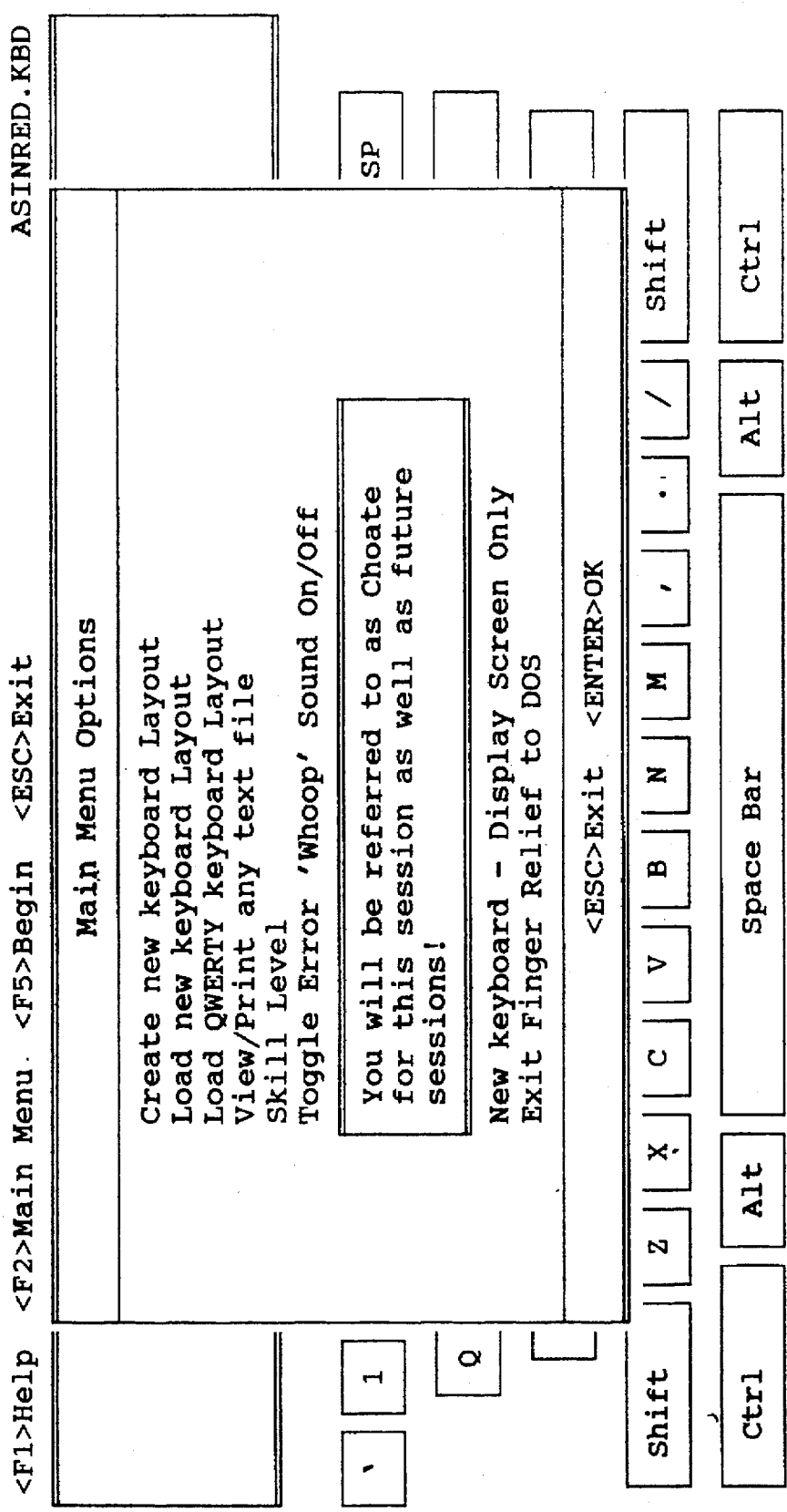
FIG. 38 illustrates the teaching methods of the invention.
Figure 39:
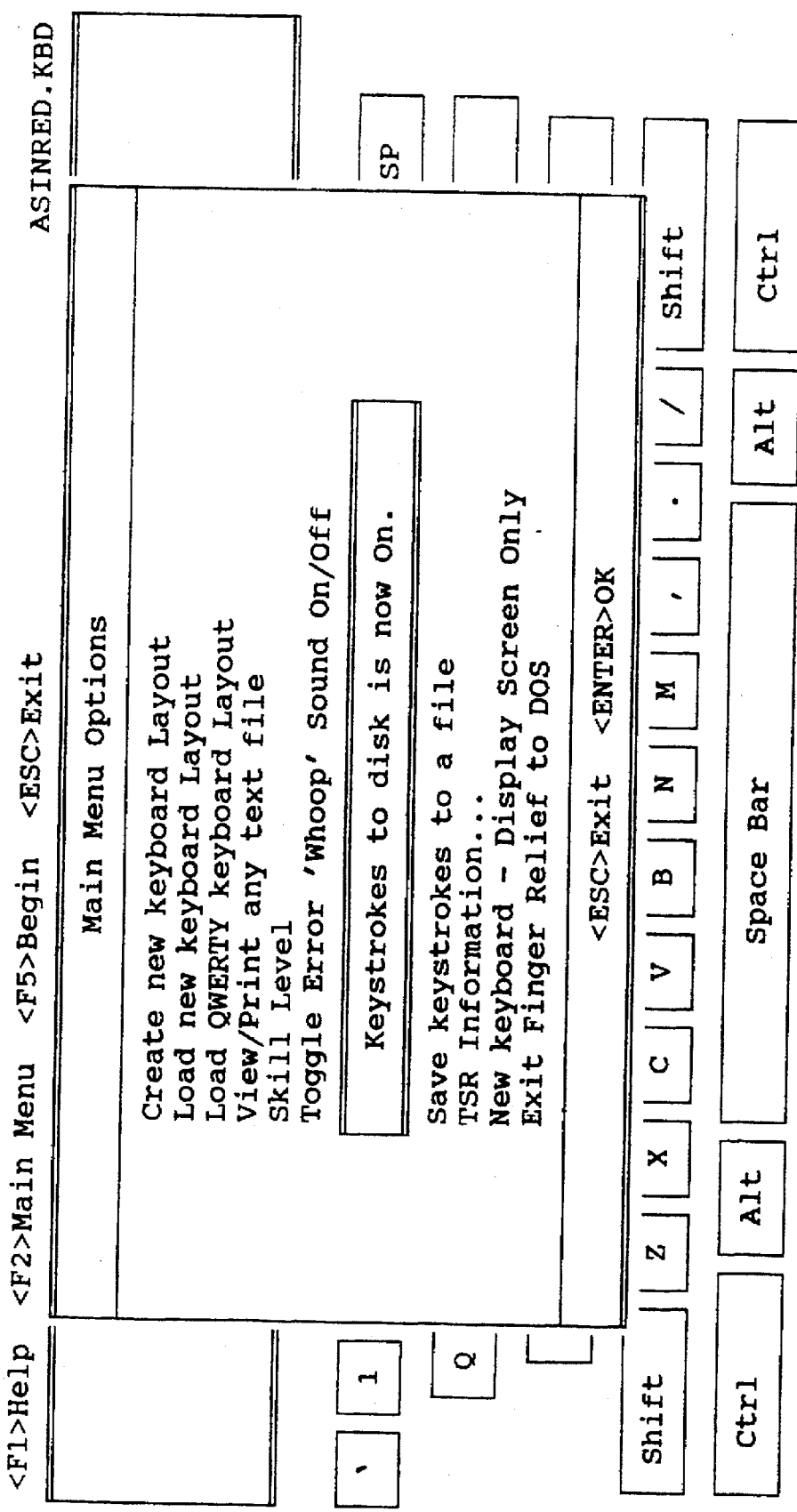
FIG. 39 illustrates the teaching methods of the invention.
Figure 40:
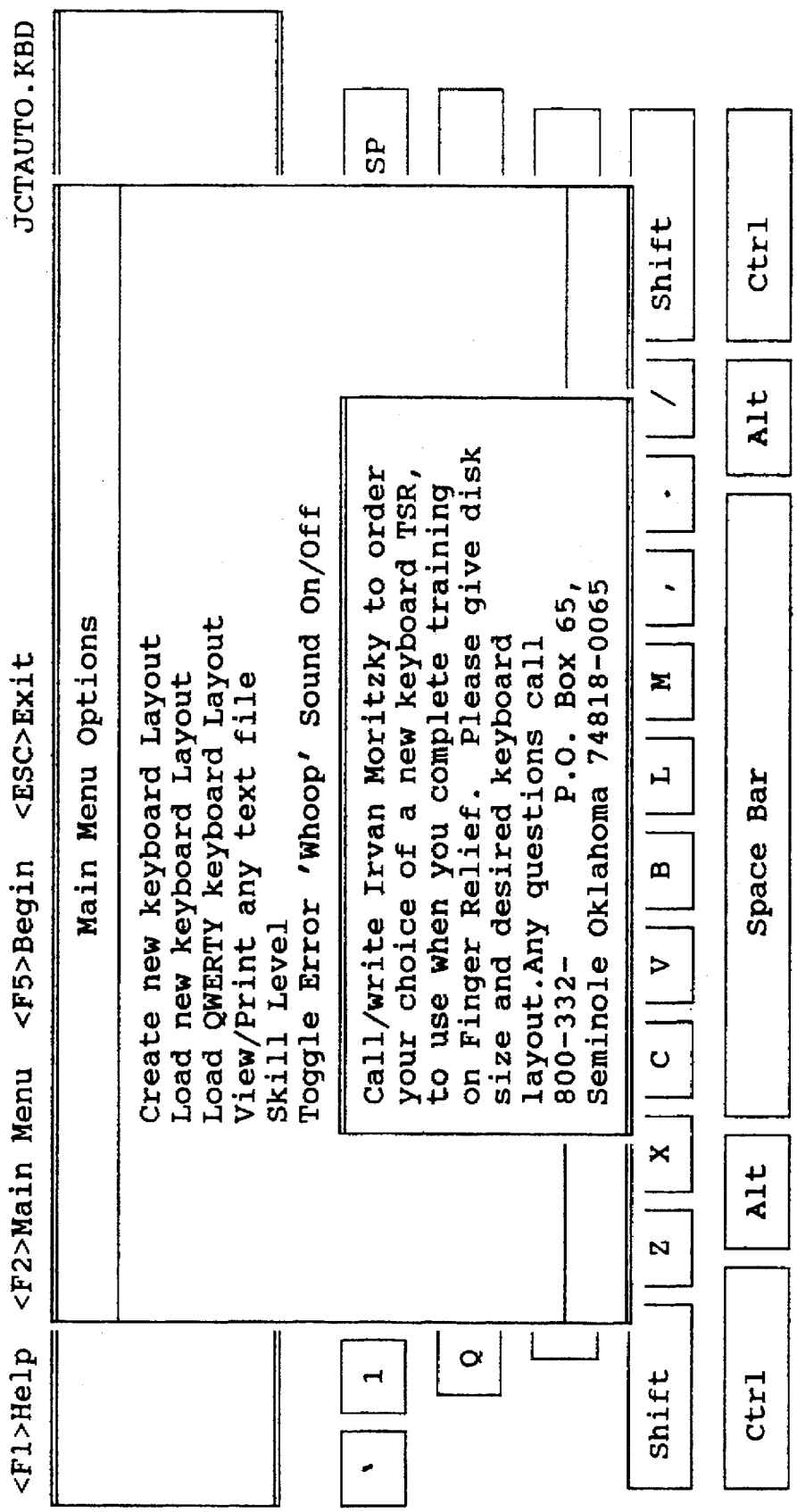
FIG. 40 illustrates the teaching methods of the invention.
Figure 41:
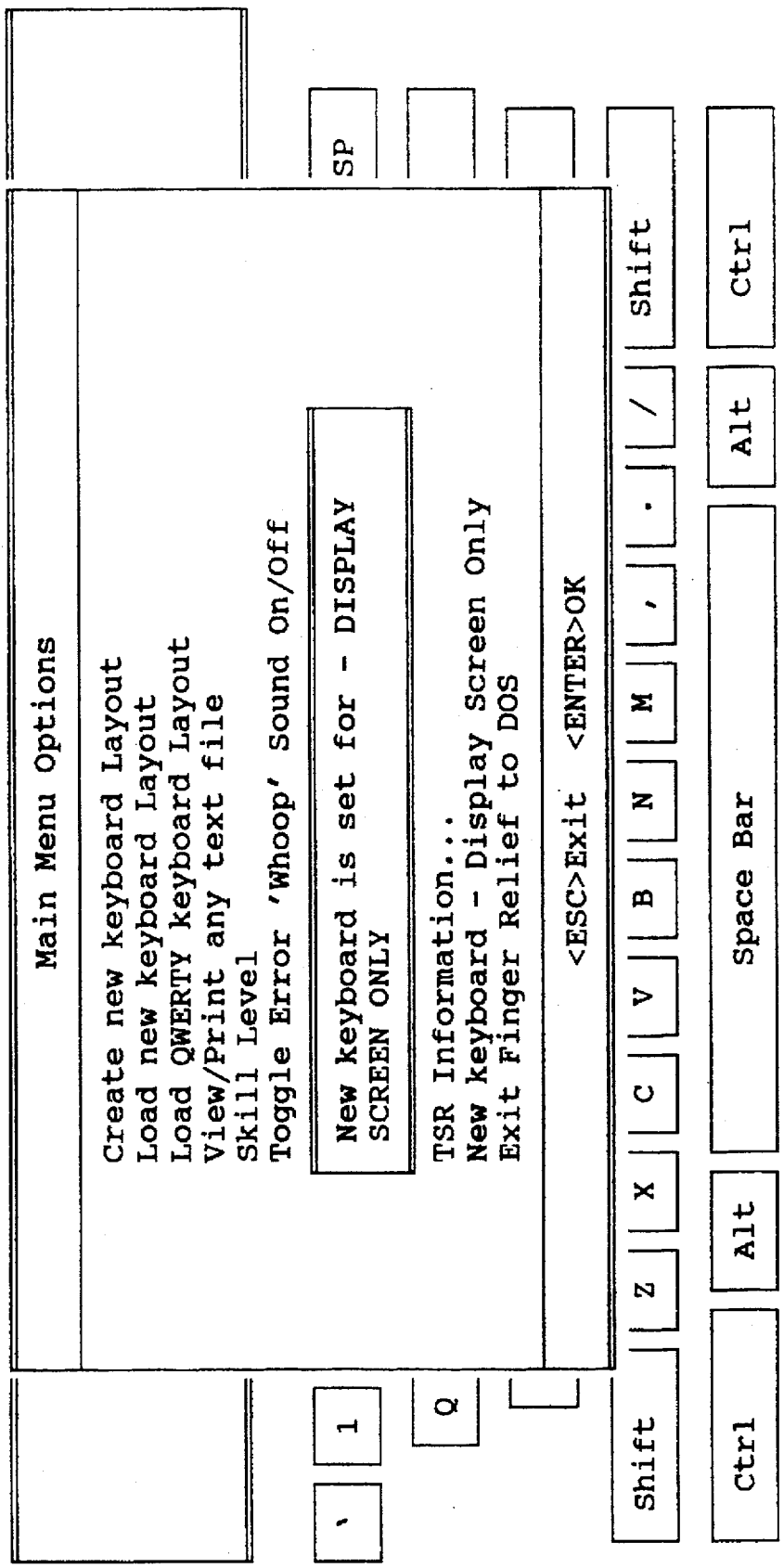
FIG. 41 illustrates the teaching methods of the invention.
Figure 42:
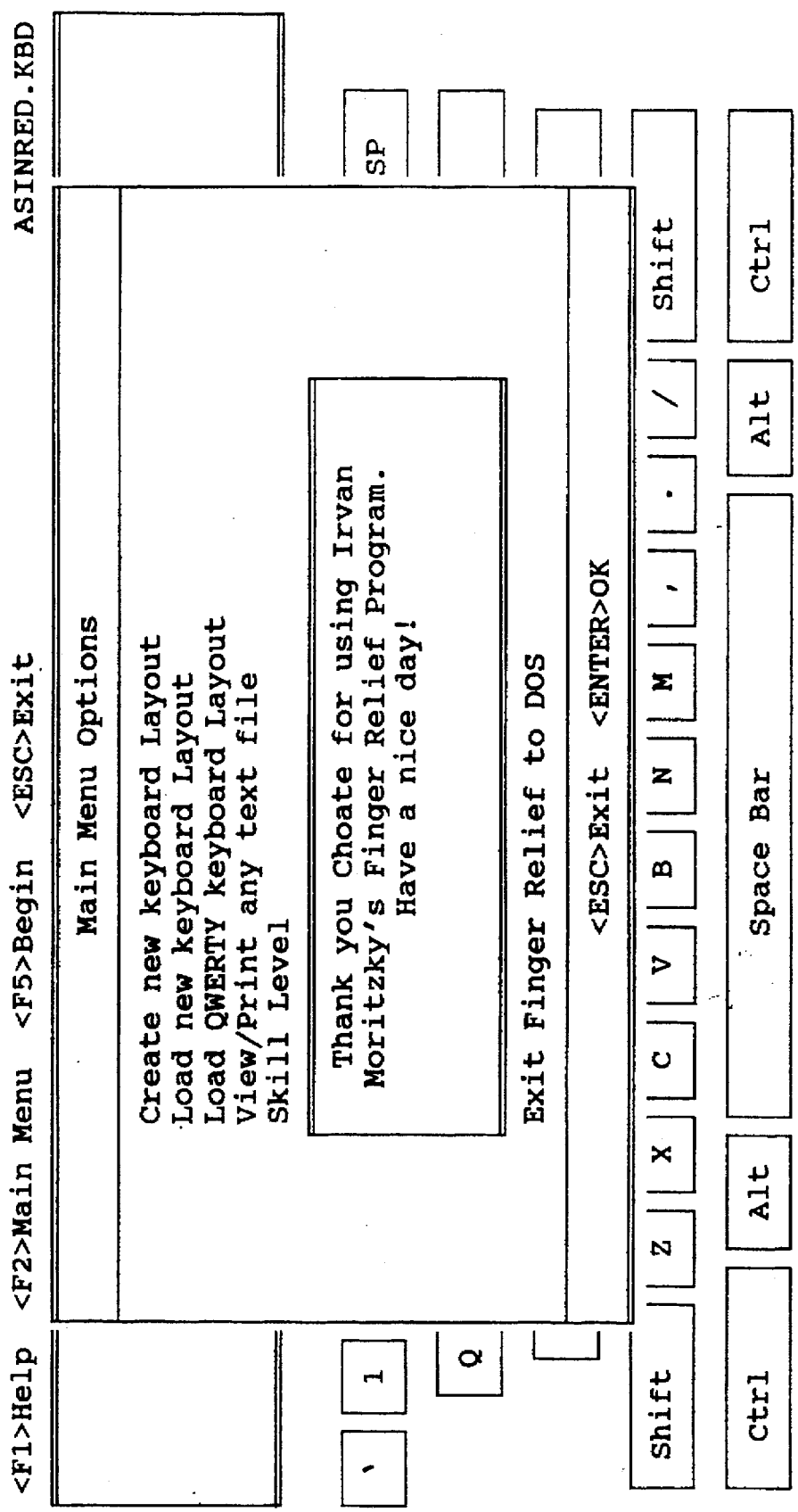
FIG. 42 illustrates the ending page of the teaching method of the invention.

Select keyboard file to use Subwindow works to Load New Keyboard layout command line of the Main Menu Options Window. The window box allows the user to type in the name of the keyboard layout. Because of restrictions in the DOS program, the name is limited to eight characters. If a future program allowed a longer name, that would be more convenient, and perhaps more descriptive. New keyboard layouts must be loaded into RAM (Random Access Memory) while the QWERTY format is on the main menu screen. Because of limitations of the computer program, the changes to the keyboard are all referenced to the old QWERTY format (See FIG. 21). If another non-QWERTY keyboard layout is loaded, and a keyboard is remapped over the non-QWERTY keyboard, some key locations in the non-QWERTY layout will be duplicated or lost. If a keyboard layout name is typed in where the Asterisk "*" is located next to the ".KBD", the <Enter> select/continue key will call up the keyboard. If no name is typed, the <Enter> Select/continue key will call up a window with a list of keyboard layouts with the "KBD" extension on the file name (See FIG. 13). The <ESC> Escape is the exit key, which returns to Main Menu Options Window.

Keyboard Files Subwindow in the Main Menu Options Window lists keyboards available for review or use. New keyboard layouts would also appear on this list after being created and saved according to the procedures of the program (FIGS. 5 thru 11) A keyboard is selected by highlighting the line of the keyboard and pressing the <Enter> OK key. The <ESC> Escape is the exit key, which returns to Main Menu Options Window.

New Keyboard Definition Complete Subwindow Loads New Keyboard layout command line of the Main Menu Options Window. This information line tells the typist the keyboard is loaded and directs the typist to press <ESC> escape key to exit the Load New Keyboard layout.

Four Row keyboard with Deutsch.Kbd is useful to display the location of the letters, numbers, and punctuation on the keyboard designed for efficiently typing the German language. Additional letters would be entered in lieu of punctuation.

Four Row keyboard with DVORAK.Kbd is useful to display the location of the letters, numbers, and punctuation on the keyboard designed for efficiently typing the English language. This was Patented in 1932 as U.S. Pat. No. 2,040,248.

Four Row keyboard with Espanol.Kbd is for Spanish language, Francais.Kbd is for the French language, Italia. Kbd is for Italian, Leftdvor. Kbd is for Left hand Dvorak keyboard, QWERTY.Kbd is for the QWERTY keyboard, Rightdvo. Kbd is for right hand Dvorak keyboard.

QWERTY Keyboard Loaded Subwindow, loads QWERTY Keyboard Layout command line of Main Menu Options Window. If the QWERTY keyboard is selected from the Main Menu, this information line will appear and automatically disappear in less than a minute. It is necessary to load QWERTY between changing from one non QWERTY keyboard layout to another non QWERTY layout.

Enter Search Specification for Any Text File to View Subwindow is a View/Print any Text file command line of Main Menu Options Window. This window looks for files with the "txt" extension. Thus the text could be viewed in total before loading to be copied and retyped. The name of the text can be typed in, or the <Enter> select/continue key will provide a list of text files to import. Select Text File to View Subwindow is a View/Print any Text file command line of Main Menu Options Window. About 75 files are available for viewing, loading or recopying. All the files in the subdirectory are listed, whether or not they have ASCII text format (i.e. non-text files such as command files and system files). The <ESC> key will exit this file and return to the Main Menu Options Window.

Viewing File Hi.Txt is a View/Print any Text file command line of Main Menu Options Window. This is a sample of a file selected to view. Further command options indicate the ability to <F2> Search, <F7> Print, and move left and right and to scroll up or down the file, if it extends over one screen. The <ESC> escape key will exit the Viewing File and return to Main Menu Option.

Main Menu Options Window gives the top row information line and identifies the loaded keyboard as ASINRED.KBD instead of JCTAUTO.KBD.

Skill Level Subwindow gives a Skill level command line of the Main Menu Options Window. This allows the typist to select one of three skill levels, which level turns on or off helps in typing. The Stop on means the proper key must be depressed before the program will let the typist proceed in typing the text. The Whoop on means a sound occurs when the Wrong key is typed. The Keylight On means a box surrounds the key which is selected for typing. <Enter> confirms a selection, and <ESC> Escape exits the window and returns to the Main Menu Options.

The Skill level is set second Subwindow. Skill Level Subwindow. Skill level command line of the Main Menu Options Window. This box confirms the level is set to beginner. Similar boxes indicate intermediate or advanced typists. This is an informational box which ends in less than a minute.

The Error Sound is now Off (or On) Subwindow toggles the Error 'Whoop' Sound on/off command line of the Main Menu Options Window. From the Main Menu, the typist may turn off (or on) the sound for errors. This is an informational box which ends in less than a minute.

Select New Story File Subwindow Loads a New Story Command Line of the Main Menu Options Window. This is a list of Text files to select to retype. The first file is "abolish.txt", an extract of the writings of Jonathan Swift. <Enter> confirms a selection, and <ESC> Escape exits the window and returns to the Main Menu Options.

New Story Selected Subwindow Loads a New Story Command Line of the Main Menu Options Window. This information window instructs the user to exit the Main Menu with the <ESC> key and then to press <F5> to start typing with the selected story. This is an informational box which ends in less than a minute.

Formatting Story File window appears from 4 row keyboard picture, when the user presses the <F5> Function 5, to show that the tutorial is beginning. The window says it is formatting a story file, which means opening a text to type. The information line on the top of the box only lists the <ESC> Escape as the Stop key, and information of the keyboard (QWERTY) and text article (Freehand). Information window ends in less than a minute, depending of the speed of the CPU.

Sample text of "Gettysbu.txt" with QWERTY layout, and beginning skill level with sound, is the Gettysburg Address by Abraham Lincoln, given during the Civil War. Notice the three lines of text are double spaced to allow for copying between the lines. When the typing has reached the bottom line, new lines of text appear, until the file is completed. The first letter, a Capital "G" created by depressing the Shift and G keys is properly identified by bold rectangles around those keys. The information line on top gives the name of the user (Choate), the Sound (SND) is on, beginner (BGNR) skill level, the text file name "Gettysbu.txt" and the keyboard layout (QWERTY). To stop the txt program, touch the <ESC> escape key.

Freehand Typing is now On Subwindow allows selection of the Freehand Typing (Blank Screen) command line of the Main Menu Options Window. This file is a blank screen which allows practice of the typing and writing the users own text, letter, or report. In conjunction with the key2disk format, it can be a simple word processor for training in actual letters. After the letter is written, it can be loaded on a word processor for formatting (i.e. paragraphing, spelling check, footnotes or headers and footers). Information window ends in less than a minute, depending of the speed of the CPU.

Please enter a name for yourself below Subwindow allows the user to change User Name command line of the Main Menu Options Window. Allows the program to be customized to the name of the user. Named files will assist in identifying each student, so a number of students could use the program at the same time. <Enter> confirms a selection, and <ESC> Escape exits the window and returns to the Main Menu Options.

You will be referred to as Subwindow gives the changed name. This allows the program to be customized with the name of the student, so a number of students could use the program at the same time. Information window ends in less than a minute, depending of the speed of the CPU.

Keystrokes to disk is now on is with save Keystrokes to a file command line of the Main Menu window. Informational line that the keystrokes in the program are being saved.

Call/Write Subwindow is a TSR Information command line of the Main Menu Options Window. TSR is an abbreviation for Terminate and Stay Resident. A TSR is a type of program for a computer, also called memory resident, that stays in the random access memory for use at any time. In this case, the TSR refers to remapping programs which read the hexadecimal codes as the keys are depressed and substitutes appropriate letters for the keys which they replace. For additional TSRs, call or mail in the instructions or layout and a DOS program will be made and returned. <ESC> Escape exits the Subwindow and returns to the Main Menu Options.

New Keyboard is set for Display Screen Only is a command line of the Main Menu Options Window which turns off the remapping commands of the practice.exe program, but allows the keyboard display to be changed to alternative keyboards. Information window ends in less than a minute, depending of the speed of the CPU.

Thank You *** for using Finger Relief Subwindow is an Exit from Finger Relief to DOS command line of the Main Menu Options Window. This information window says good bye to the user. The same Subwindow can be used by the informational line on the 4 row keyboard displays with the <ESC> key. <ESC> Escape exits the practice.exe program and returns to the DOS.

What is claimed is:

1. A method for training a student in the use of a keyboard, the method comprising the steps of:
   A) providing a student an adaptable keyboard,
   B) instructing the student to determine letter usage frequency,
   C) instructing the student to change the key location thereby converting from the QWERTY standard to an efficient keyboard based on the letter usage frequency determined in step B, and
   D) instructing the student to perform a typing exercise using the new keyboard layout.

2. The method according to claim 1 wherein the student performs a free style typing exercise.

3. The method according to claim 1 wherein the typing exercise comprises the student performing practice by replicating a sample text to be viewed, corrected, saved, or printed.

4. The method according to claim 1 wherein the typing exercise comprises the student placing fingers on keys as directed by a graphic representation of a plurality of boxes representing the keys or characters of the keyboard in approximate configuration of the keys of a keyboard.

5. The method according to claim 1 wherein the typing exercise comprises the student depressing fingers on keys as directed by a graphic representation of a plurality of boxes representing the keys or characters of the keyboard in approximate configuration of the keys of a keyboard.

6. The method according to claim 1 wherein the typing exercise comprises the student selecting at least one of the letters, keyboards or sample texts to accommodate at least one of the student's skill level, the particular language in which the training is conducted, physical disability, or ability according to the age.

7. The method according to claim 1 wherein the typing exercise comprises the student learning the Dvorak keyboard layout.

8. The method according to claim 1 wherein the typing exercise comprises selection discrimination to teach the student which keys are not to be touched.

9. The method according to claim 1 wherein the typing exercise comprises the student preserving the entry of the typist's keyboarding actions, by saving key strokes.

10. The method according to claim 1 wherein the typing exercise comprises the student entering the user's name for monitoring reports to note improvements or changes in ability.

11. The method according to claim 1 wherein the typing exercise comprises the student customizing the location and selection of the most used letter keys to allow flexible selection for subject matter or language variations from English letter frequency.

12. The method according to claim 1 wherein the method further comprises the step of printing out the students' typing exercise to a printer to create a hard copy.

13. The method according to claim 1 wherein the method further comprises the step of having the keyboard lock or refuse further entry upon erroneous entry from the student.

14. The method according to claim 1 wherein the method further comprises the step of the student preserving the work for future reference.

15. The method according to claim 1 wherein the method further comprises the step of the student identifying the exercise text before, during, and after the typing exercise.

16. The method according to claim 1 wherein the method further comprises the step of the student identifying and preserving the names of the exercise text, the user, the style of keyboard, the skill level, for use of the student or instructor, before, during, and after the typing exercise.

17. The method according to claim 1 wherein the method further comprises the step of the student placing the fingers on the keys and suppressing the graphic representation of the finger placement on keys of a plurality of boxes representing the keys or characters of the keyboard in approximate configuration of the keys of a keyboard.

* * * * *